United States Patent
Chen et al.

(10) Patent No.: US 12,160,627 B2
(45) Date of Patent: Dec. 3, 2024

(54) METHOD FOR RESUMING PLAYING MULTIMEDIA CONTENT BETWEEN DEVICES

(71) Applicant: Huawei Technologies Co., Ltd., Shenzhen (CN)

(72) Inventors: Minjiang Chen, Shenzhen (CN); Xingyu Liu, Shenzhen (CN); Mingyin Ning, Shenzhen (CN); Hongze Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 17/914,438

(22) PCT Filed: Mar. 23, 2021

(86) PCT No.: PCT/CN2021/082246
§ 371 (c)(1),
(2) Date: Sep. 26, 2022

(87) PCT Pub. No.: WO2021/190466
PCT Pub. Date: Sep. 30, 2021

(65) Prior Publication Data
US 2023/0119300 A1    Apr. 20, 2023

(30) Foreign Application Priority Data

Mar. 26, 2020  (CN) .......................... 202010225233.7
May 18, 2020   (CN) .......................... 202010419691.4

(51) Int. Cl.
*H04N 21/43*   (2011.01)
*H04N 21/431*  (2011.01)
(Continued)

(52) U.S. Cl.
CPC . *H04N 21/43078* (2020.08); *H04N 21/43076* (2020.08); *H04N 21/4312* (2013.01);
(Continued)

(58) Field of Classification Search
CPC ....... H04N 21/43078; H04N 21/43076; H04N 21/4312; H04N 21/43615;
(Continued)

(56) References Cited

U.S. PATENT DOCUMENTS 9,594,482 B2     3/2017 Pontual et al.
10,555,031 B1 *  2/2020 Almeida .......... H04N 21/42225
(Continued)

FOREIGN PATENT DOCUMENTS

CN   102685579 A   9/2012
CN   103037244 A   4/2013
(Continued)

OTHER PUBLICATIONS

Jiaxu Sun et al, "Controlling Smart TVs Using Touch Gestures on Mobile Devices," UIC-ATC-ScalCom-CBDCom-IoP 2015, pp. 1222-1229, total 8 pages.

*Primary Examiner* — John R Schnurr
(74) *Attorney, Agent, or Firm* — Conley Rose, P.C.

(57) ABSTRACT

A method for playing multimedia content between devices includes a first device that receives first playback information from a second device, where the first playback information corresponds to first multimedia content played by the second device, and the first device and the second device are located in the same wireless network. The first device displays a first playback control card corresponding to the first multimedia content, where the first playback control card includes a first control and a second control, and the second control controls playback of the first multimedia content. In response to a first user input performed on the (Continued)

first control, the first device obtains the first multimedia content from a server based on the first playback information, and takes over the playing of the first multimedia content based on the first playback information.

20 Claims, 53 Drawing Sheets

(51) Int. Cl.
*H04N 21/436* (2011.01)
*H04N 21/4363* (2011.01)
*H04N 21/472* (2011.01)

(52) U.S. Cl.
CPC . *H04N 21/43615* (2013.01); *H04N 21/43637* (2013.01); *H04N 21/47217* (2013.01)

(58) Field of Classification Search
CPC ....... H04N 21/43637; H04N 21/47217; H04N 21/4222; H04N 21/436; H04N 21/44204
See application file for complete search history.

(56) References Cited

U.S. PATENT DOCUMENTS

| | | | |
|---|---|---|---|
| 2011/0131616 A1* | 6/2011 | Cho | H04N 21/4882 |
| | | | 725/78 |
| 2013/0336637 A1 | 12/2013 | Nakamura et al. | |
| 2014/0029913 A1* | 1/2014 | Lopez | H04N 21/41265 |
| | | | 386/E5.052 |
| 2014/0136978 A1 | 5/2014 | Verma | |
| 2014/0282755 A1* | 9/2014 | Alsina | H04N 21/4751 |
| | | | 725/88 |
| 2014/0299133 A1 | 10/2014 | Marie et al. | |
| 2014/0334795 A1 | 11/2014 | Dobrowolski et al. | |
| 2015/0067743 A1 | 3/2015 | Meng et al. | |
| 2015/0178227 A1* | 6/2015 | Salmela | H04N 21/41407 |
| | | | 710/72 |
| 2015/0253960 A1 | 9/2015 | Lin et al. | |
| 2015/0286369 A1* | 10/2015 | Pontual | G06F 3/04842 |
| | | | 715/719 |
| 2016/0127799 A1 | 5/2016 | Alsina et al. | |
| 2017/0060402 A1* | 3/2017 | Bates | G06F 3/0482 |
| 2017/0171270 A1 | 6/2017 | Qu | |
| 2018/0310050 A1* | 10/2018 | Goldstein | H04N 21/43615 |
| 2018/0338177 A1 | 11/2018 | Graham et al. | |
| 2019/0110091 A1 | 4/2019 | Guo et al. | |
| 2019/0138553 A1 | 5/2019 | Maharajh et al. | |
| 2019/0174197 A1 | 6/2019 | Katz et al. | |
| 2019/0304507 A1 | 10/2019 | Leyfman et al. | |
| 2021/0014335 A1* | 1/2021 | Elcock | H04N 21/44231 |
| 2023/0119300 A1 | 4/2023 | Chen et al. | |

FOREIGN PATENT DOCUMENTS

| | | |
|---|---|---|
| CN | 103037265 A | 4/2013 |
| CN | 103546453 A | 1/2014 |
| CN | 103796076 A | 5/2014 |
| CN | 104798379 A | 7/2015 |
| CN | 105025393 A | 11/2015 |
| CN | 106791944 A | 5/2017 |
| CN | 107743255 A | 2/2018 |
| CN | 109936757 A | 6/2019 |
| CN | 110290415 A | 9/2019 |
| CN | 110381197 A | 10/2019 |
| CN | 111726678 A | 9/2020 |
| JP | 2013223083 A | 10/2013 |
| JP | 2014003403 A | 1/2014 |
| JP | 2017516178 A | 6/2017 |
| WO | 2018112711 A1 | 6/2018 |

* cited by examiner

METHOD FOR RESUMING PLAYING MULTIMEDIA CONTENT BETWEEN DEVICES

CROSS-REFERENCE TO RELATED APPLICATIONS

This is a U.S. National Stage of International Patent Application No. PCT/CN2021/082246 filed on Mar. 23, 2021, which claims priority to Chinese Patent Application No. 202010419691.4 filed on May 18, 2020 and Chinese Patent Application No. 202010225233.7 filed on Mar. 26, 2020, all of which are hereby incorporated by reference in their entireties.

TECHNICAL FIELD

Embodiments of this application relate to the field of electronic technologies, and in particular, to a method for resuming playing multimedia content between devices.

BACKGROUND

With continuous development of terminal technologies and internet of things technologies, a user has increasingly more types of electronic devices with increasingly more functions. Some of the electronic devices may be configured to play multimedia content (for example, a picture, an audio, and a video). For a user, if playback of multimedia content played on one electronic device can be resumed on another electronic device, user experience is improved.

SUMMARY

Embodiments of this application relate to the field of electronic technologies, and provide a method for resuming playing multimedia content between devices, so that playback of multimedia content can be resumed between devices, and therefore the multimedia content is played more flexibly, and user experience is better. To achieve the foregoing objectives, the following technical solutions are used in embodiments of this application.

According to a first aspect, a first device first receives first playback information sent by a second device, where the first playback information corresponds to first multimedia content played by the second device, and the first device and the second device are located in a same wireless network. Then, the first device displays a first playback control card corresponding to the first multimedia content, where the first playback control card includes a first control and a second control, and the second control is used to control playback of the first multimedia content. Finally, in response to a first user input performed on the first control, the first device obtains the first multimedia content from a server based on the first playback information, and resumes playing the first multimedia content based on the first playback information.

For example, the first device is a mobile phone, and the second device is a smart television. The mobile phone first receives first playback information sent by the smart television, where the first playback information corresponds to a television program played by the smart television, and the mobile phone and the smart television are connected to a same WLAN. The mobile phone displays a first playback control card corresponding to the television program that is being played by the smart television, where the first playback control card includes a playback resume option, a playback option, and a playback pause option, and the playback option and the playback pause option may be used to control the television program that is being played by the smart television. The mobile phone may display the playback control card when the mobile phone lights up during screen-off, or may display the playback control card in a control center interface when receiving an operation gesture of a user. When the mobile phone responds to the user input that a user taps the playback resume option, the mobile phone obtains content of the television program based on a URL address or a multimedia content identifier in the first playback information, and resumes playing the television program based on a video playback progress in the first playback information. According to this design, playback of the multimedia content played on the second device can be resumed on the first device, and therefore user experience can be improved.

To meet a requirement for real-time playback resuming, in a possible design, that the second device synchronizes the first playback information to the second device includes: The second device detects that the first playback information changes. The second device sends the first playback information to the first device through a wireless network. In a possible design, that the second device periodically synchronizes the first playback information to the second device includes: The second device starts a cyclic timer. After a timing time period of the cyclic timer expires, the second device sends the first playback information to the first device through a wireless network. In a possible design, that the second device may further synchronize the first playback information to the first device based on a request of the first device further includes: The first device starts an event listener to listen to any one of the following events: an event that the first device unlocks a screen, an event that the first device joins a wireless network, and an event that the first device is disconnected from a wireless network. After the event listener is triggered, the first device sends a request used to obtain the first play information. The second device sends the first playback information to the first device through a wireless connection.

In a possible design, that the first device displays a first playback control card corresponding to the first multimedia content includes: In response to a sliding gesture that is of sliding to a first interface from left to right and that is performed on a home screen of the first device, the first device displays the first playback control card in the first interface. For example, the first interface is a control center interface. Playback control cards are displayed in the control center interface in a centralized manner, so that good visual experience can be brought to the user. In addition, an operation of opening/closing the control center interface is convenient.

In a possible design, the second control includes at least one of the following: a volume icon, a volume display bar, a playback icon, a playback progress display bar, a rewind icon, a fast-forward icon, or a next-episode icon. According to this design, the electronic device can control playback of the first multimedia content by receiving a playback control command performed by the user on the second control.

In a possible design, the first playback information includes an identifier of the first multimedia content and a playback progress of the first multimedia content.

In a possible design, the first playback information further includes at least one of the following: a source address of the first multimedia content, a playback status of the first multimedia content, a volume status of the first multimedia content, or playback volume of the first multimedia content.

According to this design, more content included in the first playback information indicates that more information about the multimedia content played on the second device can be provided for the user on the first device. This can bring better use experience to the user, and the user can view more information about the first multimedia content.

In a possible design, a playback progress of the first multimedia content resumed by the first device is the same as the playback progress of the first multimedia content played by the second device.

According to this design, the first device resumes playing the first multimedia content from the same playback progress, and the user does not need to adjust the playback progress any more. Therefore, splicing is more appropriate, and better use experience can be brought to the user.

In a possible design, in response to the first user input performed on the first control, the first device opens an application used to play the first multimedia content.

According to this design, the first device resumes playing the first multimedia content in the application. Optionally, the first device may further resume playing the first multimedia content on the playback control card.

In a possible design, the first interface further displays a second playback control card, and the second playback control card corresponds to second multimedia content played by a third device. For example, the control center interface further displays the second playback control card, and the second playback control card corresponds to an audio played by a smart speaker. In this manner, a plurality of cards can be simultaneously displayed in the control center interface, to facilitate a user operation.

In a possible design, the second device is associated with a first area, the third device is associated with a second area, and display effects of the first playback control card and the second playback control card are determined based on a location relationship between the first device and each of the first area and the second area.

In a possible design, that display effects of the first playback control card and the second playback control card are determined based on a location relationship between the first device and each of the first area and the second area includes: When the first device is located in the first area, a display location of the first playback control card in the first interface is above a display location of the second playback control card.

In a possible design, when the first device is located in the second area, the display location of the second playback control card in the first interface is above the display location of the first playback control card; and the first device displays first prompt information, where the first prompt information is used to indicate whether to resume playing the first multimedia content on the third device.

For example, if a smart television is located in a first room, and a smart projector is located in a second room, when a mobile phone is located in the first room, a playback control card of the smart television is displayed above a playback control card of the smart projector; or when the mobile phone is located in the second room, the playback control card of the smart projector is displayed above the playback control card of the smart television, and after the user stays for a period of time, the user is asked whether playback of multimedia content played on the smart projector needs to be resumed on the smart projector. In this design, the user can adjust an arrangement sequence of the playback control cards in different areas and on electronic devices in the different areas, so that viewing is more convenient, and a user experience effect is better.

In a possible design, the first device sends a playback control command to the second device in response to a second user input performed on the second control. The first device displays first prompt information when the first device does not receive a response message corresponding to the playback control command, where the first prompt information is used to indicate that playback control fails.

In a possible design, the first device detects that the first device is disconnected from the wireless network. The first device displays a third playback control card corresponding to the first multimedia content played by the second device, where the third playback control card includes the first control but does not include the second control.

According to this design, the first playback control card includes the first control (for example, the first control is a playback resume option), and after the first device is disconnected from the network, playback resuming can be further supported in response to an input performed on the first control. After the user is reconnected to the network, the first device may further generate a playback control card. In this case, playback control can be performed on the first multimedia content by using the second control, but a playback resume function is not supported, so that the user can focus on the second device (for example, a smart television), and an experience effect is better.

In a possible design, the first device receives second playback information sent by the second device, where the second device is simultaneously playing the first multimedia content and third multimedia content, and the second playback information corresponds to the third multimedia content played by the second device. The first device displays the first playback control card corresponding to the first multimedia content played by the second device and a third playback control card corresponding to the third multimedia content. In response to a third user input, the first device simultaneously resumes playing the first multimedia content and the third multimedia content.

According to this design, when the second device supports simultaneous playing of a plurality of pieces of multimedia content, the first device can display a plurality of playback control cards for user operations. Therefore, this application is applicable to a case in which the plurality of pieces of multimedia content are played.

For example, a screen area of the second device includes a first screen area and a second screen area. The first screen area plays the first multimedia content, and the second screen area plays the third multimedia content. In other words, the first multimedia content and the third multimedia content are simultaneously played on the second device (for example, when the second device is a television, the user watches the two video programs, that is, the first multimedia content and the third multimedia content, on the television in split-screen mode). In this case, the first device may display the first playback control card corresponding to the first multimedia content played by the second device and the third playback control card corresponding to the third multimedia content. If the first device receives the third user input, the first device may simultaneously play the first multimedia content and the third multimedia content (for example, when the first device is a mobile phone, the user watches the two video programs, that is, the first multimedia content and the third multimedia content, on the mobile phone in split-screen mode in response to the third user input).

In a possible design, the first device receives third playback information sent by a fourth device, where the fourth device is playing the first multimedia content, and the third playback information corresponds to the first multimedia content played by the fourth device. The first device displays a fourth playback control card corresponding to the first multimedia content played by the second device and the fourth device.

In a possible design, a playback progress of the first multimedia content played by the fourth device is the same as the playback progress of the first multimedia content played by the second device.

In a possible design, the first device and the second device log in to a same user account, or example, a Huawei account, an Honor account, or an Apple ID. According to this design, data exchange between the first device and the second device can be more secure, and user privacy can be protected.

In a possible design, the wireless network is a wireless fidelity Wi-Fi network. A Wi-Fi technology is a frequently-used technical means for implementing data exchange between electronic devices in the conventional technology, and the means may be further a Bluetooth (Bluetooth, BT) technology, a near field communication (near field communication, NFC) technology, an ultra-wide band (ultra-wide band, UWB) technology, an infrared (infrared, IR) technology, a ZigBee technology, a general 2.4G/5G frequency band wireless communications technology, or the like. Based on these near field connection technologies, data is not exchanged by using a server and/or a cloud service, so that data transmission is more secure, and user privacy can also be protected.

In a possible design, the first device is a mobile phone, and the second device is a television. In a possible design, the first device is a mobile phone, and the second device is a smart speaker. In a possible design, the first device is a mobile phone, and the second device is a smart projector. In a possible design, the first device is a mobile phone, and the second device is VR glasses.

In a possible design, the first device is a tablet, and the second device is a television. In a possible design, the first device is a tablet, and the second device is a smart speaker. In a possible design, the first device is a tablet, and the second device is a smart projector. In a possible design, the first device is a tablet, and the second device is VR glasses.

In a possible design, this application further includes an electronic device. The electronic device includes a memory and one or more processors. The memory is configured to store computer program code, the computer program code includes computer instructions, and when the computer instructions are executed by the processor, the electronic device is enabled to perform the method for resuming playing multimedia content between devices.

In a possible design, this application further includes a computer-readable storage medium, including computer instructions. When the computer instructions are run on an electronic device, the electronic device is enabled to perform the method for resuming playing multimedia content between devices.

In a possible design, this application further includes a computer program product. When the computer program product runs on a computer, the computer is enabled to perform the method for resuming playing multimedia content between devices.

According to a second aspect, in a system, a second device is configured to: send first playback information to a first device, where the first playback information corresponds to first multimedia content played by the second device, and the first device and the second device are located in a same wireless network. The first device is configured to: display a first playback control card corresponding to the first multimedia content, where the first playback control card includes a first control and a second control, and the second control is used to control playback of the first multimedia content; and in response to a first user input performed on the first control, obtain the first multimedia, content from a server based on the first playback information, and resume playing the first multimedia content based on the first playback information.

Beneficial effects of this application are described in the foregoing part. Details are not described herein again.

DESCRIPTION OF EMBODIMENTS

Figure 1A:
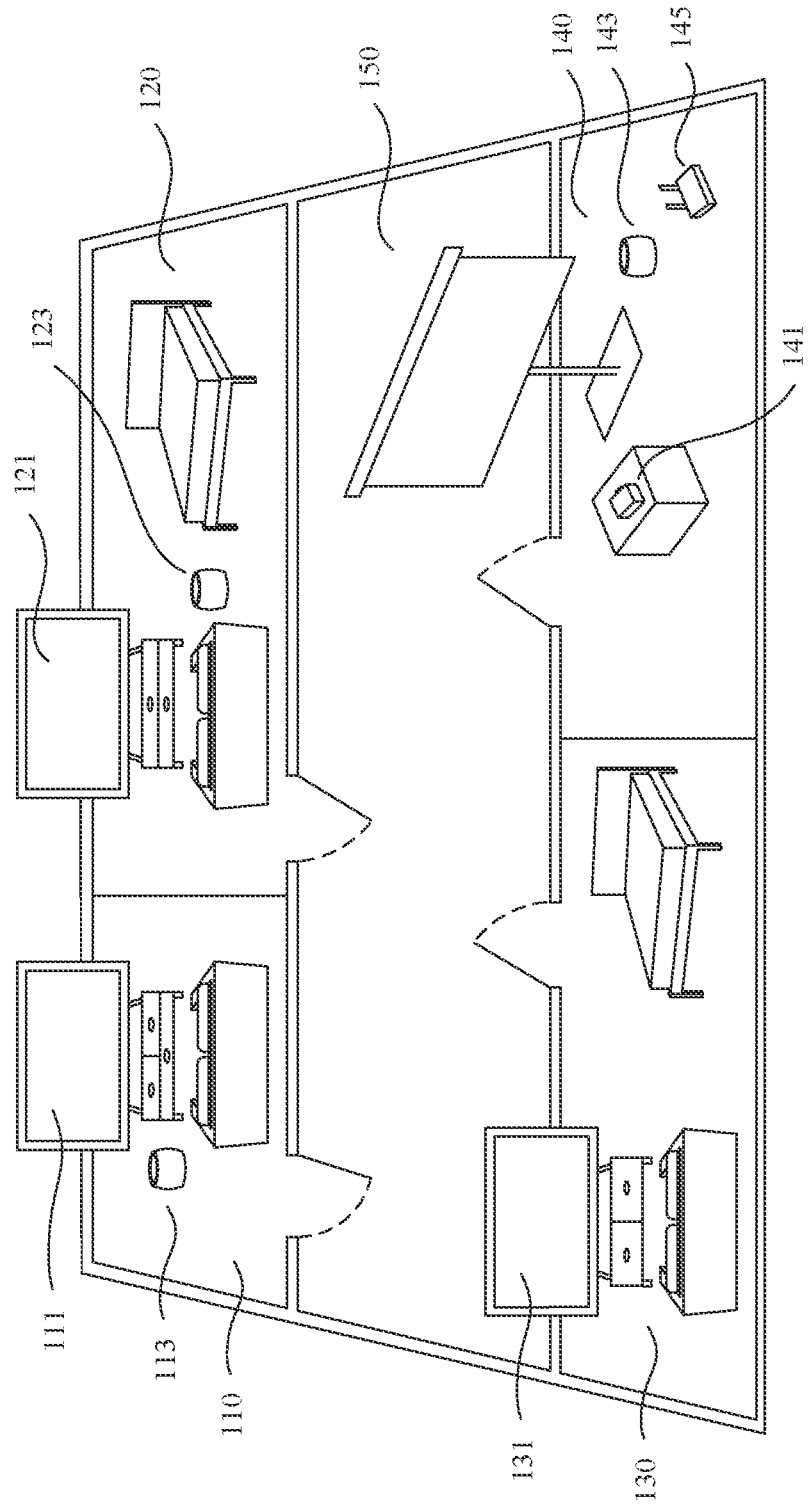
FIG. 1A is a schematic diagram of an example of a home scenario according to some implementation solutions.

The following describes the technical solutions in embodiments of this application with reference to the accompanying drawings in embodiments of this application. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

The terms "first" and "second" mentioned below are merely intended for the purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

With continuous development of terminal technologies and internet of things technologies, a user has increasingly more types of intelligent electronic devices with increasingly more functions. These intelligent electronic devices have a data processing function and also have a communication function. In some possible implementation solutions, an intelligent multimedia playback device is an intelligent electronic device that can play multimedia content (for example, a picture, an audio, or a video), for example, a smart speaker, a smart television, a smart projector, smart VR glasses, or a smart vehicle-mounted display. The multimedia content is optionally stored in the intelligent multimedia playback device, or optionally shared by another intelligent electronic device and the intelligent multimedia playback device, or optionally obtained by the intelligent multimedia playback device from a server.

In addition to playing the multimedia content, the intelligent multimedia playback device can further exchange data with another intelligent electronic device by using a communication function of the intelligent multimedia playback device. A user may control and/or manage the intelligent multimedia playback device by using a portable electronic device (for example, a mobile phone, a tablet, or a wearable device). In some possible implementation solutions, the intelligent multimedia playback device may also be a portable electronic device.

In some possible implementation solutions, the intelligent multimedia playback device can log in to an account, and when the portable electronic device and the intelligent multimedia playback device log in to the same account, the devices can exchange data. In some other implementation solutions, the intelligent multimedia playback device cannot log in to an account, and the portable electronic device optionally does not need to verify the account, and exchanges data with the device.

In some possible implementation solutions, the intelligent multimedia playback device can optionally support playback of one type of multimedia content. For example, a smart speaker can support playback of an audio file. In some other implementation solutions, the intelligent multimedia playback device can support playback of a plurality of types of multimedia content. For example, a smart television can support playback of a picture, an audio file, and a video file.

It may be understood that establishing a connection relationship between devices is a prerequisite for performing data exchange. In the conventional technology, in consideration of factors of security and device costs, an intelligent multimedia playback device usually includes a wireless communications module, and establishes a near field connection to another intelligent multimedia playback device and/or a portable electronic device by using the wireless communications module. After the near field connection is established, the devices can exchange data. A technology for establishing the near field connection includes but is not limited to a wireless local area network (wireless local area network, WLAN) (for example, wireless fidelity (wireless fidelity, Wi-Fi)), a Bluetooth (Bluetooth, BT) technology, a near field communication (near field communication, NFC) technology, an ultra-wide band (ultra-wide band, UWB) technology, an infrared (infrared, IR) technology, a ZigBee technology, a general 2.4G/5G frequency band wireless communications technology, and the like.

In some possible implementation solutions, a representation form of the near field connection is that data exchange is performed between devices, and direct transmission is optionally performed between the devices, or indirect transmission is optionally performed between the devices. In this interaction manner, data is not transmitted through a cloud platform or a server. The near field connection can ensure data security to some extent, and is especially applicable to transmission of some data involving user privacy.

An embodiment of this application describes a method for resuming playing multimedia content between devices. The following uses a home scenario as an example scenario for description, and uses a WLAN as an example technology for establishing a near field connection.

In some possible implementation solutions, the home scenario is optionally divided into one or more areas, and the one or more areas optionally include one or more intelligent multimedia playback devices. FIG. 1A shows an example of a home scenario 100. The home scenario 100 is optionally divided into five areas: a first room 110, a second room 120, a third room 130, a fourth room 140, and a corridor 150 connecting the foregoing rooms. In terms of a type of an intelligent multimedia playback device and a quantity of intelligent multimedia playback devices, the first room 110 optionally includes a smart television 111 and a smart speaker 113, the second room 120 optionally includes a smart television 121 and a smart speaker 123, the third room 130 optionally includes a smart television 131, and the fourth room 140 optionally includes a smart projector 141 and a smart speaker 143. The foregoing intelligent multimedia playback devices are located in a same WLAN, and the WLAN is optionally provided by a router 145 in the fourth room 140 in FIG. 1A.

Figure 1B:
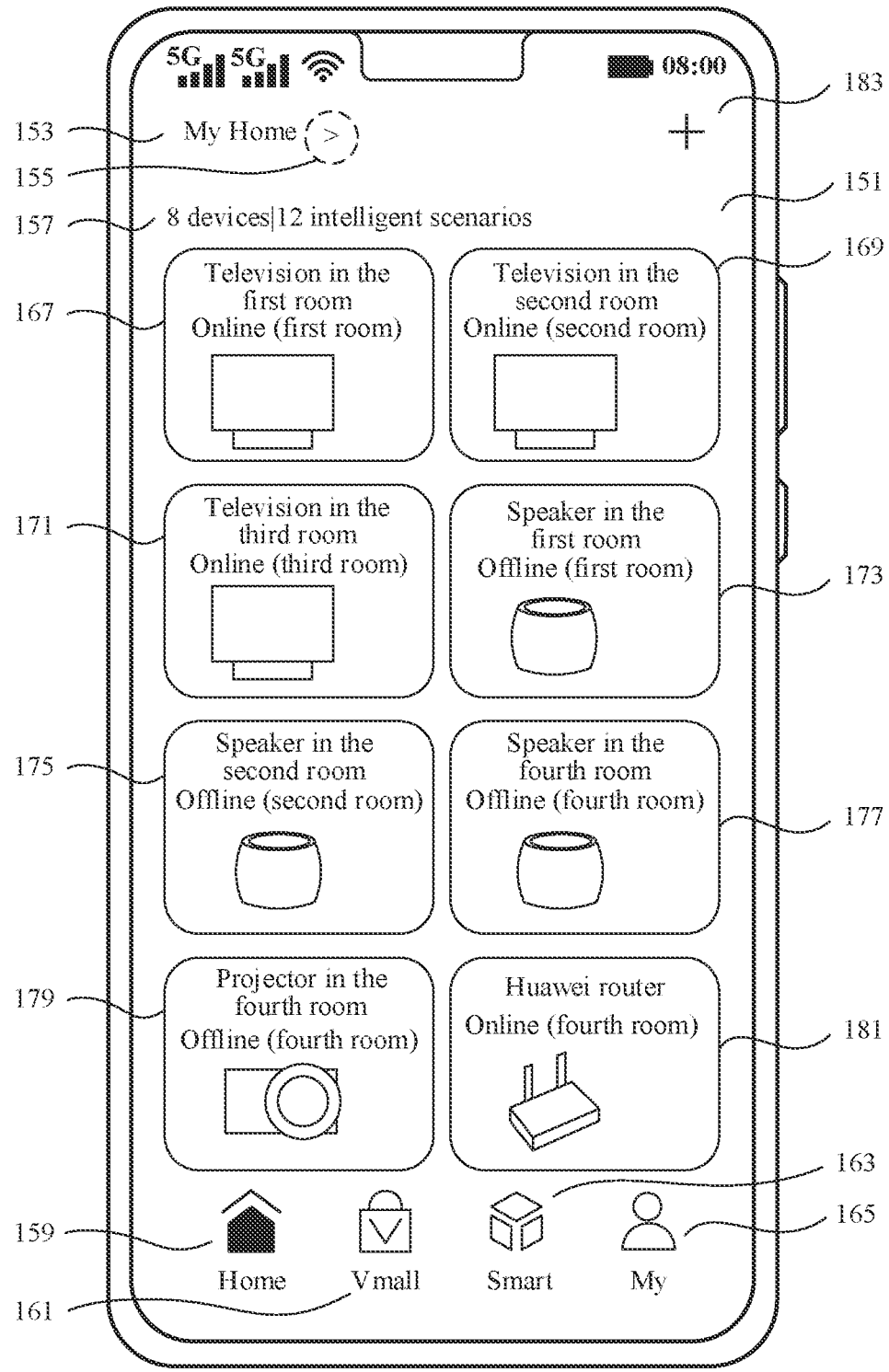
FIG. 1B is a diagram of an example of a user interface of an application according to some implementation solutions.

In some possible implementation solutions, an application is installed in a portable electronic device of a user as a manner of controlling and/or managing an intelligent multimedia playback device. The following uses an "AI Life" application provided by Huawei Technologies Co., Ltd. (Huawei Technologies Co., Ltd.) as an example for description. It may be understood that, in addition to controlling and/or managing the intelligent multimedia playback device, the application may be further used to control and/or manage another type of intelligent electronic device, for example, a smart home device. FIG. 1B is a diagram of an example of a user interface 151 of an "AI Life" application according to some implementation solutions.

The user interface 151 optionally includes a home scenario name 153 (an example of the home scenario name 153 herein is "My Home"). When a portable electronic device detects an operation that a user taps an icon 155 after the home scenario name 153, the application is optionally used by the user to modify the home scenario name 153, and optionally used by the user to set a room in the home scenario 100 by using a "room management" option, for example, add a room, delete a room, or change a room name.

In some possible implementation solutions, the room described herein is generated based on a real room, for example, a room obtained through calculation after the user establishes a grid map/point cloud map of the home scenario 100 in the "AI Life" application. In some other implementation solutions, the room described herein is virtual, and is a virtual location tag established by the user based on a requirement of the user. The intelligent electronic device in the home scenario 100 has a virtual location tag that can be configured by the user, and intelligent electronic devices having a same virtual location tag are located in a same virtual room.

The user interface 151 optionally includes an indicator 157 indicating a quantity of intelligent electronic devices in the home scenario 100 and a quantity of intelligent scenarios (an example of the home scenario 100 herein is "8 devices|12 intelligent scenarios").

The user interface 151 optionally includes a total of four icons that can respond to a user operation: a "Home" icon 159, a "Vmall" icon 161, a "Smart" icon 163, and a "My" icon 165. When detecting an operation that the user taps the icon, the portable electronic device jumps to an interface corresponding to the icon. FIG. 1B shows an interface corresponding to the "Home" icon 159. In this case, the "Home" icon 159 is optionally selected (an example in which the icon is selected herein is represented as that the "Home" icon 159 is filled).

In the interface corresponding to the "Home" icon 159, each intelligent electronic device that is in the home scenario 100 and that is associated with the "AI Life" application generates a card, and optionally, the user views, in the card, a device name, a device status, and a room in which the intelligent electronic device is located. The device name is optional, and may be independently set based on a preference of the user.

In some possible implementation solutions, the device status optionally includes two states: an online state and an offline state. The online state optionally means that the device is powered on and is in a WLAN. For example, in the home scenario 100 in FIG. 1A, the smart television 111 is powered on and accesses a WLAN provided by the router 145, and the smart television 111 is optionally in a standby state/playing state/pause state. The offline state optionally means that the device is powered off and/or is not in a WLAN. For example, in the home scenario 100 in FIG. 1A, the smart television 111 is in a powered-off state and/or the smart television 111 does not access the WLAN provided by the router 145.

The following describes cards corresponding to the intelligent multimedia playback devices in the example of the home scenario 100 in the interface corresponding to the "Home" icon 159.

The smart television 111 located in the first room 110 corresponds to a card 167 shown in FIG. 1B, where "Television in the first room" is a name of the smart television 111, "Online" is a device status of the smart television 111, and "First room" is a room in which the smart television 111 is located.

The smart television 121 located in the second room 120 corresponds to a card 169 shown in FIG. 1B, where "Television in the second room" is a name of the smart television 121, "Online" is a device status of the smart television 121, and "Second room" is a room in which the smart television 121 is located.

The smart television 131 located in the third room 130 corresponds to a card 171 shown in FIG. 1B, where "Television in the third room" is a name of the smart television 131, "Online" is a device status of the smart television 131, and "Third room" is a room in which the smart television 131 is located.

The smart speaker 113 located in the first room 110 corresponds to a card 173 shown in FIG. 1B, where "Speaker in the first room" is a name of the smart speaker 113, "Offline" is a device status of the smart speaker 113, and "First room" is a room in which the smart speaker 113 is located.

The smart speaker 123 located in the second room 120 corresponds to a card 175 shown in FIG. 1B, where "Speaker in the second room" is a name of the smart speaker 123, "Offline" is a device status of the smart speaker 123, and "Second room" is a room in which the smart speaker 123 is located.

The smart speaker 143 located in the fourth room 140 corresponds to a card 177 shown in FIG. 1B, where "Speaker in the fourth room" is a name of the smart speaker 143, "Offline" is a device status of the smart speaker 143, and "Fourth room" is a room in which the smart speaker 143 is located.

The smart projector 141 located in the fourth room 140 corresponds to a card 179 shown in FIG. 1B, where "Projector in the fourth room" is a name of the smart projector 141, "Offline" is a device status of the smart projector 141, and "Fourth room" is a room in which the smart projector 141 is located.

In addition to the intelligent multimedia playback device, the intelligent electronic device may also generate a card in the interface corresponding to the "Home" icon 159. For example, the router 145 located in the fourth room 140 corresponds to a card 181 shown in FIG. 1B, where "Huawei router" is a name of the router 145, "Online" is a device status of the router 145, and "Fourth room" is a room in which the router 145 is located.

In an interface corresponding to the "Vmall" icon 161, the user may view and/or purchase an intelligent multimedia playback device and another type of intelligent electronic device on the market.

To implement intelligent running of the intelligent electronic device and improve user experience, the "AI Life" application optionally provides a function of setting an intelligent scenario for the user, for example, a go home scenario (the user turns on the smart television 111 and the smart speaker 113 after going home) and a leave home scenario (the user turns off all the intelligent multimedia playback devices after leaving home).

In some possible implementation solutions, an intelligent scenario is optionally classified into a manual scenario and an automatic scenario in an execution manner. The manual scenario means that after the user sets scenario parameters, the user needs to manually start/stop the intelligent scenario. The automatic scenario means that after the user sets scenario parameters, the intelligent scenario automatically starts/stops based on some conditions (for example, WLAN connection/disconnection and local time). The scenario parameters are optionally start/stop and/or running parameters of one or more devices.

In an interface corresponding to the "Smart" icon 163, the "AI Life" application is optionally used by the user to view an existing intelligent scenario, optionally used by the user to add/delete an intelligent scenario, and optionally used by the user to set scenario parameters of one or more intelligent scenarios.

In an interface corresponding to the "My" icon 163, the "AI Life" application is used by the user to perform account-related settings, for example, log in to an account, modify an account, and log out of an account.

In some possible implementation solutions, when the portable electronic device detects an operation that the user taps a "More" icon 183, more options appear, for example, "Add a device", "Create smart", and "Connect to a third-party platform".

The "Add a device" option is optionally used by the user to add and associate with a new intelligent electronic device.

A "Share a device" option is optionally used by the user to share control rights of one or more intelligent electronic devices in the home scenario 100 with another user, so that the another user manages and/or controls the shared one or more intelligent electronic devices, to meet a requirement of the home scenario 100 for multi-user use.

The "Connect to a third-party platform" option is optionally used by the user to associate an account in another application used to manage a smart home device with the "AI Life" application, so that the "AI Life" application can manage more intelligent electronic devices.

The foregoing describes an example of the home scenario 100 and an example of a schematic diagram of an interface of an application used to control and/or manage an intelligent multimedia playback device in this application. The following describes hardware structures of a portable electronic device and an intelligent multimedia playback device.

In some possible implementation solutions, the portable electronic device includes but is not limited to a mobile phone, a tablet computer, an intelligent wearable device (for example, a headset, a watch, or a band), and the like.

Figure 2A:
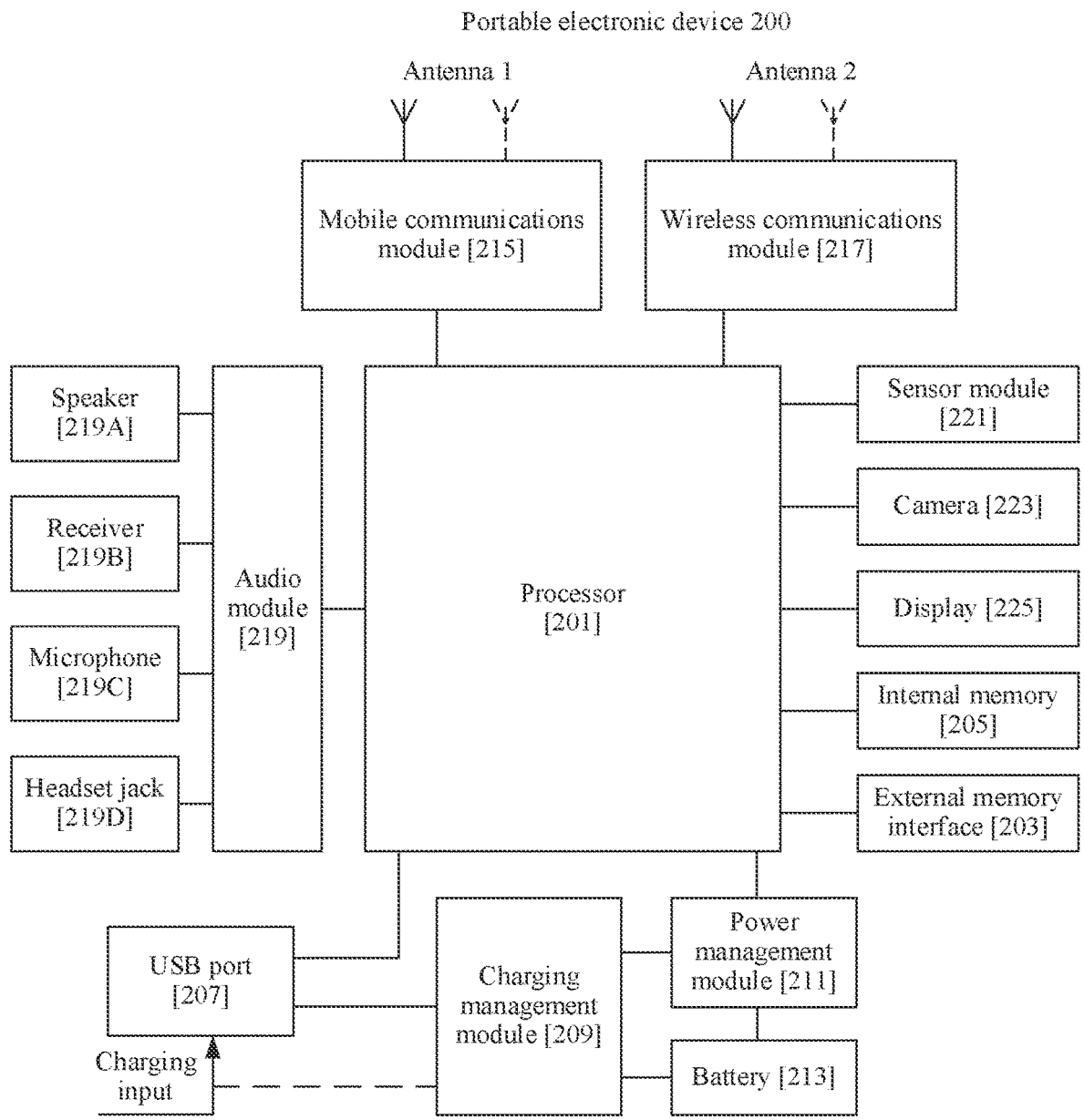
FIG. 2A is a diagram of a hardware structure of a portable electronic device according to some implementation solutions.

FIG. 2A is a schematic diagram of a structure of a portable electronic device 200 according to some implementation solutions. The portable electronic device 200 may include a processor 201, an external memory interface 203, an internal memory 205, a universal serial bus (universal serial bus, USB) port 207, a charging management module 209, a power management module 211, a battery 213, an antenna 1, an antenna 2, a mobile communications module 215, a wireless communications module 217, an audio module 219, a speaker 219A, a receiver 219B, a microphone 219C, a headset jack 21917, a sensor module 221, a camera 223, a display 225, and the like.

It may be understood that the structure shown in this embodiment of this application does not constitute a specific limitation on the portable electronic device 200. In some other embodiments of this application, the portable electronic device 200 may include more or fewer components than those shown in the figure, or combine some components, or split some components, or have different component arrangements. The components shown in the figure may be implemented by hardware, software, or a combination of software and hardware.

In some possible implementation solutions, the mobile phone may include a processor 201, an external memory interface 203, an internal memory 205, a universal serial bus (universal serial bus, USB) port 207, a charging management module 209, a power management module 211, a battery 213, an antenna 1, an antenna 2, a mobile communications module 215, a wireless communications module 217, an audio module 219, a speaker 219A, a receiver 219B, a microphone 219C, a headset jack 219D, a sensor module 221, a camera 223, a display 225, and the like.

In some possible implementation solutions, the tablet computer may include a processor 201, an external memory interface 203, an internal memory 205, a universal serial bus (universal serial bus USB) port 207, a charging management module 209, a power management module 211, a battery 213, a wireless communications module 217, an audio module 219, a speaker 219A, a receiver 219B, a microphone 219C, a headset jack 219D, a sensor module 221, a camera 223, a display 225, and the like.

The processor 201 may include one or more processing units. For example, the processor 201 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

A memory may be further disposed in the processor 201, and is configured to store instructions and data. In some possible implementation solutions, the memory in the processor 201 is a cache. The memory may store instructions or data just used or cyclically used by the processor 201. If the processor 201 needs to use the instructions or the data again, the processor may directly invoke the instruction or the data from the memory. This avoids repeated access and reduces waiting time of the processor 201, to improve system efficiency.

In some possible implementation solutions, the processor 201 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The charging management module 209 is configured to receive a charging input from the charger. The charger may be a wireless charger or a wired charger. In some embodiments of wired charging, the charging management module 209 may receive a charging input from the wired charger through the USB port 207. In some embodiments of wireless charging, the charging management module 209 may receive a wireless charging input through a wireless charging coil of the portable electronic device 200. When charging the battery 213, the charging management module 209 may further supply power to the portable electronic device 200 by using the power management module 211.

The power management module 211 is configured to connect to the battery 213, the charging management module 209, and the processor 201. The power management module 211 receives an input from the battery 213 and/or the charging management module 209, and supplies power to the processor 201, the internal memory 205, the external memory, the display 225, the camera 223, the wireless communications module 217, and the like. The power management module 211 may be further configured to monitor parameters such as a battery capacity, a battery cycle count, and a battery health status (electric leakage or impedance). In some other embodiments, the power management module 211 may alternatively be disposed in the processor 201. In some other embodiments, the power management module 211 and the charging management module 209 may alternatively be disposed in a same device.

A wireless communication function of the portable electronic device 200 may be implemented by using the antenna 1, the antenna 2, the mobile communications module 215, the wireless communications module 217, the modem processor, the baseband processor, and the like.

The antenna 1 and the antenna 2 are configured to: transmit and receive an electromagnetic wave signal. Each antenna in the portable electronic device 200 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 215 may provide a wireless communication solution that includes 2G/3G/4G/5G or the like and that is applied to the portable electronic device 200. The mobile communications module 215 may include at least one filter, a switch, a power amplifier, a low noise amplifier (low noise amplifier, LNA), and the like. The mobile communications module 215 may receive an electromagnetic wave through the antenna 1, perform processing such as filtering and amplification on the received electromagnetic wave, and transmit a processed electromagnetic wave to the modem processor for demodulation. The mobile communications module 215 may further amplify a signal modulated by the modem processor, and convert an amplified signal into an electromagnetic wave for radiation through the antenna 1. In some possible implementation solutions, at least some functional modules in the mobile communications module 215 may be disposed in the processor 201. In some possible implementation solutions, at least some functional modules in the mobile communications module 215 may be disposed in a same device as at least some modules in the processor 201.

The wireless communications module 217 may provide a wireless communication solution that includes a wireless local area network wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the portable electronic device 200. The wireless communications module 217 may be one or more devices that integrate at least one communications processor module. The wireless communications module 217 receives an electromagnetic wave through the antenna 2, performs frequency modulation and filtering processing on the electromagnetic wave signal, and sends a processed signal to the processor 201. The wireless communications module 217 may further receive a to-be-sent signal from the processor 201, perform frequency modulation and amplification on the signal, and convert a processed signal into an electromagnetic wave for radiation through the antenna 2.

In some possible implementation solutions, in the portable electronic device 200, the antenna 1 and the mobile communications module 215 are coupled, and the antenna 2 and the wireless communications module 217 are coupled, so that the portable electronic device 200 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The portable electronic device 200 implements a display function by using the GPU, the display 225, the application processor, and the like. The GPU is a microprocessor for image processing, and is connected to the display 225 and the application processor. The GPU is configured to: perform mathematical and geometric computation, and render an image. The processor 201 may include one or more GPUs that execute program instructions to generate or change display information.

The display 225 is configured to display an image, a video, and the like. The display 225 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some possible implementation solutions, the portable electronic device 200 may include one or more displays 225.

The portable electronic device 200 may implement a photographing function by using the ISP, the camera 223, the video codec, the GPU, the display 225, the application processor, and the like.

The ISP is configured to process data fed back by the camera 223. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some possible implementation solutions, the ISP may be disposed in the camera 223.

The camera 223 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some possible implementation solutions, the portable electronic device 200 may include one or more cameras 223.

The digital signal processor is configured to process a digital signal, and may further process another digital signal in addition to the digital image signal. For example, when the portable electronic device 200 selects a frequency, the digital signal processor is configured to perform Fourier transform or the like on frequency energy.

The video codec is configured to: compress or decompress a digital video. The portable electronic device 200 may support one or more video codecs. In this way, the portable electronic device 200 may play or record videos in a plurality of coding formats, for example, moving picture experts group (moving picture experts group, MPEG)-1, MPEG-2, MPEG-3, and MPEG-4.

The external memory interface 203 may be configured to connect to an external storage card such as a micro SD card, to extend a storage capability of the portable electronic device 200. The external storage card communicates with the processor 201 through the external memory interface 203, to implement a data storage function. For example, files such as music and videos are stored in the external storage card.

The internal memory 205 may be configured to store computer executable program code. The executable program code includes instructions. The processor 201 performs various function applications of the portable electronic device 200 and data processing by running the instructions stored in the internal memory 205. The internal memory 205 may include a program storage area and a data storage area. The program storage area may store an operating system, an application required by at least one function (for example, a voice playing function or an image playing function), and the like. The data storage area may store data (for example, audio data and an address book) and the like created during use of the portable electronic device 200. In addition, the internal memory 205 may include a high-speed random access memory, and may further include a nonvolatile memory, for example, at least one magnetic disk storage device, a flash memory device, or a universal flash storage (universal flash storage, UFS).

The portable electronic device 200 may implement audio functions, for example, an audio file playing function and a recording function, by using the audio module 219, the speaker 219A, the receiver 219B, the microphone 219C, the headset jack 219D, the application processor, and the like.

The audio module 219 is configured to convert digital audio information into an analog audio signal for output, and is also configured to convert an analog audio input into a digital audio signal. The audio module 219 may be further configured to: code and decode an audio signal. In some possible implementation solutions, the audio module 219 may be disposed in the processor 201, or some functional modules of the audio module 219 are disposed in the processor 201.

The speaker 219A, also referred to as a "horn", is configured to convert an audio electrical signal into a sound signal. The portable electronic device 200 may be used to listen to music or answer a call in a hands-free mode over the speaker 219A.

The receiver 219B, also referred to as an "earpiece", is configured to convert an audio electrical signal into a sound signal. When a call is answered or voice information is received by using the portable electronic device 200, the receiver 219B may be put close to a human ear to listen to a voice.

The microphone 219C, also referred to as a "mike" or a "mic", is configured to convert a sound signal into an electrical signal. When making a call or sending voice information, the user may make a sound by moving a human mouth close to the microphone 219C to input a sound signal to the microphone 219C. At least one microphone 219C may be disposed in the portable electronic device 200. In some other embodiments, two microphones 219C may be disposed in the portable electronic device 200, to implement a noise reduction function in addition to collecting a sound signal. In some other embodiments, three, four, or more microphones 219C may alternatively be disposed in the portable electronic device 200, to collect a sound signal, reduce noise, identify a sound source, implement a directional recording function, and the like.

The headset jack 219D is configured to connect to a wired headset. The headset jack 219D may be the USB port 207, or may be a 3.5 mm open mobile terminal platform (open mobile terminal platform, OMTP) standard interface or cellular telecommunications industry association of the USA (cellular telecommunications industry association of the USA, CTIA) standard interface.

The sensor module 221 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

Certainly, the portable electronic device 200 may further include one or more components such as a button, a motor, an indicator, and a SIM card interface. This is not limited in this embodiment of this application.

Figure 2B:
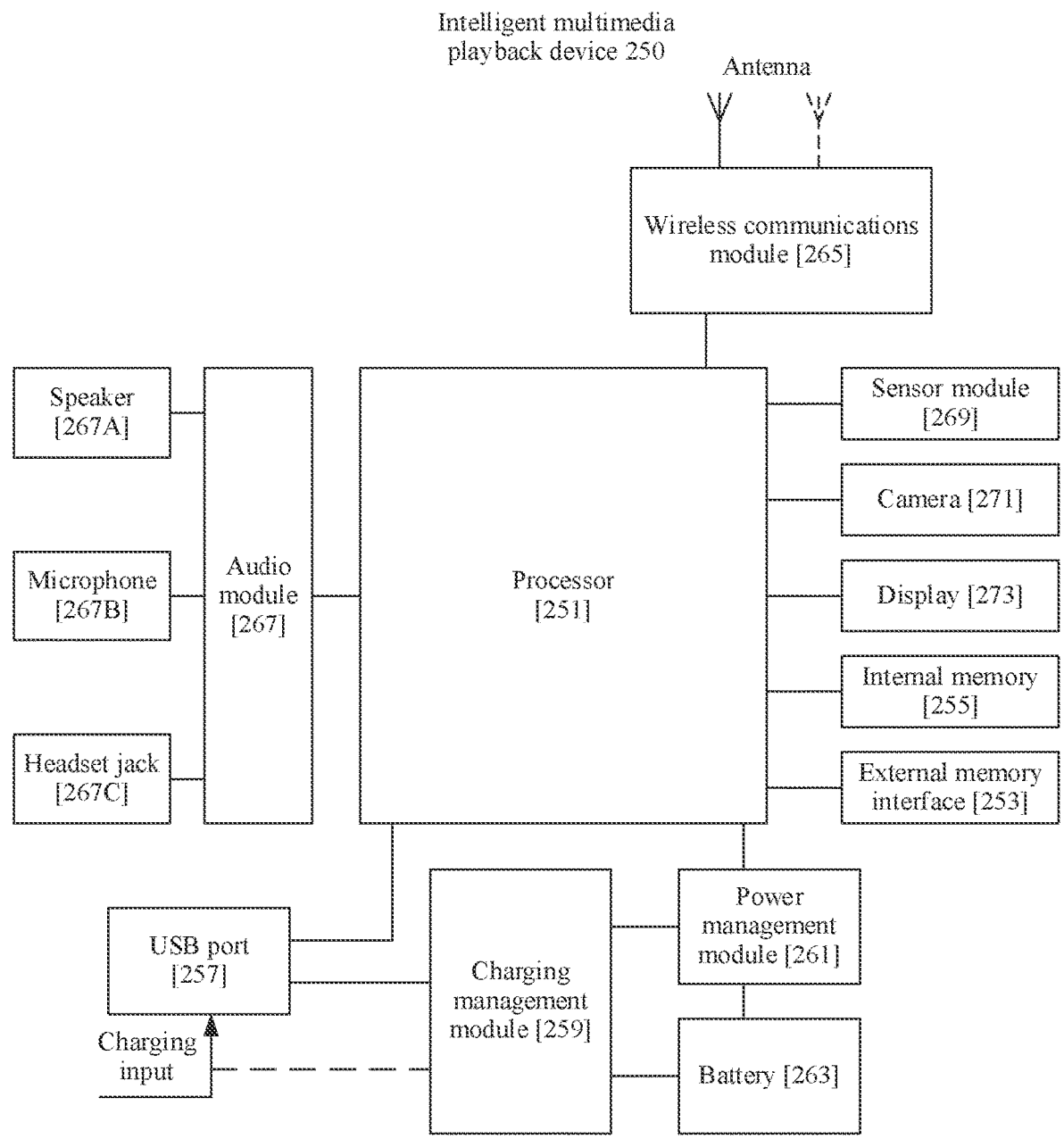
FIG. 2B is a diagram of a hardware structure of an intelligent multimedia playback device according to some implementation solutions.

FIG. 2B is a schematic diagram of a structure of an intelligent multimedia playback device 250 according to some implementation solutions. The intelligent multimedia playback device 250 may include a processor 251, an external memory interface 253, an internal memory 255, a universal serial bus (universal serial bus USB) port 257, a charging management module 259, a power management module 261, a battery 263, an antenna, a wireless communications module 265, an audio module 267, a speaker 267A, a microphone 267B, a headset jack 267C, a sensor module 269, a camera 271, a display 273, and the like.

It may be understood that the structure shown in this embodiment of this application does not constitute a specific limitation on the intelligent multimedia playback device 250. In some other embodiments of this application, the intelligent multimedia playback device 250 may include more or fewer components than those shown in the figure, or may combine some components, or may split some components, or may have different component arrangements. The components shown in the figure may be implemented by hardware, software, or a combination of software and hardware.

In some possible implementation solutions, a smart speaker optionally includes a wired Bluetooth speaker and a wireless Bluetooth speaker. The wired Bluetooth speaker may include a processor 251, an external memory interface 253, an internal memory 255, a charging management module 259, a power management module 261, a wireless communications module 265, an audio module 267, a speaker 267A, a microphone 267B, a sensor module 269, and the like. Compared with the wired Bluetooth speaker, the wireless Bluetooth speaker may further include a battery 263 and the like in addition to the foregoing components.

In some possible implementation solutions, a smart television may include a processor 251, an external memory interface 253, an internal memory 255, a universal serial bus (universal serial bus, USB) port 257, a charging management module 259, a power management module 261, a wireless communications module 265, an audio module 267, a speaker 267A, a microphone 267B, a headset jack 267C, a sensor module 269, a camera 271, a display 273, and the like.

The processor 251 may include one or more processing units. For example, the processor 251 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

A memory may be further disposed in the processor 251, and is configured to store instructions and data. In some possible implementation solutions, the memory in the processor 251 is a cache. The memory may store instructions or data just used or cyclically used by the processor 251. If the processor 251 needs to use the instructions or the data again, the processor may directly invoke the instructions or the data from the memory. This avoids repeated access and reduces waiting time of the processor 251, to improve system efficiency.

In some possible implementation solutions, the processor 251 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The charging management module 259 is configured to receive a charging input from the charger. The charger may be a wireless charger or a wired charger. In some embodiments of wired charging, the charging management module 259 may receive a charging input from the wired charger through the USB port 257. In some embodiments of wireless charging, the charging management module 259 may receive a wireless charging input through a wireless charging coil of the intelligent multimedia playback device 250. When charging the battery 263, the charging management module 259 may further supply power to the intelligent multimedia playback device 250 by using the power management module 261.

The power management module 261 is configured to connect to the battery 263, the charging management module 259, and the processor 251. The power management module 261 receives an input from the battery 263 and/or the charging management module 259, and supplies power to the processor 251, the internal memory 255, the external memory, the display 273, the camera 271, the wireless communications module 265, and the like. The power management module 261 may be further configured to monitor parameters such as a battery capacity, a battery cycle count, and a battery health status (electric leakage or impedance). In some other embodiments, the power management module 261 may alternatively be disposed in the processor 251. In some other embodiments, the power management module 261 and the charging management module 259 may alternatively be disposed in a same device.

A wireless communication function of the intelligent multimedia playback device 250 may be implemented by using the antenna, the wireless communications module 265, and the like. The wireless communications module 265 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the intelligent multimedia playback device 250. The wireless communications module 265 may be one or more devices that integrate at least one communications processor module. The wireless communications module 265 receives an electromagnetic wave through the antenna, performs frequency modulation and filtering processing on an electromagnetic wave signal, and sends a processed signal to the processor 251. The wireless communications module 265 may further receive a to-be-sent signal from the processor 251, perform frequency modulation and amplification on the signal, and convert a processed signal into an electromagnetic wave for radiation through the antenna.

The display 273 of the intelligent multimedia playback device 250 is driven by using a display driver chip, and is configured to display an image, a video, and the like. The display 273 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some possible implementation solutions, the intelligent multimedia playback device 250 may include one or more displays 273.

The external memory interface 253 may be configured to connect to an external storage card, for example, a micro SD card, to extend a storage capability of the intelligent multimedia playback device 250. The external storage card communicates with the processor 251 through the external memory interface 253, to implement a data storage function. For example, files such as music and videos are stored in the external storage card.

The internal memory 255 may be configured to store computer executable program code. The executable program code includes instructions. The processor 251 performs various function applications of the intelligent multimedia playback device 250 and data processing by running the instructions stored in the internal memory 255. The internal memory 255 may include a program storage area and a data storage area. The program storage area may store an operating system, an application required by at least one function (for example, a voice playing function or an image playing function), and the like. The data storage area may store data (for example, audio data and an address book) and the like created during use of the intelligent multimedia playback device 250. In addition, the internal memory 255 may include a high-speed random access memory, and may further include a nonvolatile memory, for example, at least one magnetic disk storage device, a flash memory device, or a universal flash storage (universal flash storage, UFS).

The intelligent multimedia playback device 250 may implement audio functions, for example, music playing and recording, by using the audio module 267, the speaker 267A, the microphone 267B, the headset jack 267C, the application processor, and the like.

The audio module 267 is configured to convert digital audio information into an analog audio signal output, and is also configured to convert an analog audio input into a digital audio signal. The audio module 267 may be further configured to: code and decode an audio signal. In some possible implementation solutions, the audio module 267 may be disposed in the processor 251, or some functional modules of the audio module 267 are disposed in the processor 251.

The speaker 267A, also referred to as a "horn", is configured to convert an audio electrical signal into a sound signal. The intelligent multimedia playback device 250 may play multimedia content by using the speaker 267A.

The microphone 267B, also referred to as a "mike" or a "mic", is configured to convert a sound signal into an electrical signal. When making a call or sending voice information, the user may make a sound by moving a human mouth close to the microphone 267B to input a sound signal to the microphone 267B. At least one microphone 267B may be disposed in the intelligent multimedia playback device 250. In some other embodiments, two microphones 267B may be disposed in the intelligent multimedia playback device 250, to implement a noise reduction function in addition to collecting a sound signal. In some other embodiments, three, four, or more microphones 267B may alternatively be disposed in the intelligent multimedia playback device 250, to collect a sound signal, reduce noise, identify a sound source, implement a directional recording function, and the like.

The sensor module 269 may include a pressure sensor, a gyro sensor, a magnetic sensor, a distance sensor, an optical proximity sensor, a fingerprint sensor, a touch sensor, an ambient light sensor, and the like.

The foregoing describes the hardware structures of the portable electronic device 200 and the intelligent multimedia playback device 250. The following describes a software implementation of this application. A mobile phone is used in an embodiment of the portable electronic device 200 for description.

Figure 3A:
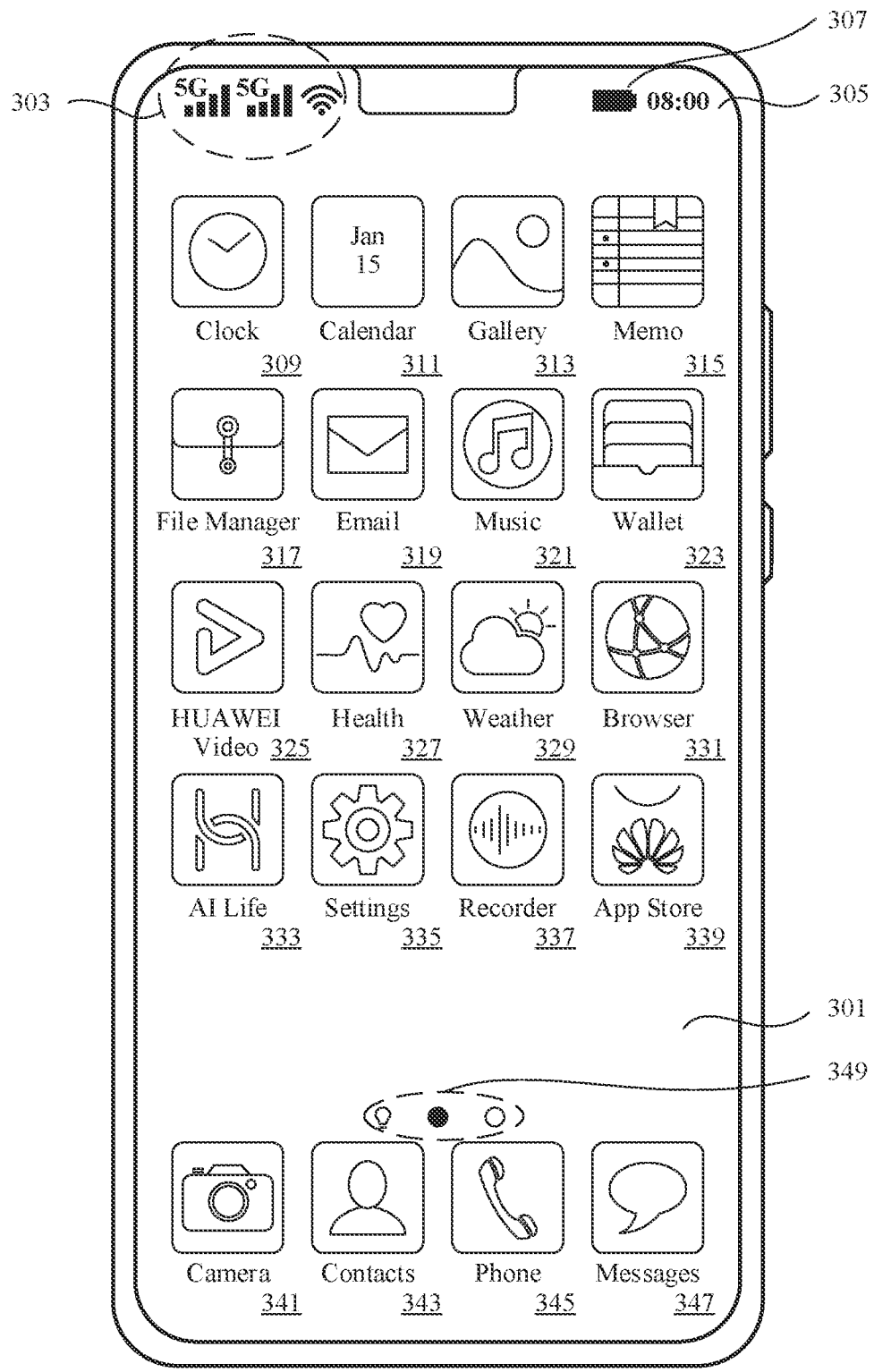
FIG. 3A is a diagram of an example of a user interface of a portable electronic device according to some implementation solutions.

FIG. 3A shows an example of a user interface 301 of a portable electronic device 200 according to some implementation solutions. The user interface 301 is optionally displayed on a display 225 of the portable electronic device 200.

In some possible implementation solutions, the user interface 301 optionally includes the following elements, a subset thereof, or a superset thereof:
- an icon that is fixed on a status bar at the top of the user interface 301 and that is used to indicate a status of the portable electronic device: one or more signal strength (for example, mobile network or Wi-Fi) indicators 303, current time 305, and a battery level indicator 307 used to indicate a battery level of a battery 213;
- applications on a home screen: Clock 309, Calendar 311, Gallery 313, Memo 315, File Manager 317, Email 319, Music 321, Wallet 323, Huawei Video 325, Health 327, Weather 329, Browser 331, AI Life 333, Settings 335, Recorder 337, and App Store 339.
- frequently-used applications fixed at the bottom of the user interface 301: Camera 341, Contacts 343, Phone 345, and Messages 347; and
- an indicator 349 indicating a current interface.

It may be understood that the applications on the home screen include Clock 309, Calendar 311, Gallery 313, Memo 315, File Manager 317, Email 319, Music 321, Wallet 323, Huawei Video 325, Health 327, Weather 329, Browser 331, AI Life 333, Settings 335, Recorder 337, and App Store 339. When the user interface 301 is in another interface used to display an application, the indicator 349 indicating the current interface points to the switched interface, the icon fixed on the status bar at the top of the user interface 301 remains unchanged, and the frequently-used applications fixed at the bottom of the user interface 301 remains unchanged.

It may be understood that the foregoing application and a displayed icon of the application are merely examples, and may be another application and/or another icon.

In some possible implementation solutions, when detecting an operation that a user taps an application, the portable electronic device 200 opens the application and displays a running interface of the application. For example, when detecting an operation that the user taps an icon of AI Life 333, the portable electronic device 200 optionally displays an example user interface 151 shown in FIG. 1B.

A card is an interaction design module that is configured to display information and that has a closed shape, and is usually configured to display information about a system/an application. Optionally, a convenient manner is provided for the user to interact with the system/the application. In a visual design, the card has a flexible size. The card is used as an information carrier, so that an operation is convenient and user experience can be improved.

It may be understood that using a card between a plurality of devices on which different systems are installed can further improve compatibility between the different systems. A system of each device generates a card shape according to a rule of the system, processes data using a same data structure, and displays the data in a card.

In some possible implementation solutions, a control center interface/notification center interface optionally provides device system information (for example, time, a weather, and a battery level) for the user, and optionally provides application information (for example, a notification pushed by an application and a status of the application) for the user. Optionally, the user completes some shortcut operations in the control center interface/notification center interface. In some possible implementation solutions, the card is optionally displayed in a control center interface notification center interface of the portable electronic device 200. The control center interface is used as an example for description in this embodiment of this application.

In some possible implementation solutions, the control center interface may be triggered and displayed by detecting a gesture of the user. For example, the portable electronic device 200 in FIG. 3B detects a sliding gesture from left to right in the user interface 301, to obtain an example control center interface 353 in FIG. 3C.

Figure 3B:
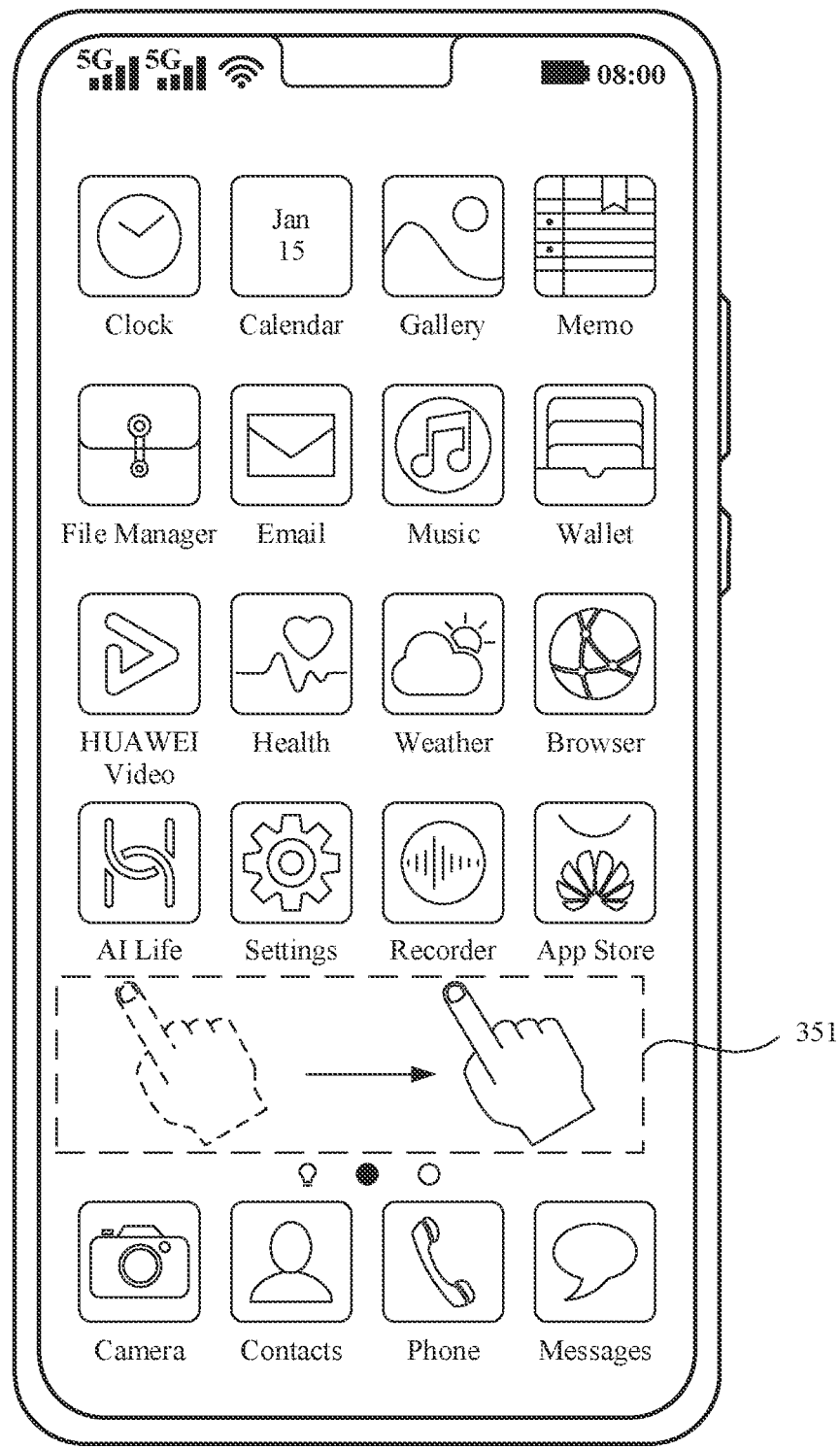
FIG. 3B is a schematic diagram of detecting a user operation gesture by a portable electronic device according to some implementation solutions.

It may be understood that the gesture in FIG. 3B is an example triggering manner of the control center interface/notification center interface, or may be another gesture type (for example, pinching, touching and holding, rotation, a user-defined gesture, or a mid-air gesture), or may be another triggering direction tor example, from top to bottom or from bottom to top). In addition to gesture triggering, the triggering manner may be button triggering, voice recognition triggering, image recognition triggering, brain wave triggering, or the like.

Figure 3C:
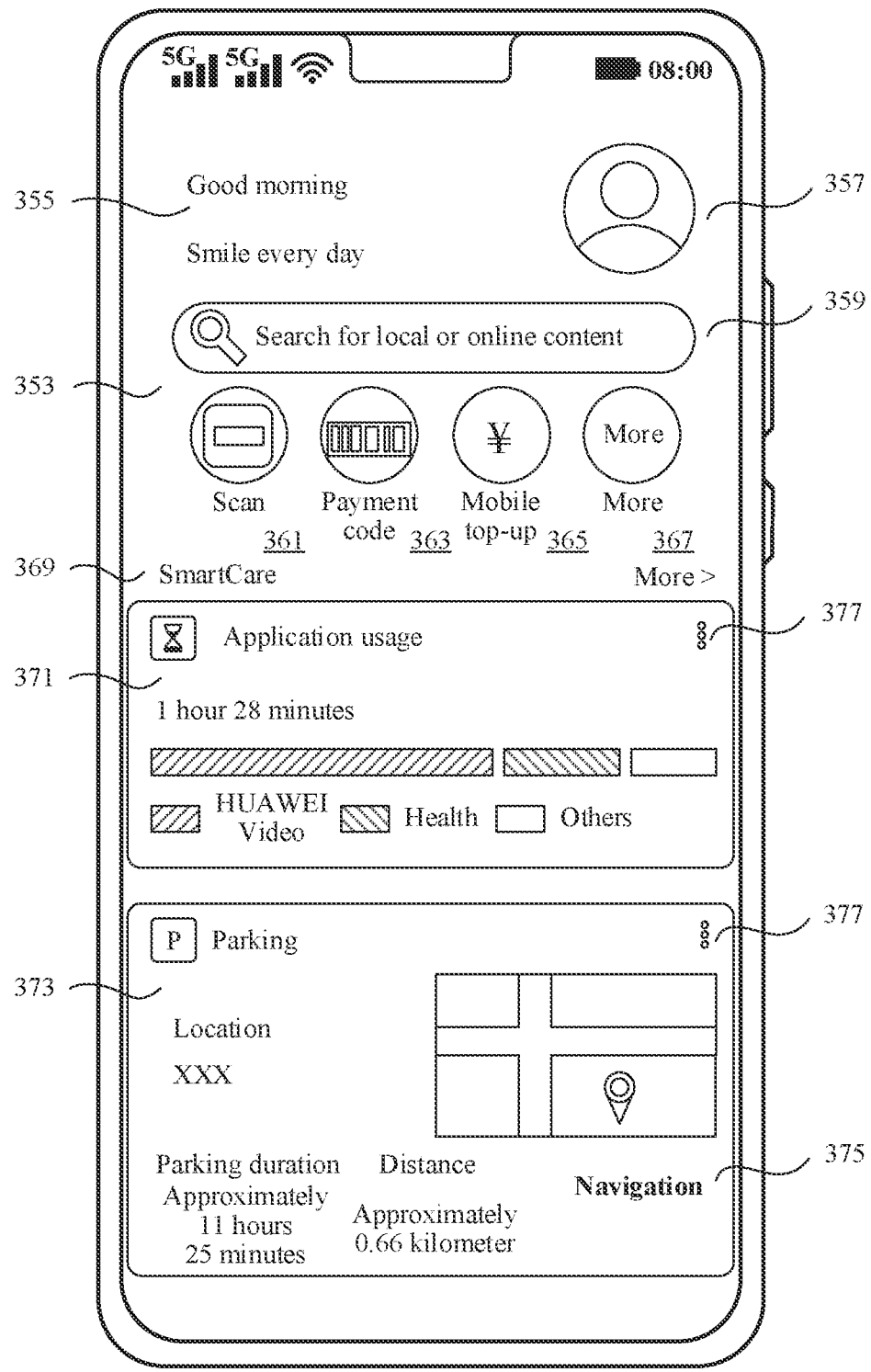
FIG. 3C is a schematic diagram of displaying a control center interface by a portable electronic device according to some implementation solutions.

The following describes some content in the control center interface 353 in FIG. 3C.

The control center interface 353 optionally includes a greeting label 355, a user avatar 357, and a local or online content search box 359.

The control center interface 353 optionally includes shortcut operations of some applications, for example, "Scan" 361, "Payment code" 363, and "Mobile top-up" 365. For example, "Mobile top-up" 365 is optionally associated with the application Wallet 323. The control center interface 353 further includes a "More" icon 367 displaying more shortcut operations. These applications that support shortcut operations are optionally manually selected by the user, optionally last used by the user, and optionally frequently used by the user.

The control center interface 353 optionally includes a SmartCare interface 369 and one or more SmartCare cards that have a closed shape and that are generated by a system/an application in the SmartCare interface 369. The SmartCare interface 369 can optionally automatically refresh the SmartCare card, for example, add/delete a card, for example, modify content in the card. A refresh manner is optionally refreshing the SmartCare card when the user interface 301 is the control center interface 353, or optionally refreshing the SmartCare card in the background.

In some possible implementation solutions, the SmartCare card is optionally an application usage details card 371, and the application usage details card 371 provides the user with total usage time of the portable electronic device 200 and a usage proportion of each application.

In some possible implementation solutions, the SmartCare card is optionally a parking card 373, and the parking card 373 reflects a parking location of a travel tool of the user, parking duration, a distance from the user, a local map, and positioning of the travel tool in the map. The parking card 373 also optionally includes a "Navigation" icon 375. When the portable electronic device 200 detects an operation that the user taps the "Navigation" icon 375, the portable electronic device 200 opens map software and guides the user to arrive at the parking location.

In some possible implementation solutions, the content in the SmartCare card further includes a "More" icon 377. When detecting an operation that the user taps the "More" icon 377, the portable electronic device 200 pops up an option table, and provides the user with more selections of operating the SmartCare card. Options in the option table optionally include the following options, a subset thereof, or a superset thereof: Ignore this time, Share, Pin on top, Display when the screen is locked, Cancel subscription, Display in another interface, and the like.

The foregoing first describes the content in the SmartCare interface 369, and then displays some example SmartCare cards. The following describes a use scenario of the intelligent multimedia playback device 250 and a SmartCare card correspondingly generated in the SmartCare interface 369.

Figure 4A:
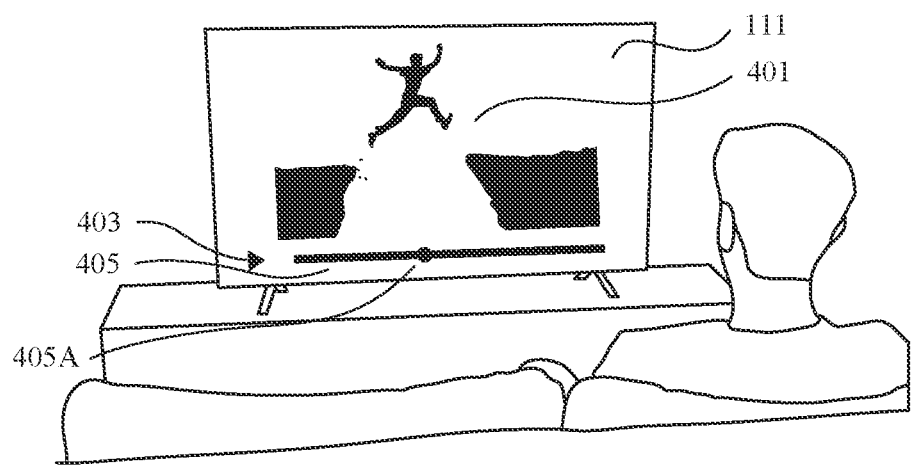
FIG. 4A is a schematic diagram of a scenario in which a user watches a smart television according to some implementation solutions.

FIG. 4A is a schematic diagram of a scenario in which a user is watching a smart television 111 in a first room 110 in a home scenario 100. In this case, the smart television 111 is playing "Stepping Bravely" through Huawei Video. Huawei Video herein may be the same as the application Huawei Video 325 on the mobile phone side, or may be a version of Huawei Video applicable to the smart television 111, or may be another video playback application. The smart television 111 in FIG. 4A displays an example of a frame 401 of "Stepping Bravely". FIG. 4A further displays a playback icon 403 (in this case, a playback status is a playing state, or the playback status is optionally a pause state, or the playback status is optionally a buffering state), a playback progress display bar 405, and a slider 405A in the smart television 111. A location of the slider 405A relative to the playback progress display bar 405 indicates a playback progress of the video "Stepping Bravely" on the smart television 111. In this case, the smart television 111 is connected to a WLAN provided by a router 145.

Figure 4B:
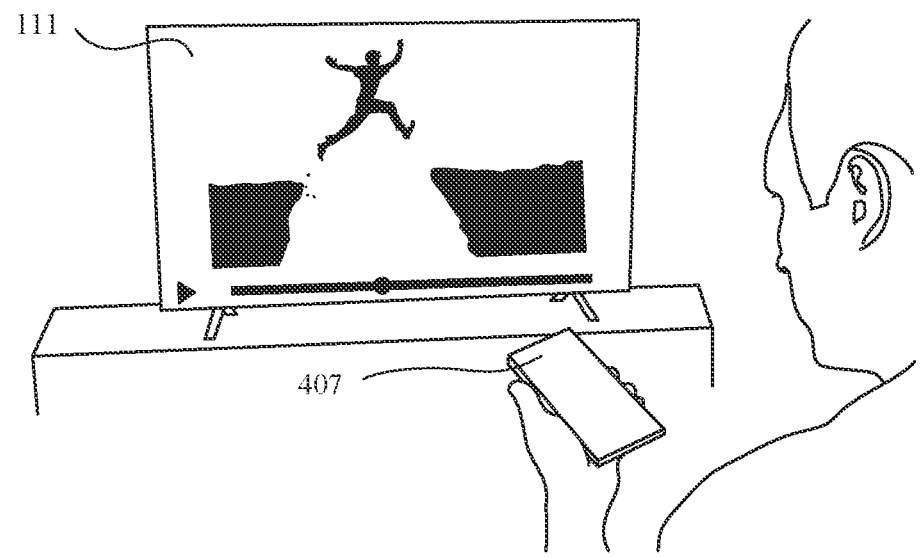
FIG. 4B is a schematic diagram in which a user picks up a mobile phone to enter a control center interface according to some implementation solutions.
Figure 4C:
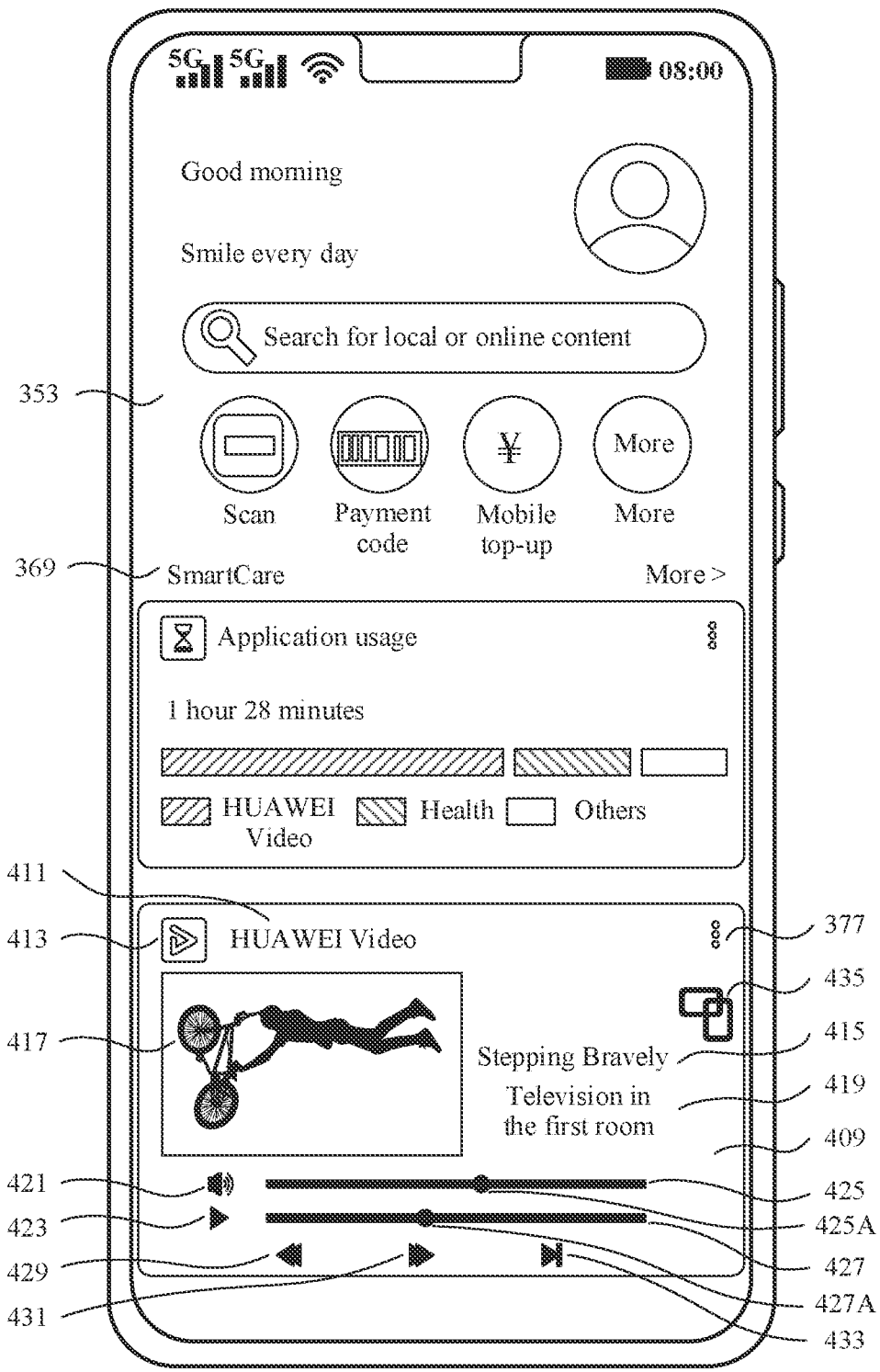
FIG. 4C is a schematic diagram in which a smart television generates a playback control card in a SmartCare interface according to some implementation solutions.

FIG. 4B shows that a user picks up a mobile phone 407. In this case, the mobile phone 407 is also in the WLAN provided by the router 145. The user expects to resume playing, on the mobile phone 407, the video "Stepping Bravely" played on the smart television 111. The method for resuming playing multimedia content between devices provided in embodiments of this application can meet such a requirement of a user. FIG. 4C shows an example of a playback control card 409 corresponding to a smart television 111 in a SmartCare interface 369. The following describes content of the playback control card 409.

The playback control card 409 optionally includes a name 411 of an application used to play multimedia content, and an icon 413 corresponding to the application. Herein, for example, Huawei Video 325 is used as an application used to play a video, and an icon corresponding to Huawei Video 325 is used.

The playback control card 409 optionally includes a name 415 of the multimedia content and an associated picture 417 of the multimedia content. The associated picture is optionally a cover picture of the multimedia content, or optionally a frame of the multimedia content, or optionally a picture that is received by the mobile phone 407 and that is specified by the user. Herein, the name and the associated picture respectively correspond to the video "Stepping Bravely" played by the smart television 111 and a video cover picture of the video. For example, the video cover picture includes a cyclist. It may be understood that the associated picture 417 of the multimedia content may remain unchanged, or may change continuously, and in this case, it is equivalent to playing "Stepping Bravely" in the playback control card 409.

The playback control card 409 optionally includes a name 419 of the intelligent multimedia playback device 250. For example, the name herein corresponds to a name "Television in the first room" of the smart television 111.

The playback control card 409 optionally includes a volume icon 421. When the playback control card 409 displays the volume icon 421, the intelligent multimedia playback device 250 may play, (for example, by using a built-in speaker 267A, an external headset, or an external speaker), an audio corresponding to the multimedia content. For example, the smart television 111 plays, while playing a video image, an audio corresponding to the video. The volume icon 421 is optionally an icon that can be used to receive a user operation. When the mobile phone 407 detects an operation that the user taps the volume icon 421, a mute icon 441 shown in FIG. 4F appears. In this case, the multimedia content is optionally normally played, but the audio corresponding to the multimedia content cannot be played.

The playback control card 409 optionally includes a playback icon 423. When the playback control card 409 displays the playback icon 423, the smart television 111 plays the multimedia content. The playback icon 423 is optionally an icon that can be used to respond to a user operation. When the mobile phone 407 detects an operation that the user taps the playback icon 423, a playback pause icon 445 shown in FIG. 4F appears. In this case, playback of the multimedia content is paused.

The playback control card 409 optionally includes a volume display bar 425. The volume display bar 425 optionally displays a percentage of current volume to maximum volume by using a slider 425A, or optionally displays quantifiable volume (for example, 50 decibels). The volume display bar 425 is optionally an icon that can be used to respond to a user operation. For example, the mobile phone 407 receives a drag gesture performed by the user on the slider 425A, to adjust volume. In some possible implementation solutions, when the mute icon 441 appears in the playback control card 409, the slider 425A is optionally displayed on the leftmost side of the volume display bar 425, and is restored to an original location after the volume icon 421 appears.

The playback control card 409 optionally includes a playback progress display bar 427. The playback progress display bar 427 optionally displays a playback progress in a unit of time (for example, seconds or minutes) by using a slider 427A, and optionally displays the playback progress in proportion. The playback progress display bar 427 is optionally an icon that can be used to respond to a user operation. For example, a drag gesture performed by the user on the slider 427A is received, to adjust the playback progress.

The playback control card 409 optionally includes a rewind icon 429. For example, when the mobile phone 407 detects an operation that the user taps the rewind icon 429, the playback progress rewinds to one or more frames before a current video frame and the video continues being played, and the slider 425A on the playback progress display bar 425 also slides leftward. The rewind icon 429 is optionally used to identify a tap operation of the user. Each time detecting an operation that the user taps the rewind icon 429, the mobile phone 407 rewinds the video progress once. The rewind icon 429 is optionally used to identify a touch and hold operation of the user. The mobile phone 407 detects an operation that the user presses the rewind icon 429, records a touch and hold time period until the user lifts, and calculates a quantity of video frames that need to be rewound. Optionally, the mobile phone rewinds the playback progress in a touch and hold process, or optionally rewinds the playback progress after the touch and hold operation ends.

The playback control card 409 optionally includes a fast-forward icon 431. For example, when the mobile phone 407 detects an operation that the user taps the fast-forward icon 431, the playback progress advances to one or more frames after a current video frame and the video continues being played, and the slider 425A on the playback progress display bar 425 also slides rightward. The fast-forward icon 431 is optionally used to identify a tap operation of the user. Each time detecting an operation that the user taps the fast-forward icon 431, the mobile phone 407 advances the video progress once. The fast-forward icon 431 is optionally used to identify a touch and hold operation of the user. The mobile phone 407 detects an operation that the user presses the fast-forward icon 431, records a touch and hold time period until the user lifts, and calculates a quantity of video frames that need to be advanced. Optionally, the mobile phone advances the playback progress in a touch and hold process, or optionally advances the playback progress after the touch and hold operation ends.

The playback control card 409 optionally includes a next-episode icon 433. For example, when the mobile phone 407 detects an operation that the user taps the next-episode icon 433, the smart television 111 plays a next video, and the playback control card 409 refreshes and displays playback information of a video currently played by the smart television 111. The next video is optionally a next episode of a same episode, is optionally another next video recommended by a video playback application (Huawei Video 325), or is optionally a next episode specified by the user.

The playback control card 409 optionally includes a playback resume icon 435. For example, when the mobile phone 407 detects an operation that the user taps the playback resume icon 435, optionally, the mobile phone 407 enters the video playback application (Huawei Video 325), and resumes playing a video that is being played on the smart television 111. In some possible implementation solutions, the smart television 111 does not change after the mobile phone 407 resumes playing the video, and continues playing the video that is currently being played. In some possible implementation solutions, the smart television 111 ends video playback after the mobile phone 407 resumes playing the video. In some possible implementation solutions, after the mobile phone 407 resumes playing the video, the smart television 111/the mobile phone 407 indicates to the user whether playback of the video played on the smart television 111 needs to be ended.

The playback control card 409 optionally includes a "More" icon 377. When detecting an operation that the user taps the "More" icon 377, the mobile phone 407 optionally displays the following options, a subset thereof or a superset thereof: Ignore this time, Share, Pin to top, Display when the screen is locked, Cancel subscription, Display in another interface, and the like.

Figure 4D:
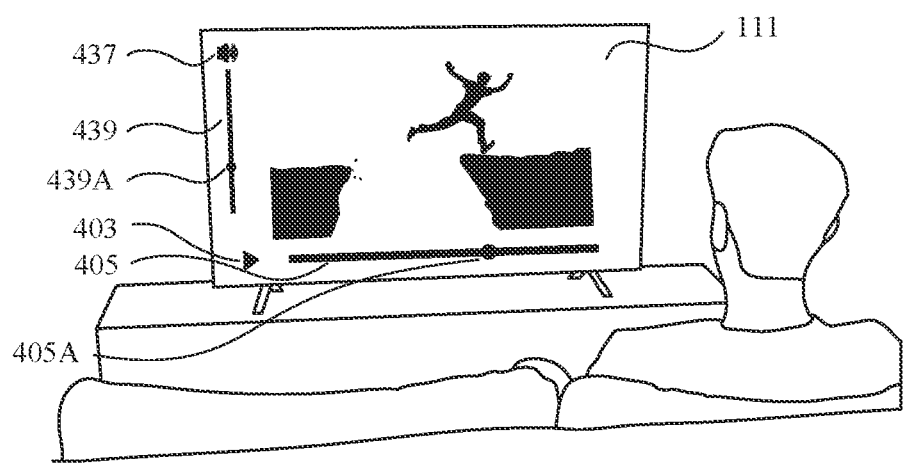
FIG. 4D is a schematic diagram in which a user remotely controls a smart television by using a remote control according to some implementation solutions.
Figure 4E:
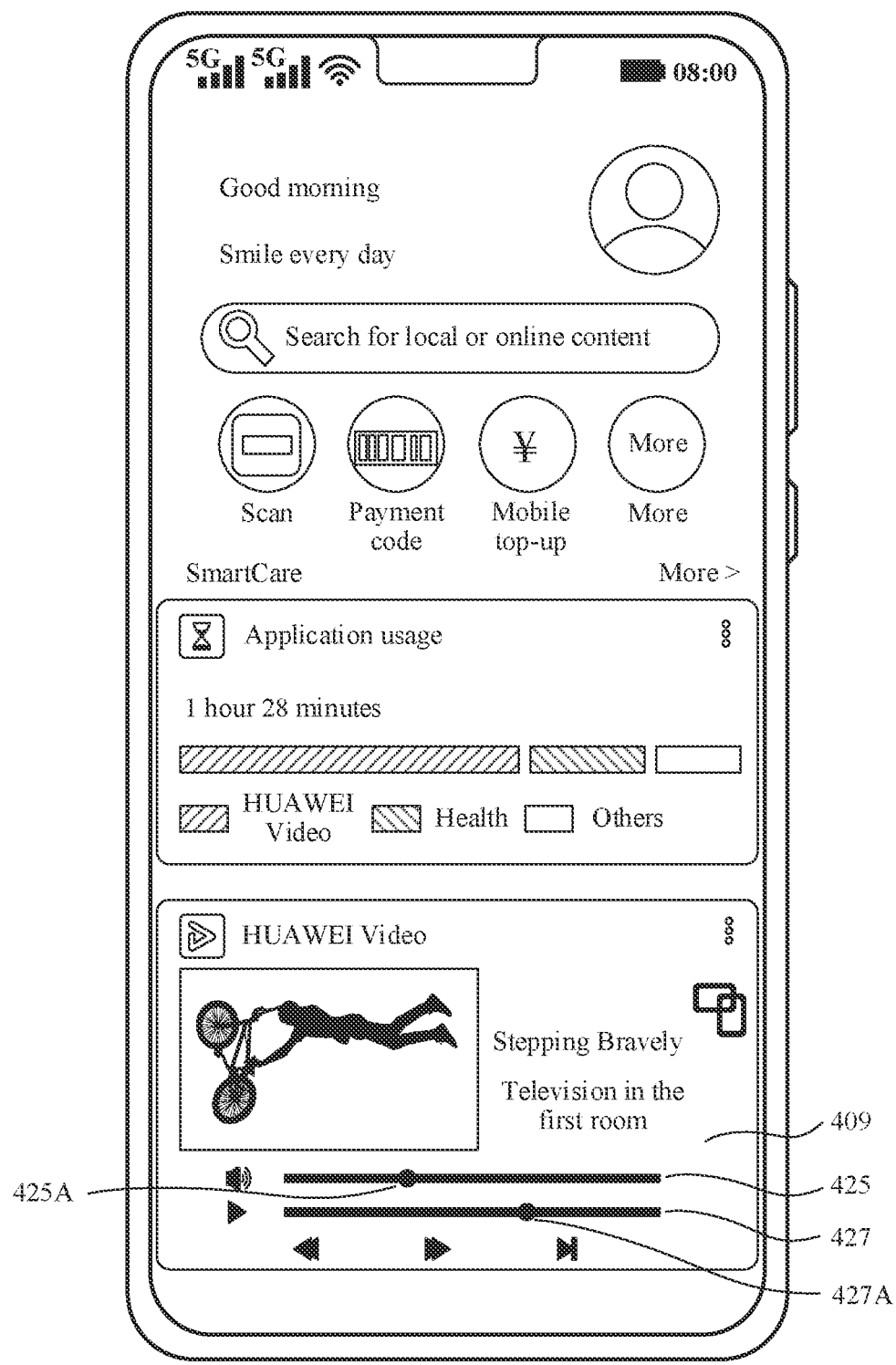
FIG. 4E is a schematic diagram in which a playback control card of a smart television changes after remote control takes effect according to some implementation solutions.
Figure 4F:
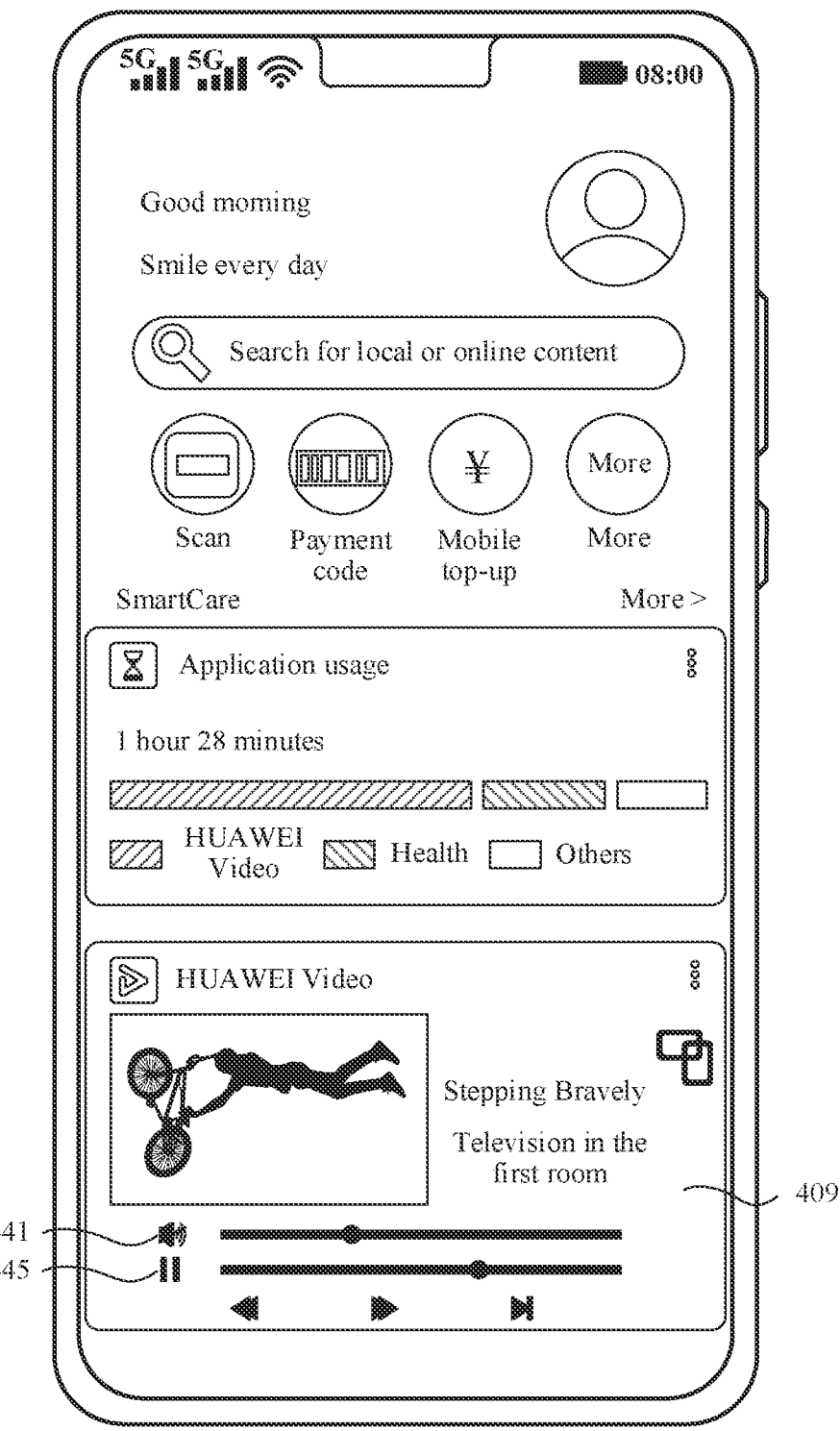
FIG. 4F is a schematic diagram in which a user performs playback control on a smart television by using a playback control card according to some implementation solutions.
Figure 4G:
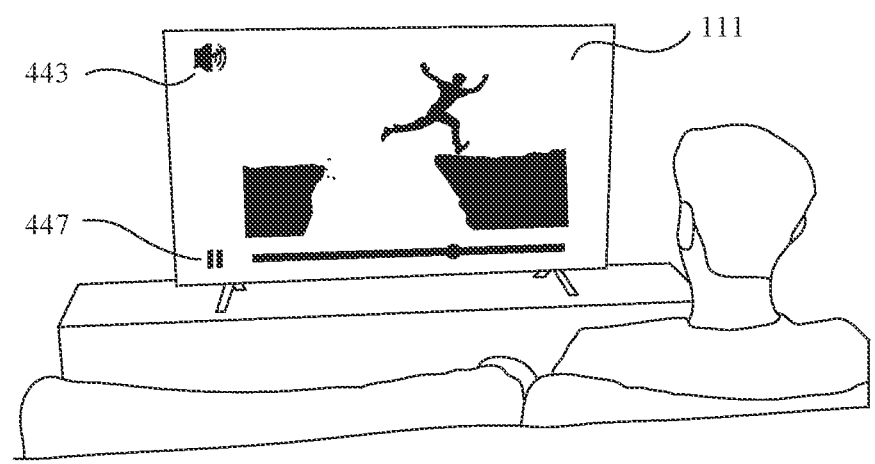
FIG. 4G is a schematic diagram in which playback information of a smart television changes after playback control takes effect according to some implementation solutions.
Figure 4H:
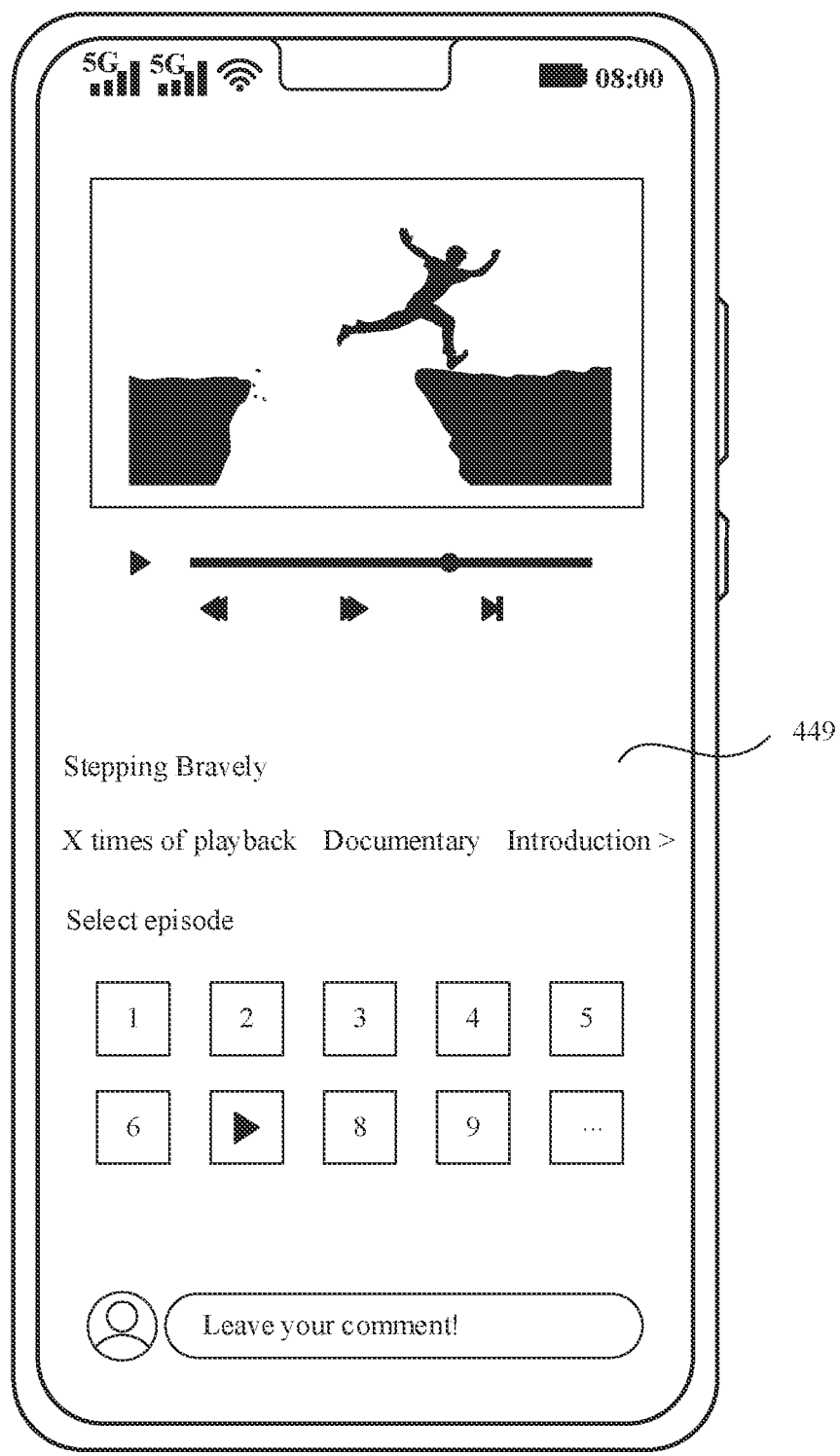
FIG. 4H is a diagram of an example of an interface of a video playback application according to some implementation solutions.
Figure 4I:
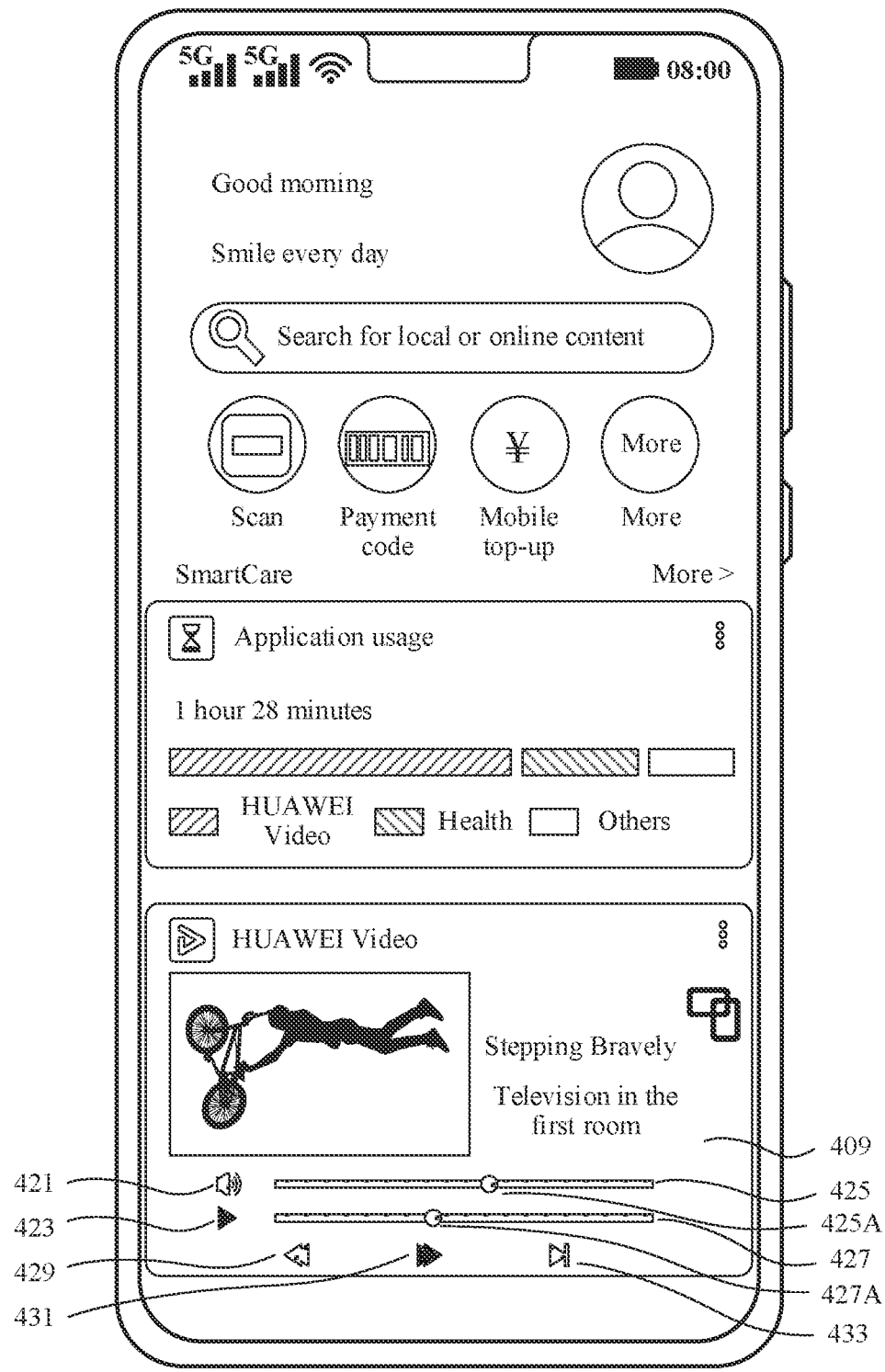
FIG. 4I is a schematic diagram of a case in which playback control fails according to some implementation solutions.
Figure 4J:
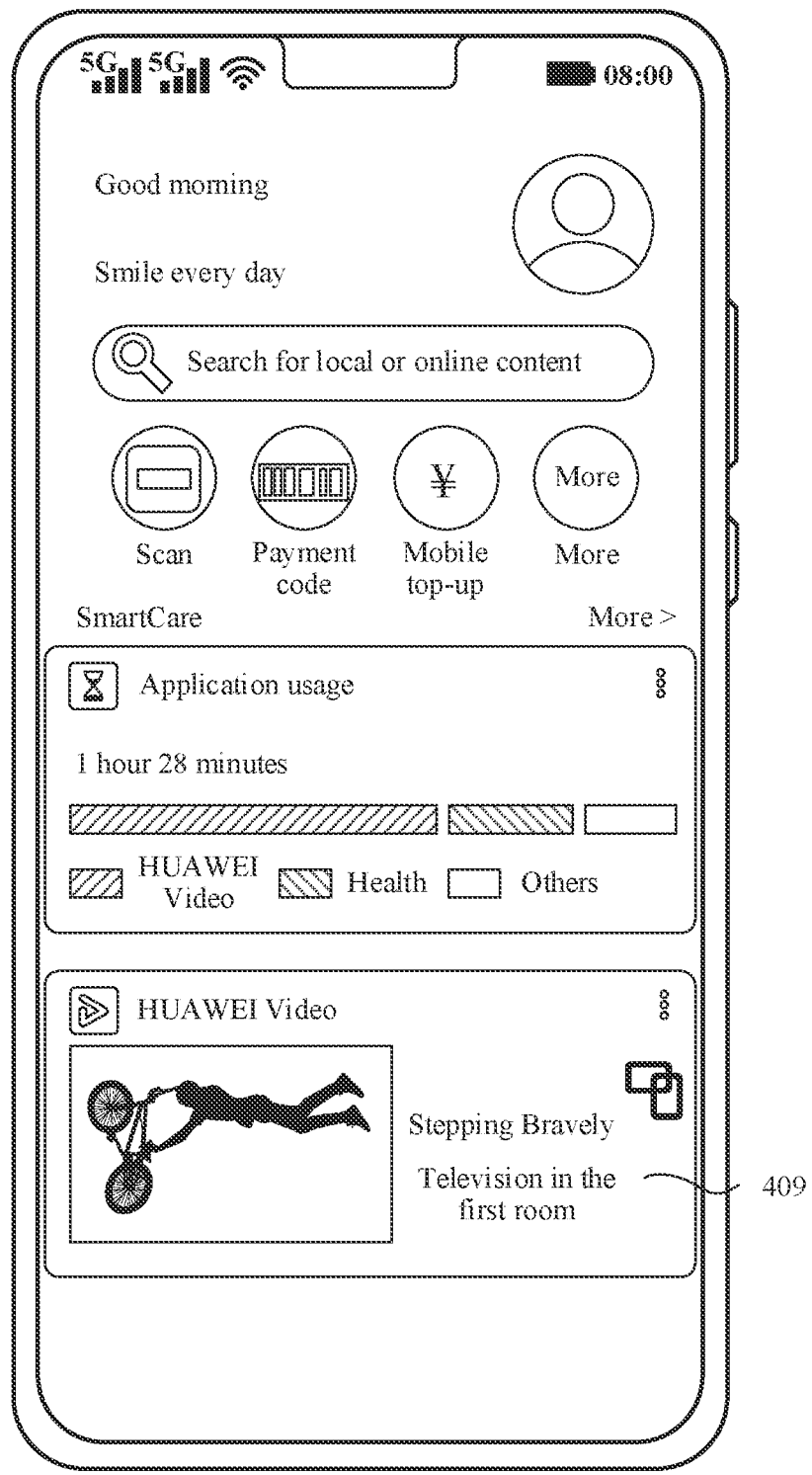
FIG. 4J is a schematic diagram of a case in which playback control fails according to some implementation solutions.
Figure 4K:
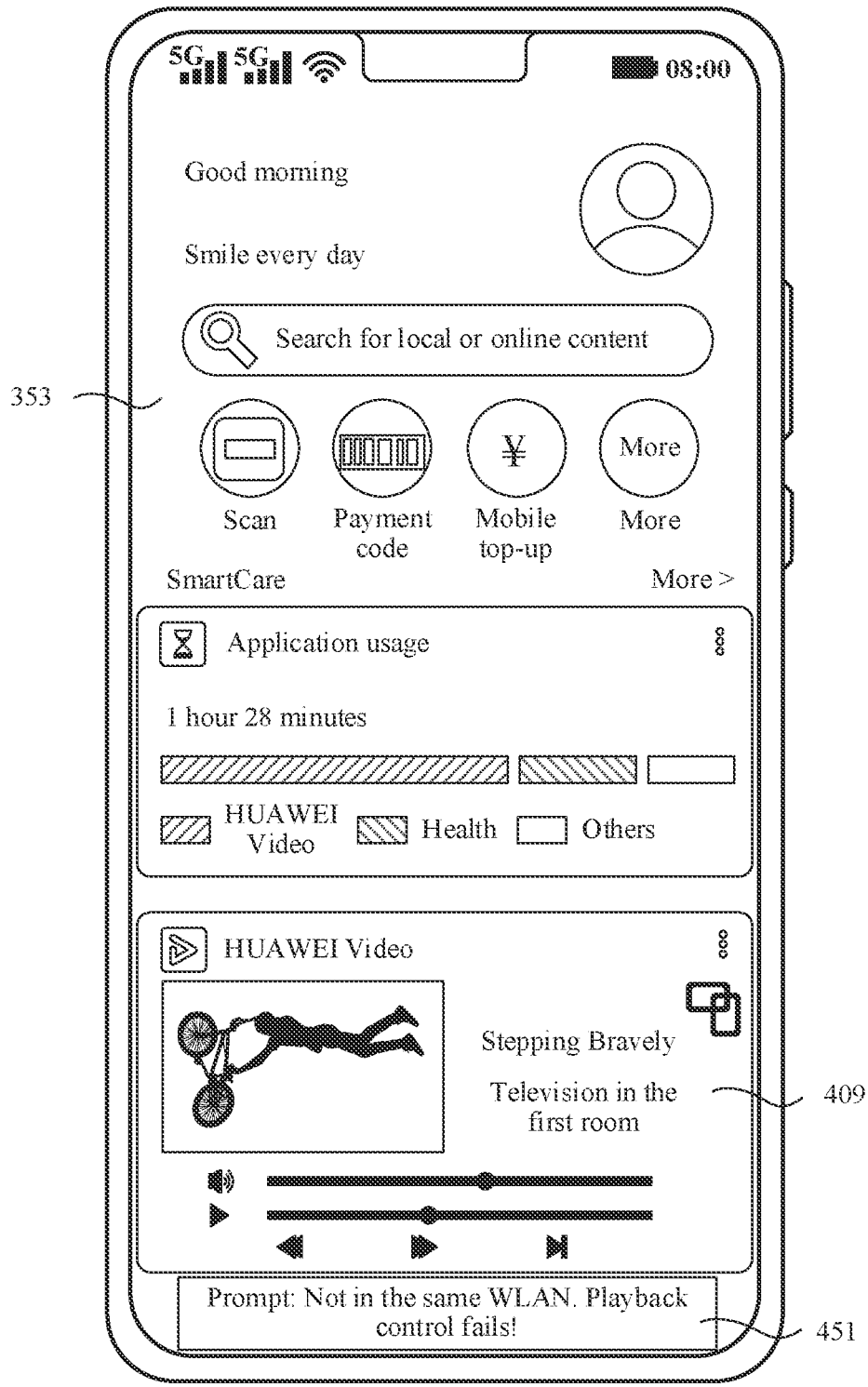
FIG. 4K is a schematic diagram of a case in which playback control fails according to some implementation solutions.
Figure 4L:
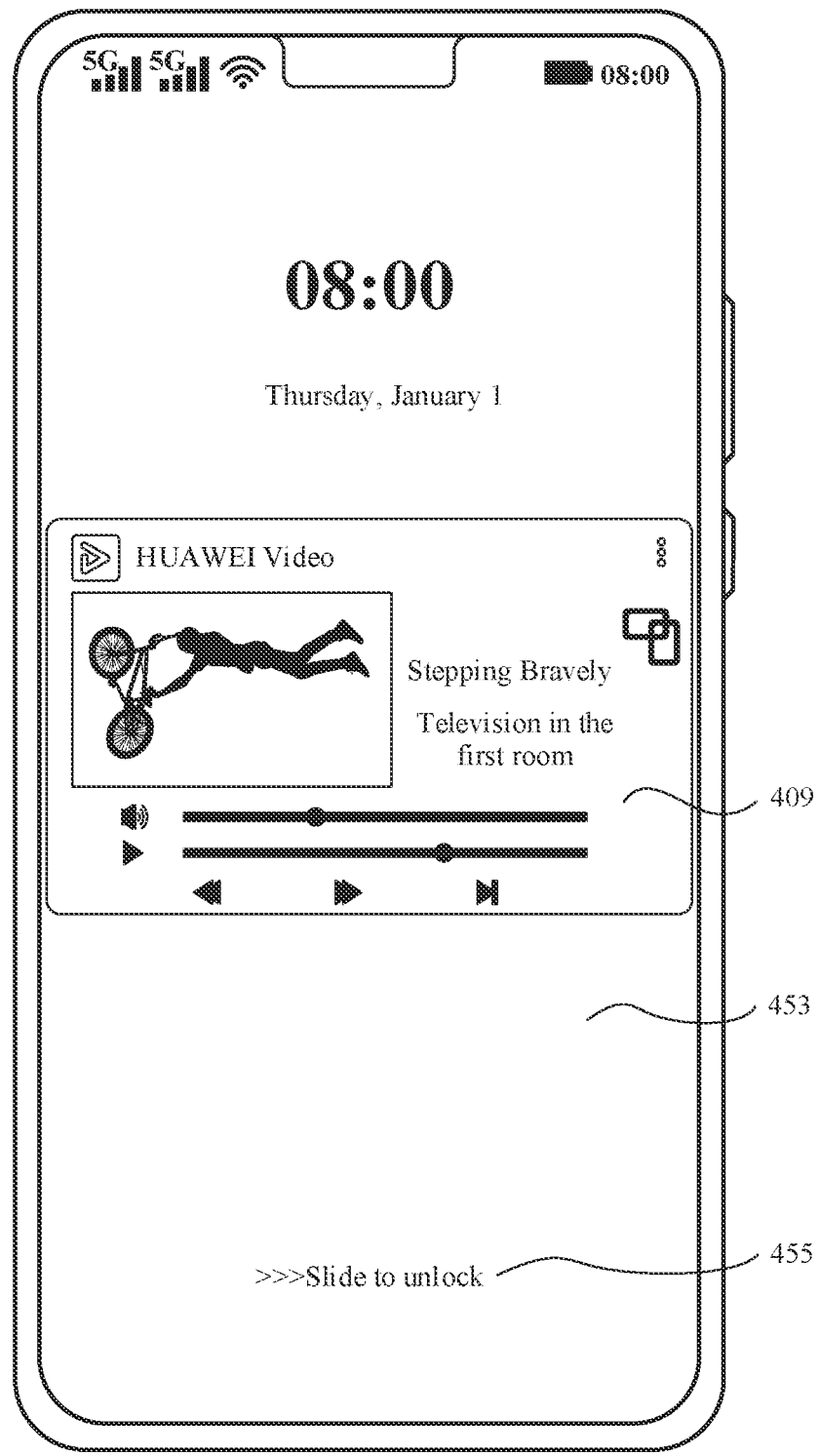
FIG. 4L is a schematic diagram of displaying a playback control card in a lock screen interface according to some implementation solutions.

FIG. 4L shows an example of an interface in which the playback control card 409 is displayed when the screen is locked. FIG. 4L shows a lock screen interface 453 of the mobile phone 407. The lock screen interface 453 includes the playback control card 409, and further includes an indicator 455 indicating that the mobile phone 407 is in the lock screen interface 453. For example, content of the indicator 455 is "Slide to unlock".

It may be understood that the playback control card 409 is an example embodiment. In some other embodiments, the playback control card 409 optionally includes more/less playback information, optionally includes different names of the playback information, and optionally presents the playback information in different styles and/or layouts.

Figure 4M:
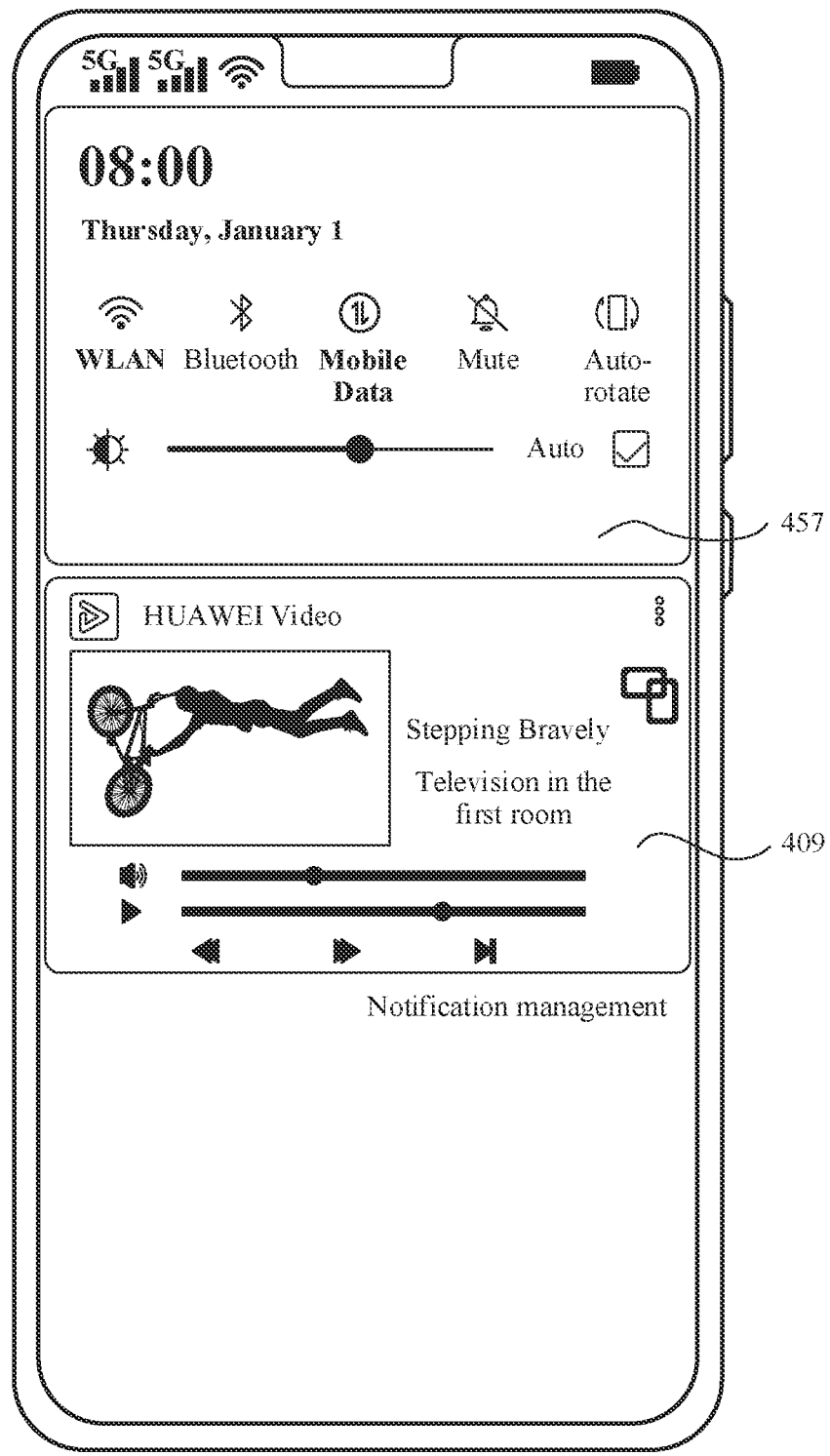
FIG. 4M is a schematic diagram of displaying a playback control card in a notification center interface according to some implementation solutions.

In some possible implementation solutions. FIG. 4M is an example interface diagram of displaying the playback control card 409 in a notification center interface 457. The notification center interface 457 includes the playback control card 409. The notification center interface 457 may be obtained in the user interface 301 shown in FIG. 3A, by detecting a top-bottom sliding gesture of the user by the mobile phone 407.

FIG. 4D and FIG. 4E show a process in which after playback information on the smart television 111 changes (for example, a playback progress changes or volume changes), playback information displayed on the playback control card 409 also changes accordingly.

In some possible implementation solutions, after the smart television 111 receives a remote control instruction from a remote control of the user, some playback information changes. FIG. 4D shows a playback progress display bar 405, a slider 405A on the playback progress display bar 405, a volume icon 437, a volume display bar 439, and a slider 439A on the volume display bar 439 after the smart television 111 receives the remote control instruction from the remote control. Compared with the playback control card 409 that corresponds to the smart television 111 in FIG. 4B and that is shown in FIG. 4C, it can be learned from the playback control card 409 shown in FIG. 4D that a playback progress and volume on the smart television 111 change. After the playback information changes, the smart television 111 synchronizes the playback information to the mobile phone 407 by using the wireless communications module 265. FIG. 4E shows a volume display bar 425, a slider 425A on the volume display bar 425, a playback progress display bar 427, and a slider 427A on the playback progress display bar 427 in the playback control card 409 corresponding to the smart television 111 after the playback information is synchronized. It can be learned that playback information displayed on the smart television 111 in FIG. 4D is basically the same as playback information displayed on the playback control card 409 in FIG. 4E, and corresponding slider locations are basically the same. This indicates that the playback information on the smart television 111 is synchronized to the playback control card 409 in real time. Due to factors such as information transfer and/or processing, such real-time synchronization may be understood as real-time synchronization within a specific allowed error range.

FIG. 4F and FIG. 4G show a process in which a user performs playback control on a smart television 111 by using a playback control card 409.

In some possible implementation solutions, when the mobile phone 407 detects an operation that the user taps the volume icon 421 in FIG. 4C, the volume icon 421 in the playback control card 409 changes to a mute icon 441 shown in FIG. 4F. After the mobile phone 407 sends a playback control command to the smart television 111 by using the wireless communications module, a mute icon 443 shown in FIG. 4G also appears on the smart television 111.

In some possible implementation solutions, when the mobile phone 407 detects an operation that the user taps the playback icon 423 in FIG. 4C, the playback icon 423 in the playback control card 409 changes to a playback pause icon 445 in FIG. 4F. After the mobile phone 407 sends a playback control command to the smart television 111 by using the wireless communications module, the playback icon 403 in the smart television 111 also changes to a playback pause icon 447 shown in FIG. 4G.

The following describes a process in which the user resumes, by using the playback control card 409, playing the video that is being played on the smart television 111.

In some possible implementation solutions, when detecting an operation that the user taps the playback resume icon 435 in FIG. 4C, the mobile phone 407 jumps to a video playback application and continues playing the video. Herein, the playback information shown in FIG. 4D is used as an example. After the user taps the playback resume icon 435 in the playback control card 409, an example user interface 449 of Huawei Video 325 shown in FIG. 4H appears on the mobile phone 407, and the user can resume playing the video "Stepping Bravely" in the user interface 449. It can be learned that, in this case, the playback information shown in Huawei Video 325 in FIG. 4H is basically consistent with the playback information shown in FIG. 4D. It may be understood that such consistency is consistency within a specific allowed error range.

In some possible implementation solutions, an application used by the user to play multimedia content on a mobile phone and an application used by the user to play multimedia content on a television are completely the same, that is, the application supports both use on the mobile phone and use on the television. In some possible implementation solutions, an application used by the user to play multimedia content on a mobile phone and an application used by the user to play multimedia content on a television are different versions of a same application. For example, the application on the mobile phone is a mobile phone version of Huawei Video 325, and the application on the television is a television version of Huawei Video. In some possible implementation solutions, an application used by the user to play multimedia content on a mobile phone and an application used by the user to play multimedia content on a television are associated applications. The television plays the multimedia content by using a first application. The mobile phone receives playback information, where the playback information includes a multimedia content identifier, and the mobile phone can resume playing the multimedia content in a second application by using the multimedia identifier.

In some possible implementation solutions, the multimedia content resumed by the user on the mobile phone and the multimedia content played by the user on the smart television have a same type. In some possible implementation solutions, the multimedia content resumed by the user on the mobile phone and the multimedia content played by the user on the smart television have different types. For example, the multimedia content played on the television is a 4K version of "Stepping Bravely", and the multimedia content resumed on the mobile phone is a 1080P version of "Stepping Bravely". For another example, the content played on the television is a VR version of "Stepping Bravely", and the multimedia content resumed on the mobile phone is a planar version corresponding to the VR version of "Stepping Bravely". For another example, the content played on the smart VR glasses is a panoramic video version that is of "Stepping Bravely" and that includes depth-of-field data, and the multimedia content resumed on the mobile phone is a panoramic video version of "Stepping Bravely".

In some possible implementation solutions, an emergency situation such as power-off/WLAN disconnection may occur in the smart television 111. In this case, a device status of the smart television 111 relative to the mobile phone 407 is an offline state, and a playback control command of the mobile phone 407 for the smart television 111 fails To indicate, to the user on the mobile phone 407, that playback control fails, display of the playback control card 409 optionally stops; one or more icons optionally become icons that can be used not to receive a user operation; colors of one or more icons optionally change, for example, colors of the volume icon 421, the playback icon 423, the volume display bar 425, the slider 425A, the playback progress display bar 427, the slider 427A, the rewind icon 429, the fast-forward icon 431, and the next-episode icon 433 in the playback control card 409 shown in FIG. 4I change to gray; display of one or more icons optionally stops, for example, display of the volume icon 421, the playback icon 423, the volume display bar 425, the slider 425A, the playback progress display bar 427, the slider 427A, the rewind icon 429, the fast-forward icon 431, and the next-episode icon 433 in the playback control card 409 in FIG. 4C stops (as shown in FIG. 4J); the user is optionally prompted that playback control fails, for example, a prompt box 451 in the control center interface 353 shown in FIG. 4K, and an example of content in the prompt box 451 is "Prompt: Not in the same WLAN. Playback control fails!", or an example of the content may be "XXX device is offline. Playback control fails!"; or one or a combination of the foregoing implementation solutions optionally exists, or another implementation solution may exist.

In some possible implementation solutions, the mobile phone 407 may fail to resume playback, for example, a video source is lost, a video parsing error occurs, or the mobile phone 407 does not have permission to open a video playback application. To indicate, to the user on the mobile phone 407, that playback resuming fails, a solution similar to that shown in FIG. 4K is optionally used. For example, the prompt box 451 is generated in the control center interface 353/the user interface 449 of the video application, to indicate to the user that playback resuming fails, for example, content is "A video parsing error occurs. Playback fails". Details are not described herein again.

According to the method for resuming playing multimedia content between devices provided in embodiments of this application, playback information of the intelligent multimedia playback device 250 within a specific time period is reserved on the portable electronic device 200, so that the user can resume playing the multimedia content within a specific time period after a WLAN is disconnected for the last time/the intelligent multimedia playback device 250 exits a playing state/the intelligent multimedia playback device 250 is powered off, or the like. For example, the user can resume playing "Stepping Bravely" on the mobile phone 407 within a period of time after the user turns off the smart television 111 and then leaves home (the WLAN is disconnected). Descriptions are provided below by using an example in which the user continues to watch, on the mobile phone 407 after leaving home, a video last played on the smart television 111.

In some possible implementation solutions, the user expects to resume playing, within a period of time after the user leaves home, a video played on the smart television 111. For example, in a scenario shown in FIG. 5A, within a period of time, the user watches the video played on the smart television 111 and leaves home. In this case, the mobile phone 407 and the smart television 111 of the user are not in a same WLAN, and a device status of the smart television 111 relative to the mobile phone 407 is offline.

Figure 5A:
FIG. 5A is a schematic diagram of a scenario in which a user uses a mobile phone after leaving home according to some implementation solutions.
Figure 5B:
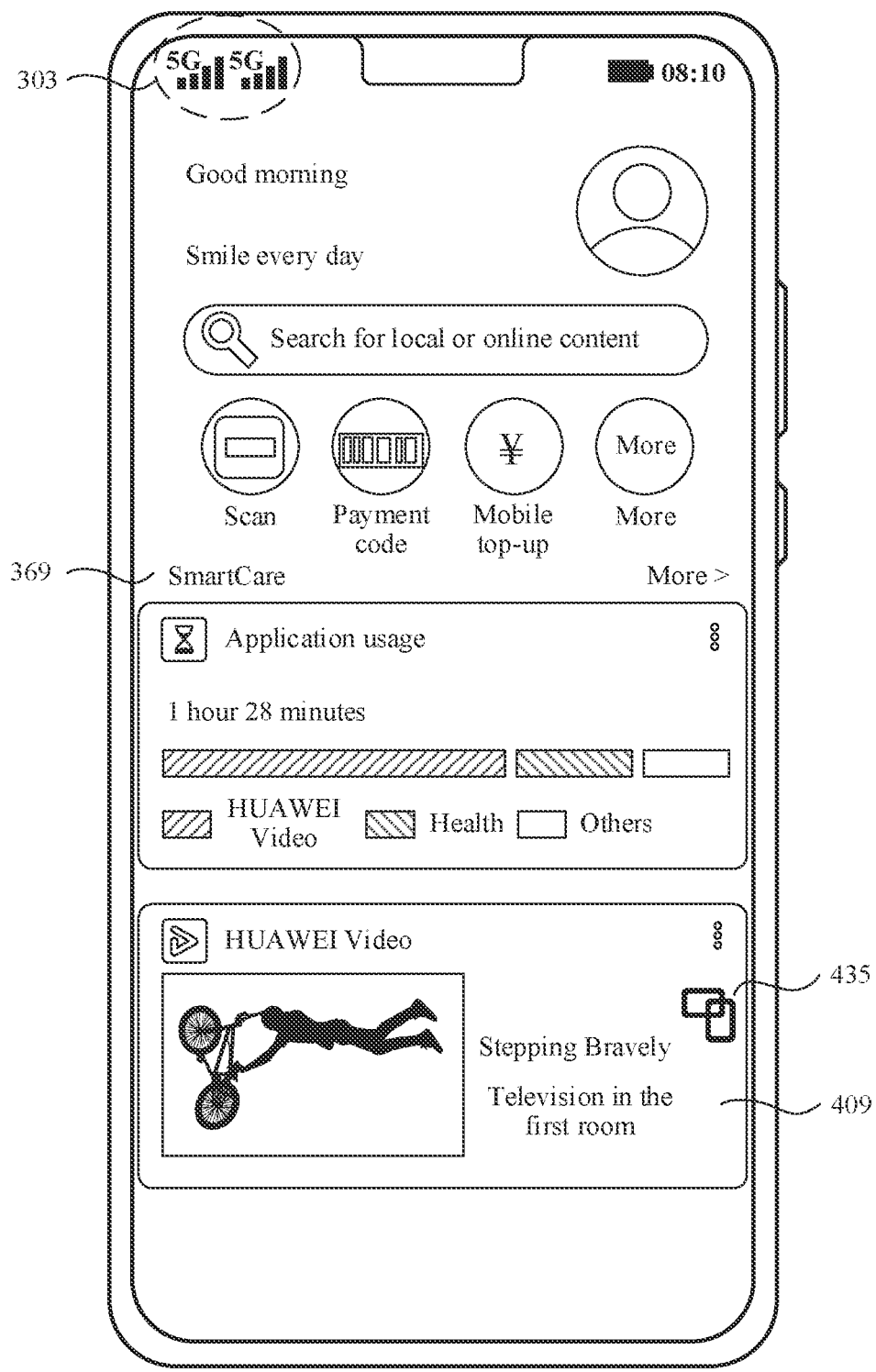
FIG. 5B is a schematic diagram in which a smart television generates a playback control card in a SmartCare interface after a user leaves home according to some implementation solutions.

Display of an indicator that is in signal strength indicators 303 in FIG. 5B and that is used to indicate a WLAN connection stops. In some possible implementation solutions, FIG. 5B further shows a playback control card 409 in a SmartCare interface 369. In this case, the mobile phone 407 and the smart television 111 are not in a same WLAN, and the user cannot implement playback control on the smart television 111 by using the playback control card 409. Display of a volume icon 421, a volume display bar 425, a slider 425A, a rewind icon 429, a fast-forward icon 431, a next-episode icon 433, a playback icon 423, a playback progress display bar 427, and a slider 427A stops. In some possible implementation solutions, the playback control card 409 shown in FIG. 5C retains a playback icon 423, a playback progress display bar 427, and a slider 427A. The mobile phone 407 collects locally stored latest playback information, and indicates a playback progress of a last played video by using the slider 427A, to bring better visual experience to the user.

When detecting an operation that the user taps the playback resume icon 435 in FIG. 5B, the mobile phone 407 optionally displays the user interface 449 of the video playback application Huawei Video 325 shown in FIG. 4H. It may be understood that, playback information displayed in the user interface 449 may be playback information with high real-time performance, and is basically consistent with playback information within a period of time when the user leaves home/the smart television 111 is turned off (because the playback information is synchronized within a period of time before the user leaves home), or may be earlier playback information (the playback information is not synchronized within a period of time before the user leaves home).

Figure 5C:
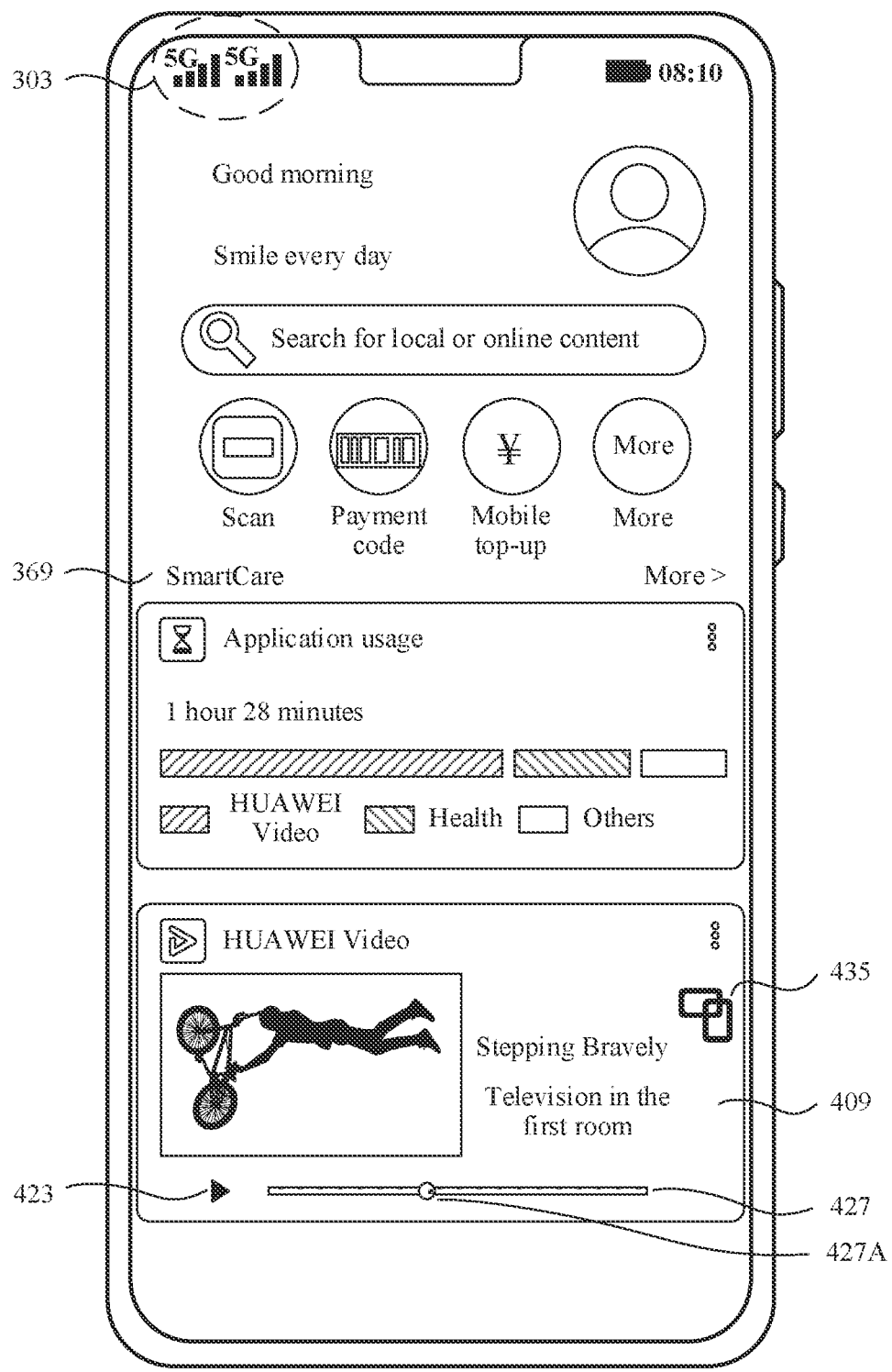
FIG. 5C is another schematic diagram in which a smart television generates a playback control card in a SmartCare interface after a user leaves home according to some implementation solutions.
Figure 5D:
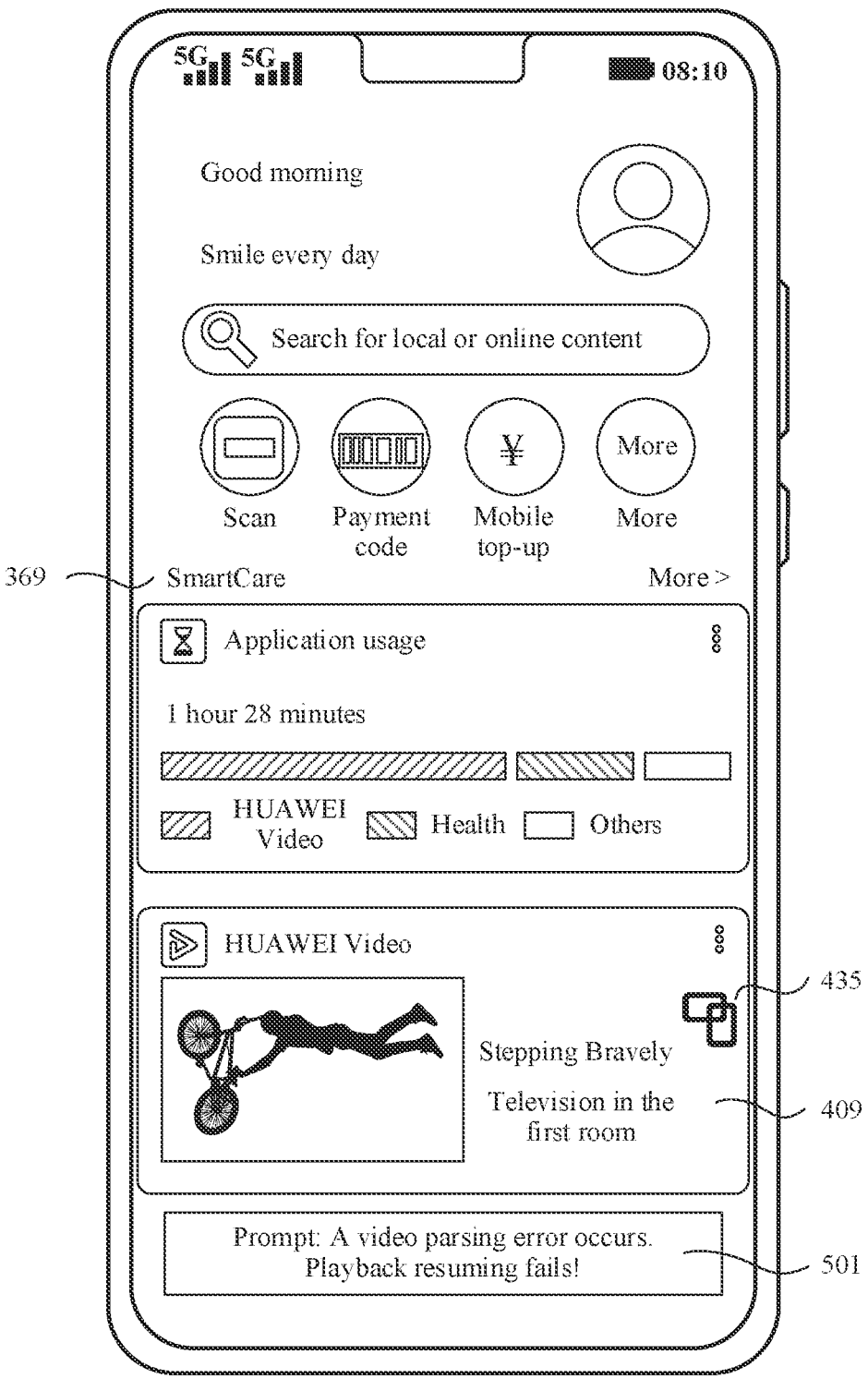
FIG. 5D is a schematic diagram of a case in which playback resuming fails according to some implementation solutions.

In some possible implementation solutions, the mobile phone 407 may fail to resume playback, for example, a video source is lost, a video parsing error occurs, or the mobile phone 407 does not have permission to open a video playback application. To indicate, to the user on the mobile phone 407, that playback resuming fails, display of the playback control card 409 optionally stops; a prompt box 501 shown in FIG. 5D is optionally generated, where an example of content is "Prompt: A video parsing error occurs. Playback resuming fails!"; or another implementation solution optionally exists. Details are not described herein.

Figure 5E:
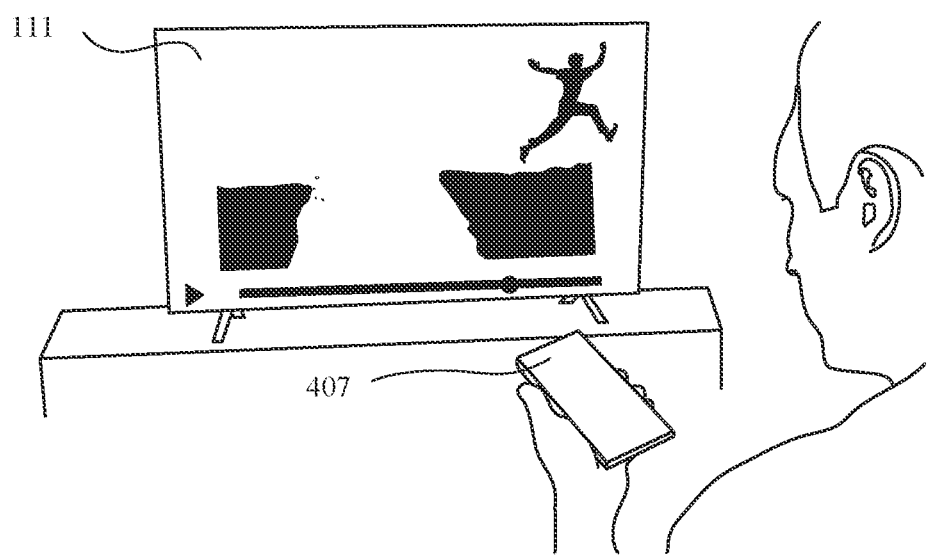
FIG. 5E is a schematic diagram of a scenario in which a user goes home again after leaving home according to some implementation solutions.
Figure 5F:
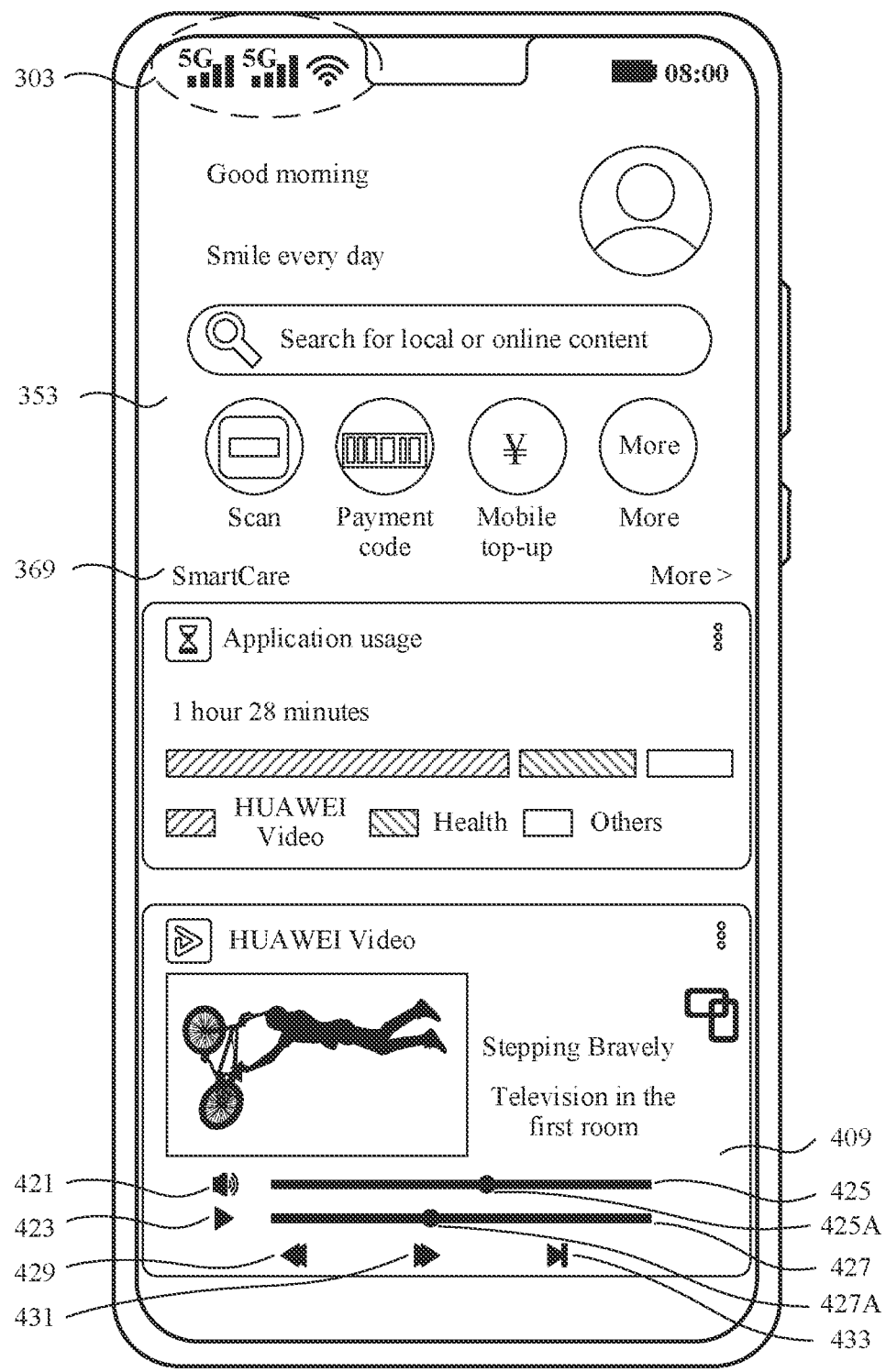
FIG. 5F is a schematic diagram in which a smart television generates a playback control card in a SmartCare interface when a user goes home again after leaving home according to some implementation solutions.

FIG. 5E is a schematic diagram in which a user returns to a home scenario 100 after leaving home. The user picks up the mobile phone 407 again to view the playback control card 409 corresponding to the smart television 111. In this case, the mobile phone 407 and the smart television 111 are in a same WLAN. An indicator that is in signal strength indicators 303 in FIG. 5F and that is used to indicate a WLAN connection is re-displayed. The playback control card 409 changes from the playback control card 409 shown in FIG. 5B/FIG. 5C to the playback control card 409 shown in FIG. 5F. It can be learned that the volume icon 421, the playback icon 423, the volume display bar 425, the slider 425A, the playback progress display bar 427, the slider 427A, the rewind icon 429, the fast-forward icon 431, and the next-episode icon 433 are re-displayed. In this case, the playback control information is synchronized again, and the user can perform playback control on the smart television 111 by using the playback control card.

The following describes a process in which a plurality of intelligent multimedia playback devices 250 need to generate playback control cards in the SmartCare interface 369. In an implementation solution, all the playback control cards are optionally displayed. In an implementation solution, one or more of the cards are optionally displayed, and remaining cards are displayed in the SmartCare interface 369 in a form of, for example, "Unfolded-Folded". In another implementation solution, one or more of the cards are displayed, and remaining cards are displayed in another interface different from the SmartCare interface 369 in a manner of, for example. "Display all-Back".

Figure 6A:
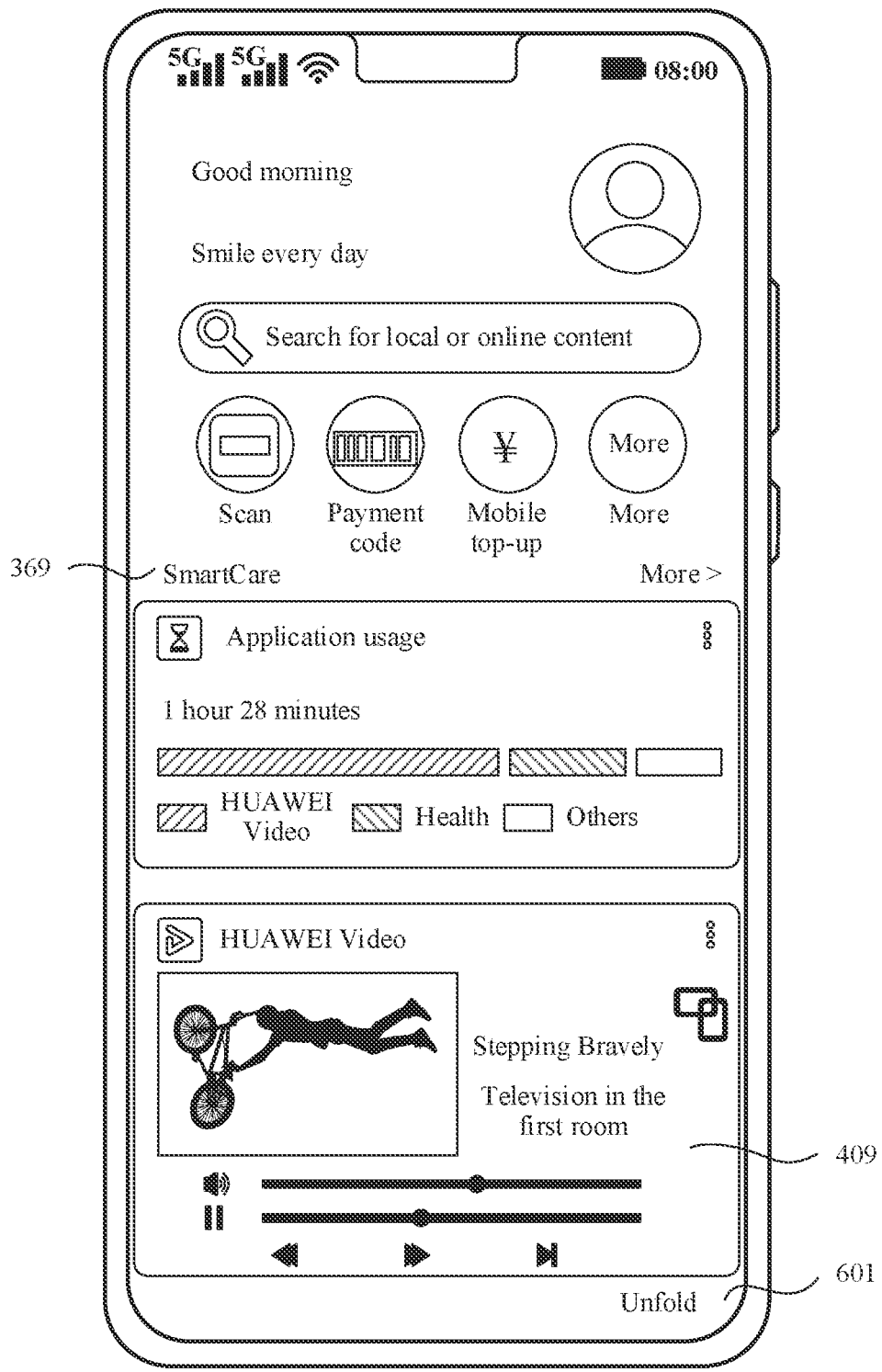
FIG. 6A is a schematic diagram of displaying one of playback control cards generated by a plurality of intelligent multimedia playback devices in a SmartCare interface according to some implementation solutions.
Figure 6B:
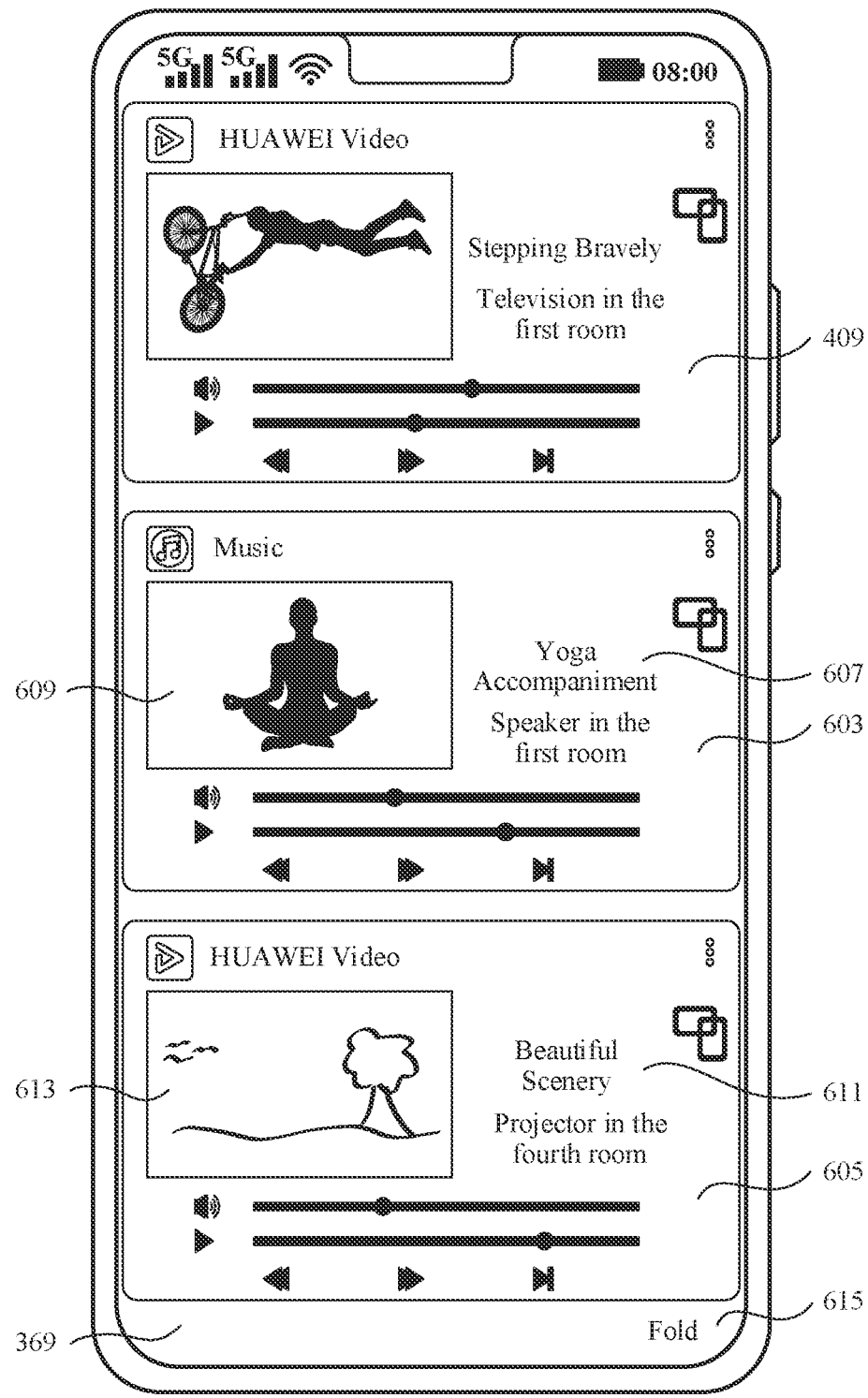
FIG. 6B is a schematic diagram of displaying all of playback control cards generated by a plurality of intelligent multimedia playback devices in a SmartCare interface according to some implementation solutions.

FIG. 6A and FIG. 6B show an implementation solution when a plurality of playback control cards need to be displayed. A SmartCare interface 369 in FIG. 6A includes a playback control card 409 and an "Unfold" icon 601. When the mobile phone 407 detects an operation that a user taps the "Unfold" icon 601, a SmartCare interface 369 shown in FIG. 6B appears. The SmartCare interface 369 includes the playback control card 409 corresponding to the smart television 111, a playback control card 603 corresponding to a smart speaker 113 where the playback control card 603 plays an example audio "Yoga Accompaniment" 607, and displays an example picture 609, and a playback control card 605 corresponding to a smart projector 141, where the playback control card 605 plays an example video "Beautiful Scenery" 611, and displays an example picture 613. The SmartCare interface 369 further includes a "Fold" icon 615. When the mobile phone 407 detects an operation that the user taps the "Fold" icon 615, the SmartCare interface 369 returns to the interface shown in FIG. 6A.

In some possible implementation solutions, multimedia content whose file type is a video can be played by using a video playback application, for example, Huawei Video 325. In some other implementation solutions, multimedia content whose file type is an audio can be played by using an audio playback application, for example, Music 321. During playback resuming, the mobile phone 407 needs to determine a type of the multimedia content by using the processor 201, and play the multimedia content of the type by using a corresponding application.

In some possible implementation solutions, when the plurality of playback control cards need to be displayed, a sequence of the playback control cards needs to be considered. A method for sorting the playback control cards is optionally sorting the playback control cards based on the name 419 (for example, a length or an initial letter) of the intelligent multimedia playback device 250; optionally sorting the playback control cards based on a playback status (playing/pause/buffering) of the device; optionally sorting the playback control cards based on a device status (online/offline), where an online device supports playback control and/or playback resuming, and an offline device optionally supports playback resuming within a period of time; optionally sorting the playback control cards based on a room in which the user is located; or optionally pining a playback control card on top by using a "More" icon 377 on the playback control card, to manually change the sorting sequence.

Figure 6C:
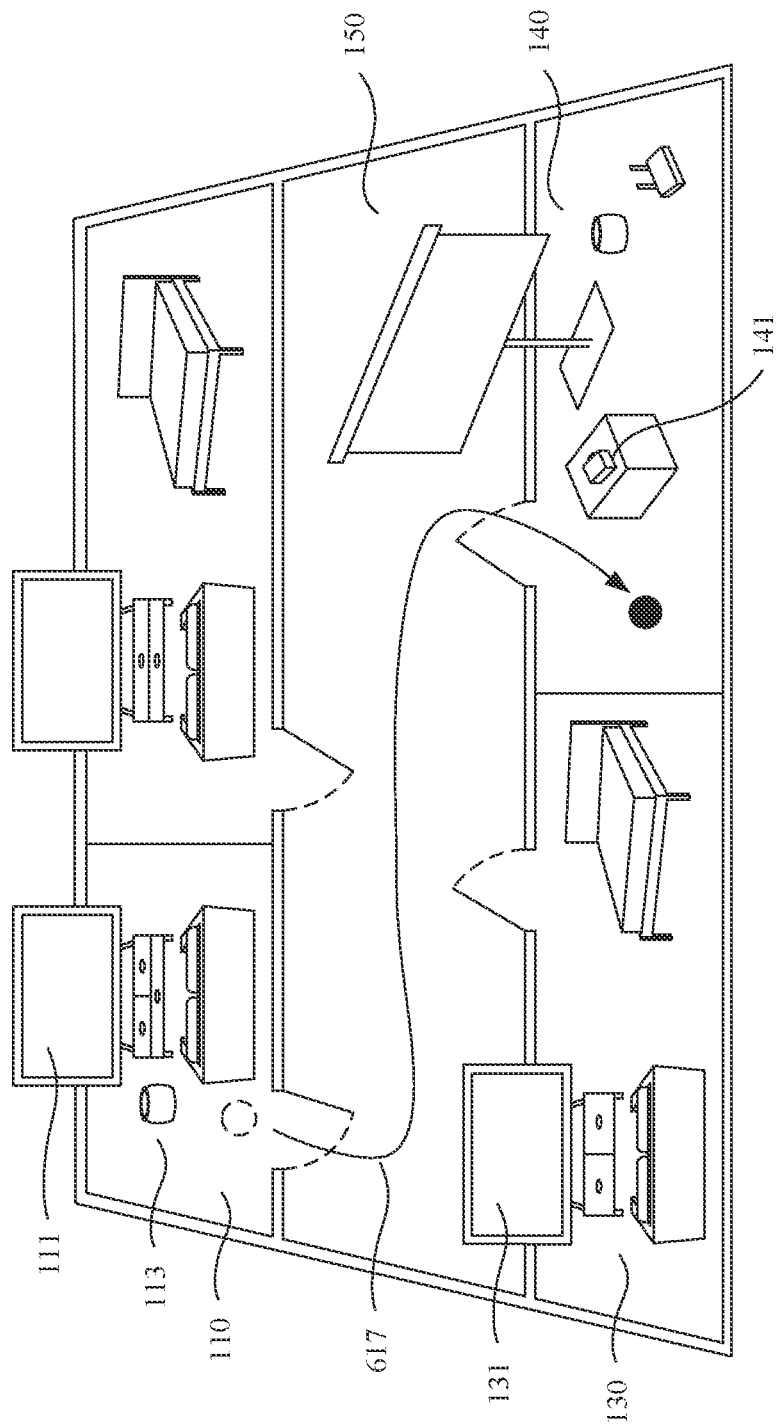
FIG. 6C is a schematic diagram of a movement track of a user in a home scenario according to some implementation solutions.
Figure 6D:
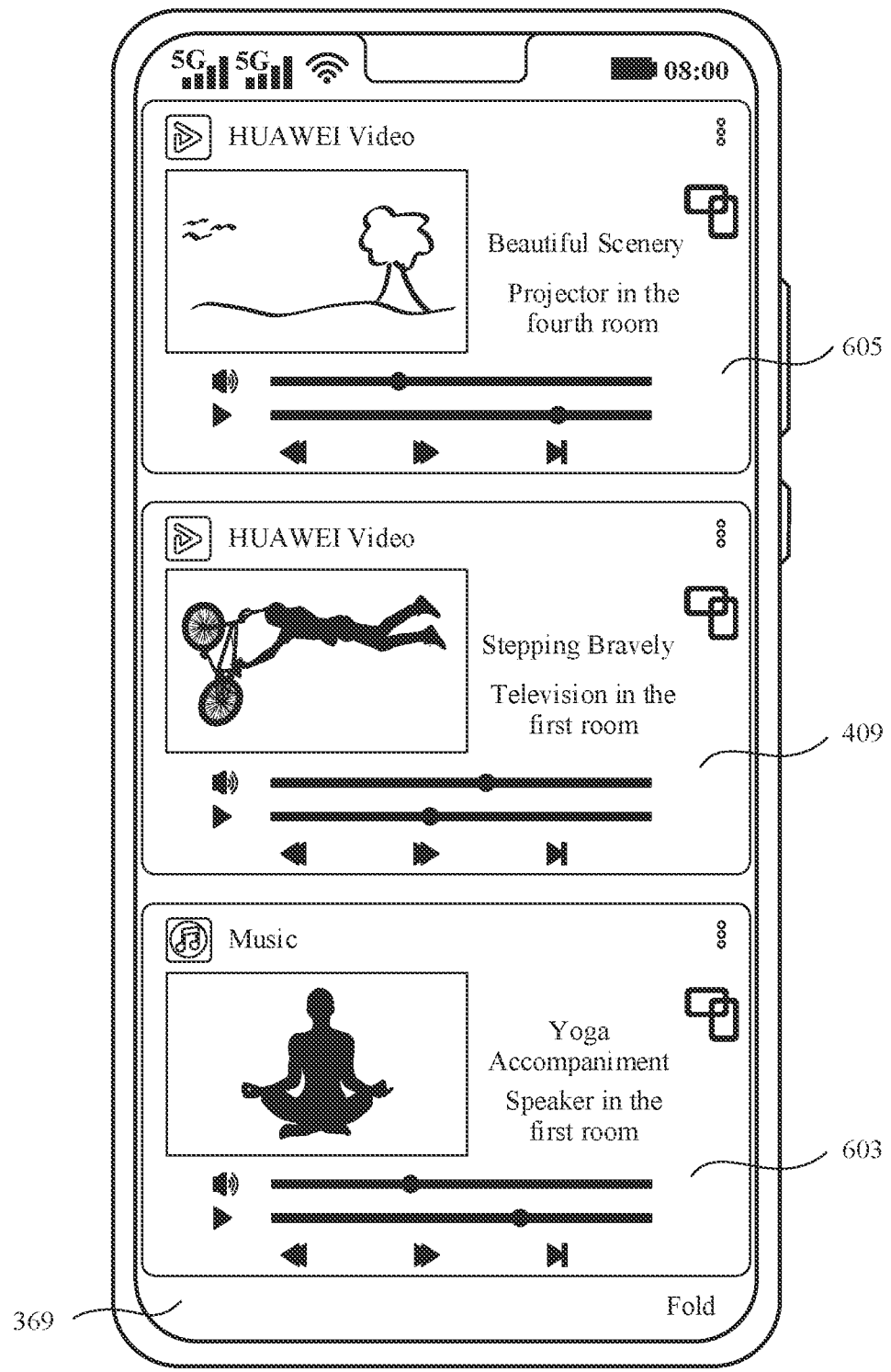
FIG. 6D is a schematic diagram in which a sequence of playback control cards changes after a user moves according to some implementation solutions.

FIG. 6C and FIG. 6D show an implementation solution of sorting playback control cards based on a location of a user.

FIG. 6C shows a movement track 617 of a user in a home scenario 100, that is, the user leaves from a first room 110, passes through a corridor 150, and finally arrives at a fourth room 140. When the user is in the first room 110, the SmartCare interface 369 displays an example of the user interface shown in FIG. 6B. A sorting sequence is: the playback control card 409 corresponding to the smart television 111 in the first room 110→the playback control card 603 corresponding to the smart speaker 113 in the first room 110→the playback control card 605 corresponding to the smart projector 141 in the fourth room 140.

FIG. 6D shows a SmartCare interface 369 shown when a user is in a fourth room 140. A sorting sequence is: the playback control card 605 corresponding to the smart projector 141 in the fourth room 140→the playback control card 409 corresponding to the smart television 111 in the first room 110→the playback control card 603 corresponding to the smart speaker 113 in the first room 110.

In the foregoing implementation solution, a user location needs to be identified. This may be implemented by using an indoor positioning technology. The indoor positioning technology includes but is not limited to a Wi-Fi positioning technology, an RFID positioning technology, an infrared technology, an ultrasonic technology, a Bluetooth technology, an inertial navigation technology, a UWB positioning technology, and an image recognition positioning technology.

Optionally, the positioning technology can be implemented by using the portable electronic device 200 and/or the intelligent multimedia playback device 250. Optionally, in addition to the portable electronic device 200 and/or the intelligent multimedia playback device 250, auxiliary positioning is further implemented by using another device (for example, a home camera).

In some possible implementation solutions, a room that needs to be processed by using the positioning technology is a virtual location label, and a relative location may be determined by determining one or more distances between the portable electronic device 200 and one or more devices. In some other implementation solutions, a room that needs to be processed by using the positioning technology is a physical room. In this case, a specific location of the portable electronic device 200 in the home scenario TOO may be determined by using an inertial navigation technology, an RFID positioning technology, or the like in the positioning technology.

Figure 6E:
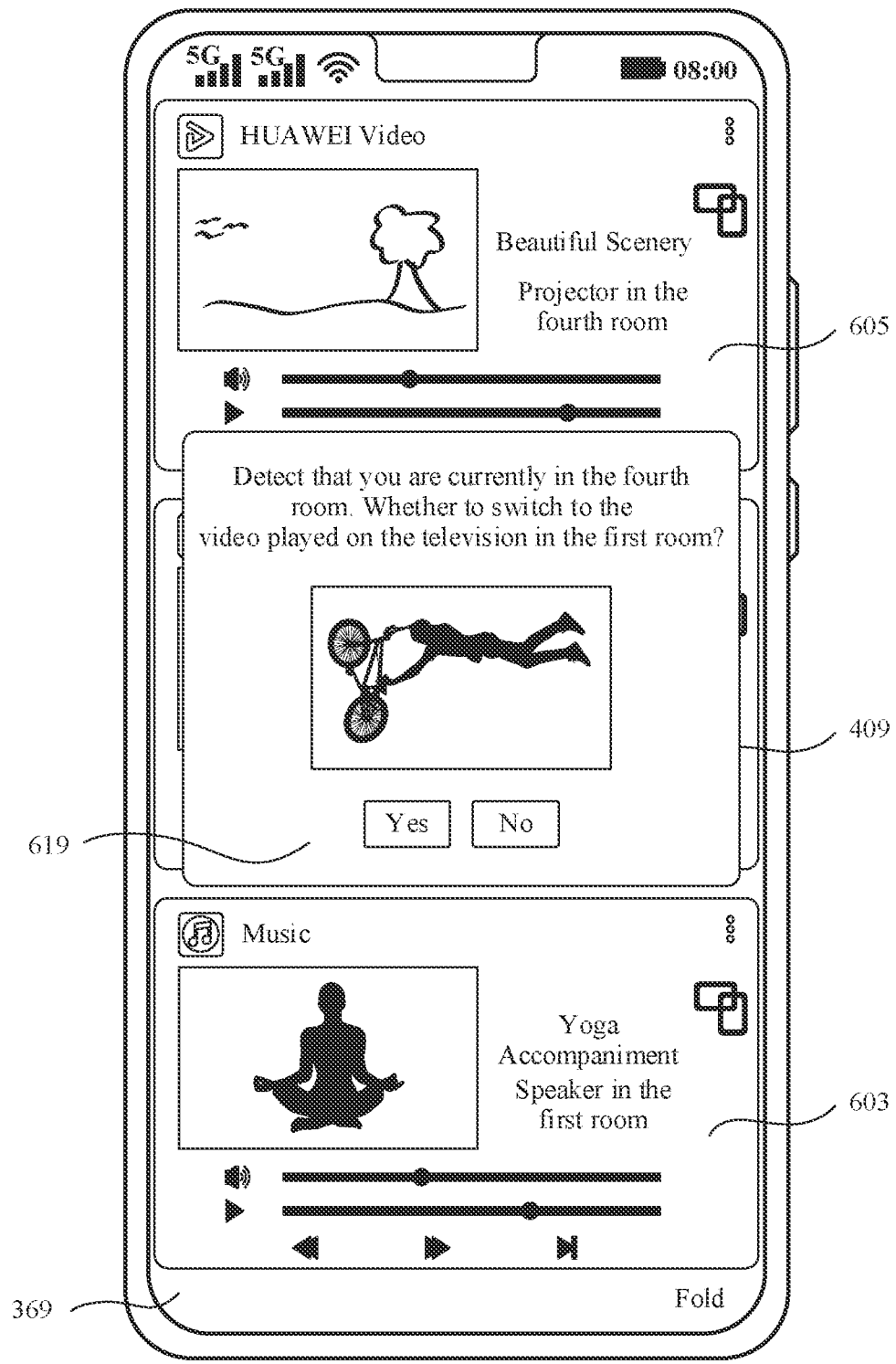
FIG. 6E is a schematic diagram in which a portable electronic device prompts a user to resume playing multimedia content between multimedia playback devices according to some implementation solutions.
Figure 6F:
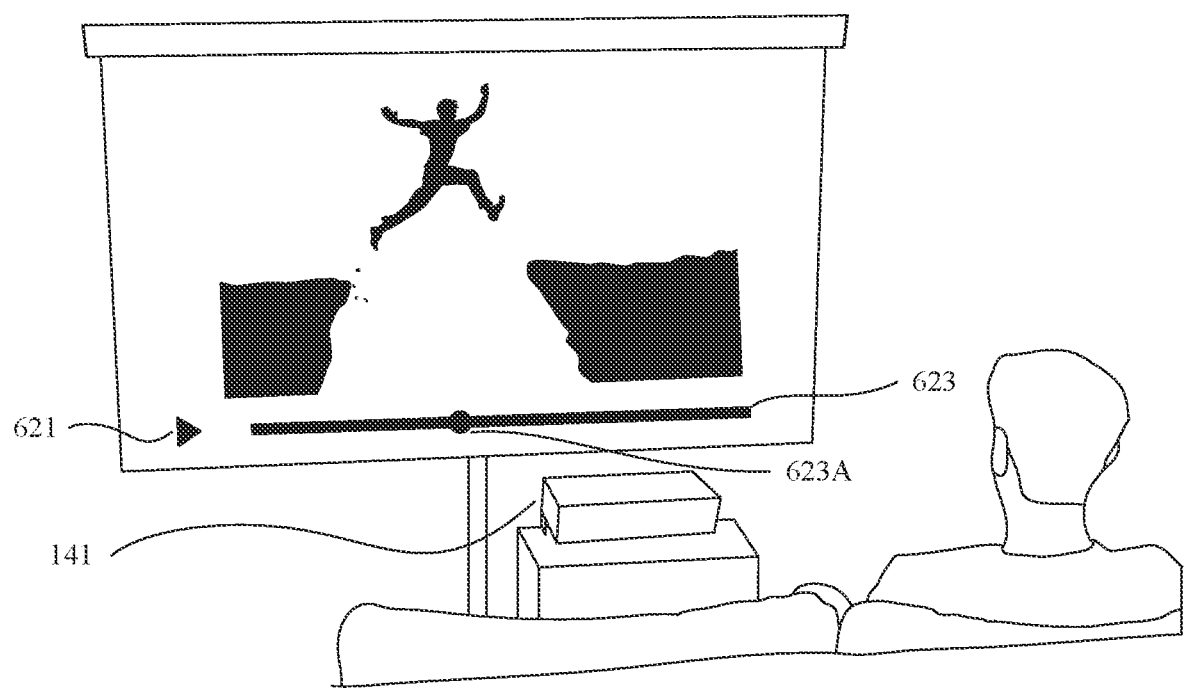
FIG. 6F is a schematic diagram of a scenario in which a user resumes playing multimedia content between multimedia playback devices according to some implementation solutions.
Figure 6G:
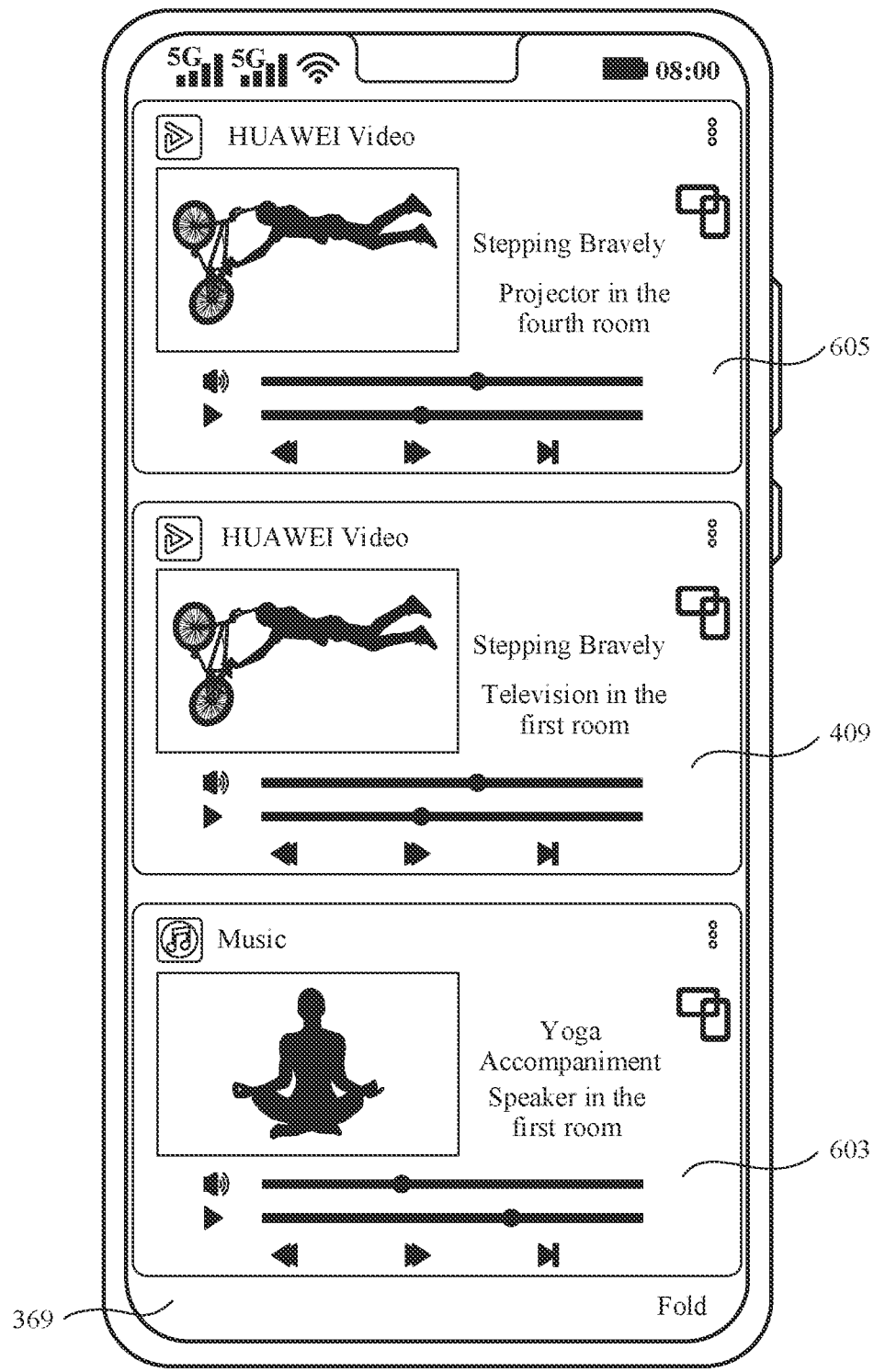
FIG. 6G is a schematic diagram in which a plurality of intelligent multimedia playback devices displays playback control cards in a SmartCare interface according to some implementation solutions.

In some possible implementation solutions, the portable electronic device 200 can resume playing, on a second intelligent multimedia playback device 250, multimedia content played on a first intelligent multimedia playback device 250. It may be understood that the second intelligent multimedia playback device 250 needs to support playback of a type of multimedia content played on the first intelligent multimedia playback device 250. For example, as shown in FIG. 6E, after the user moves from the first room 110 to the fourth room 140, a prompt box 619 appears in the SmartCare interface 369 of the mobile phone 407, to ask the user whether playback of "Stepping Bravely" that is being played on the smart television 111 needs to be resumed on the smart projector 141. FIG. 6F is a schematic diagram of a scenario in which after the portable electronic device 200 receives an operation that the user taps "Yes", the smart projector 141 resumes playing "Stepping Bravely" played on the smart television 111. FIG. 6F shows a playback icon 621, a playback progress display bar 623, and a slider 623A on the playback progress display bar 623 in a smart projector 141. Playback information of the smart projector 141 shown in FIG. 6F is basically consistent with the playback information of the smart television 111 shown in FIG. 6D. FIG. 6G shows playback control cards displayed in the SmartCare interface 369 after the portable electronic device 200 receives an operation that the user taps "Yes". It can be learned that the playback information displayed in the playback control card 605 corresponding to the smart projector 141 is refreshed, and is basically consistent with the playback information displayed in the playback control card 409 corresponding to the smart television 111, so that playback of the multimedia content played on the smart television 111 is resumed on the smart projector 141.

After the second intelligent multimedia playback device 250 resumes playing the multimedia content of the first multimedia playback device 250, details are as follows: In some possible implementation solutions, the first intelligent multimedia playback device 250 remains unchanged, and continues playing the multimedia content. In some possible implementation solutions, the first intelligent multimedia playback device 250 stops playing the multimedia content. In some possible implementation solutions, the portable electronic device 200/the first intelligent multimedia playback device 250/the second intelligent multimedia playback device 250 asks the user whether playback on the first intelligent multimedia playback device 250 needs to end.

Figure 6H:
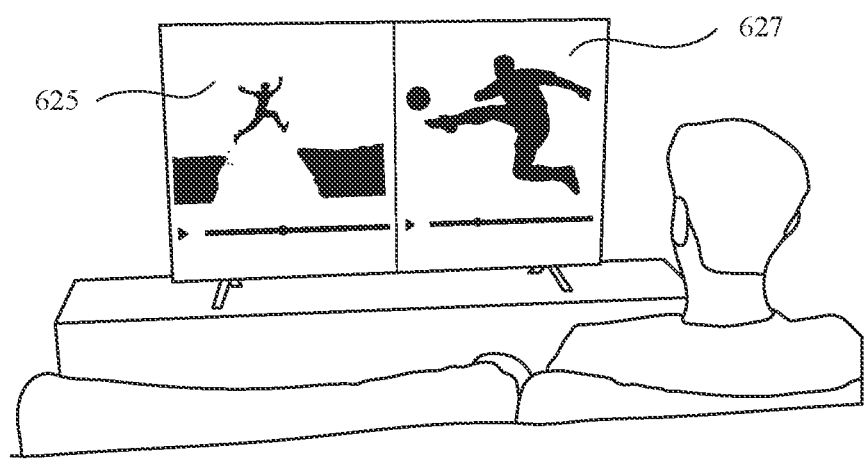
FIG. 6H is a schematic diagram of a scenario in which a user watches videos on a smart television in split-screen mode according to some implementation solutions.

FIG. 6H shows a scenario in which the user uses the smart television 111 in split-screen mode. In this case, a first split screen 625 of the smart television 111 is playing a video "Stepping Bravely", and a second split screen 627 of the smart television 111 is playing a video "Football". Audios corresponding to the videos that are being played on the first split screen 625 and the second split screen 627 are optionally output by a same device, for example, output by the smart television 111; are optionally output by different devices, for example, the audio corresponding to the video played on the first split screen 625 is output by the smart speaker 113, and the audio corresponding to the video played on the second split screen 627 is output by the smart television 111, or may be output by another device such as a speaker or a headset.

Figure 6I:
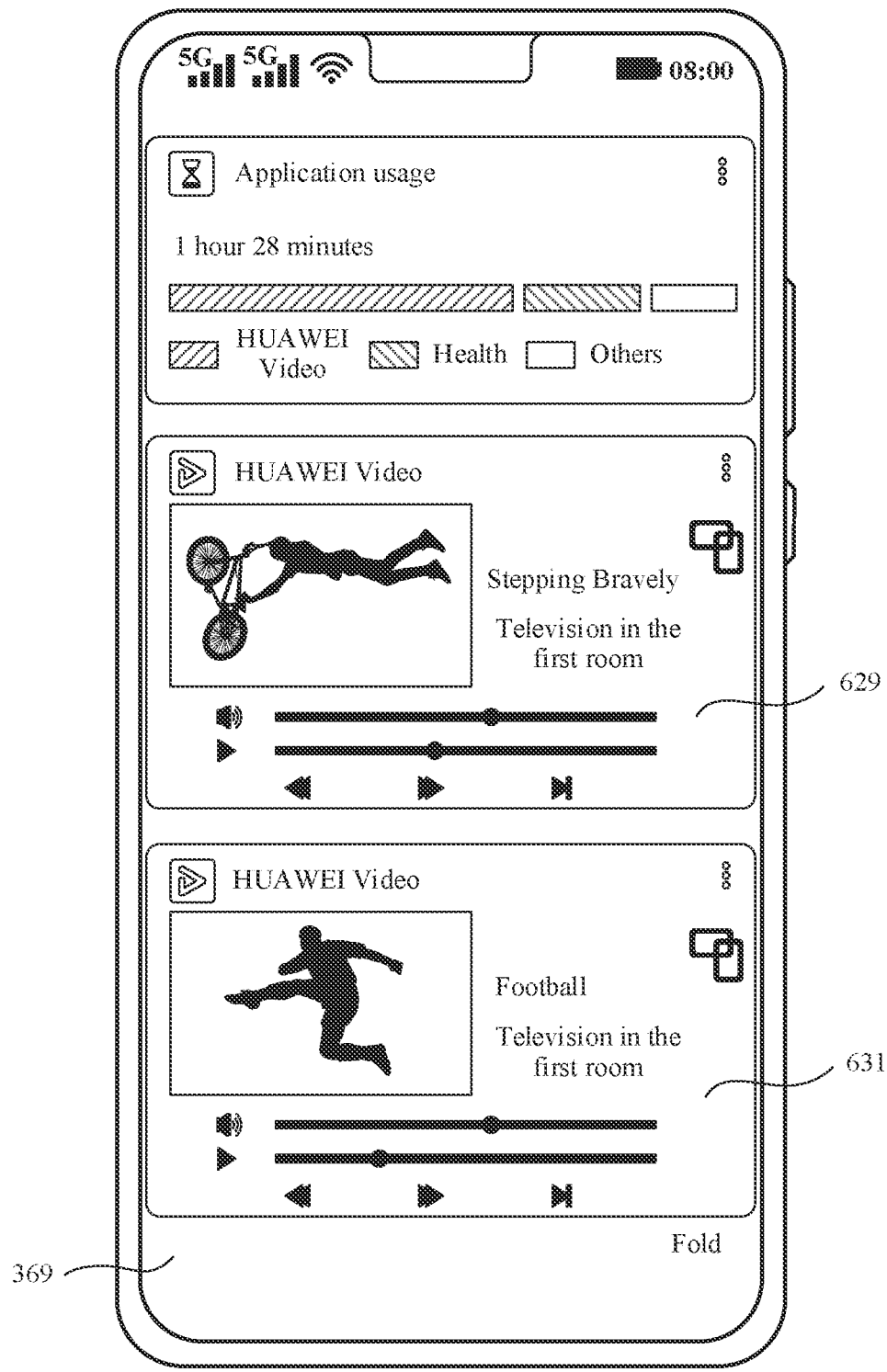
FIG. 6I to FIG. 6K each are a schematic diagram of generating playback control cards in a SmartCare interface when a user watches videos on a smart television in split-screen mode according to some implementation solutions.

FIG. 6I shows that the smart television 111 separately displays, in a SmartCare interface 369, a playback control card 629 corresponding to the first split screen 625 and a playback control card 631 corresponding to the second split screen 627. Names of intelligent multimedia playback devices in the playback control cards are "Television 111 in the first room", In some possible implementation solutions, the playback control card 629 corresponding to the first split screen 625 is displayed above the playback control card 631 corresponding to the second split screen 627. In some possible implementation solutions, optionally, the "first split screen" and the "second split screen" are respectively marked in the playback control card 629 and the playback control card 631 for prompting the user (this solution is not shown in FIG. 6I).

Figure 6J:
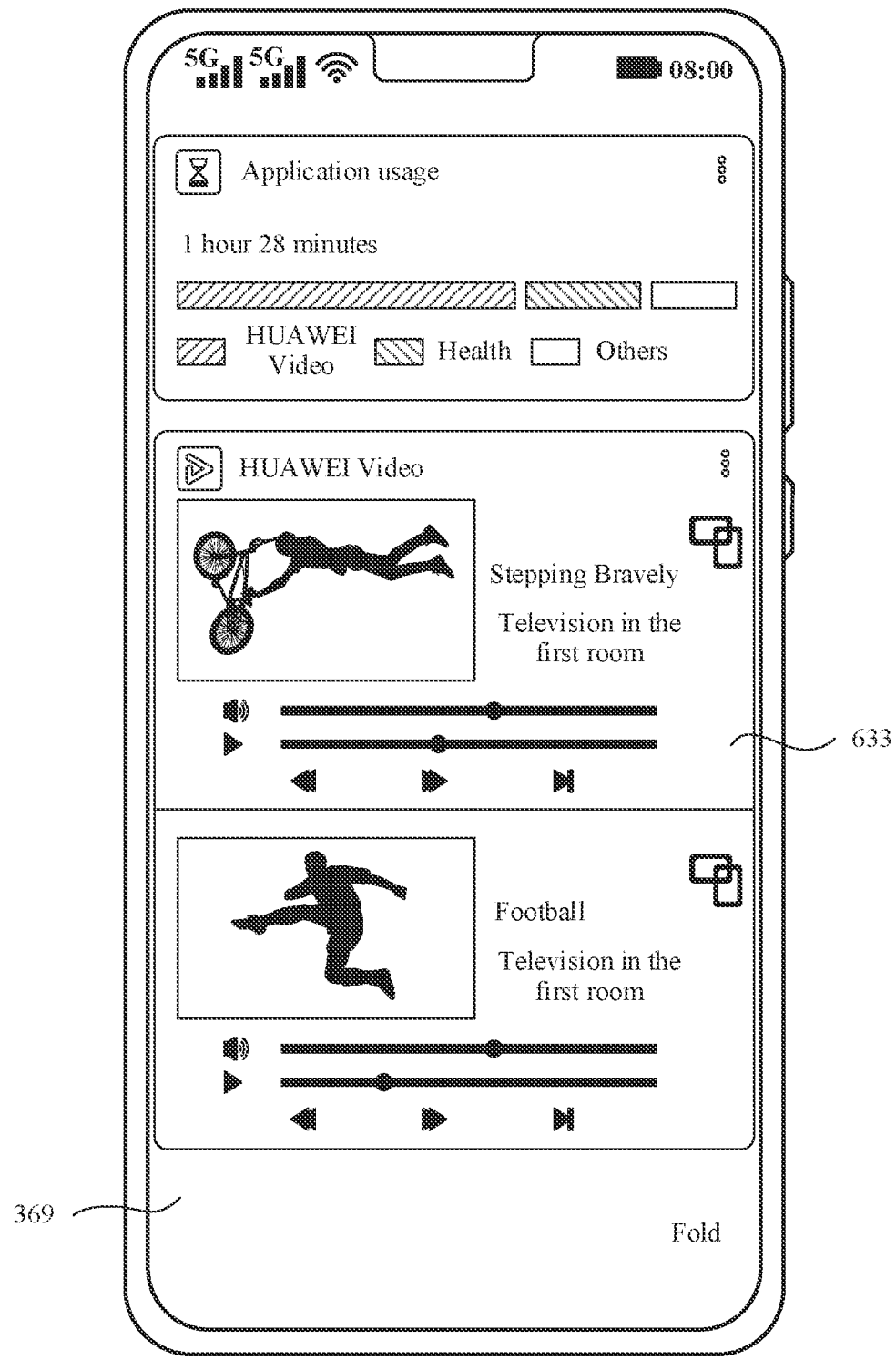

FIG. 6J shows that the smart television 111 displays, in a SmartCare interface 369, a playback control card 633 corresponding to the first split screen 625 and the second split screen 627. The playback control card 633 includes playback information of both the first split screen 625 and the second split screen. In this embodiment, a plurality of pieces of different multimedia content in one intelligent multimedia playback device 250 are optionally displayed in one playback control card.

Figure 6K:
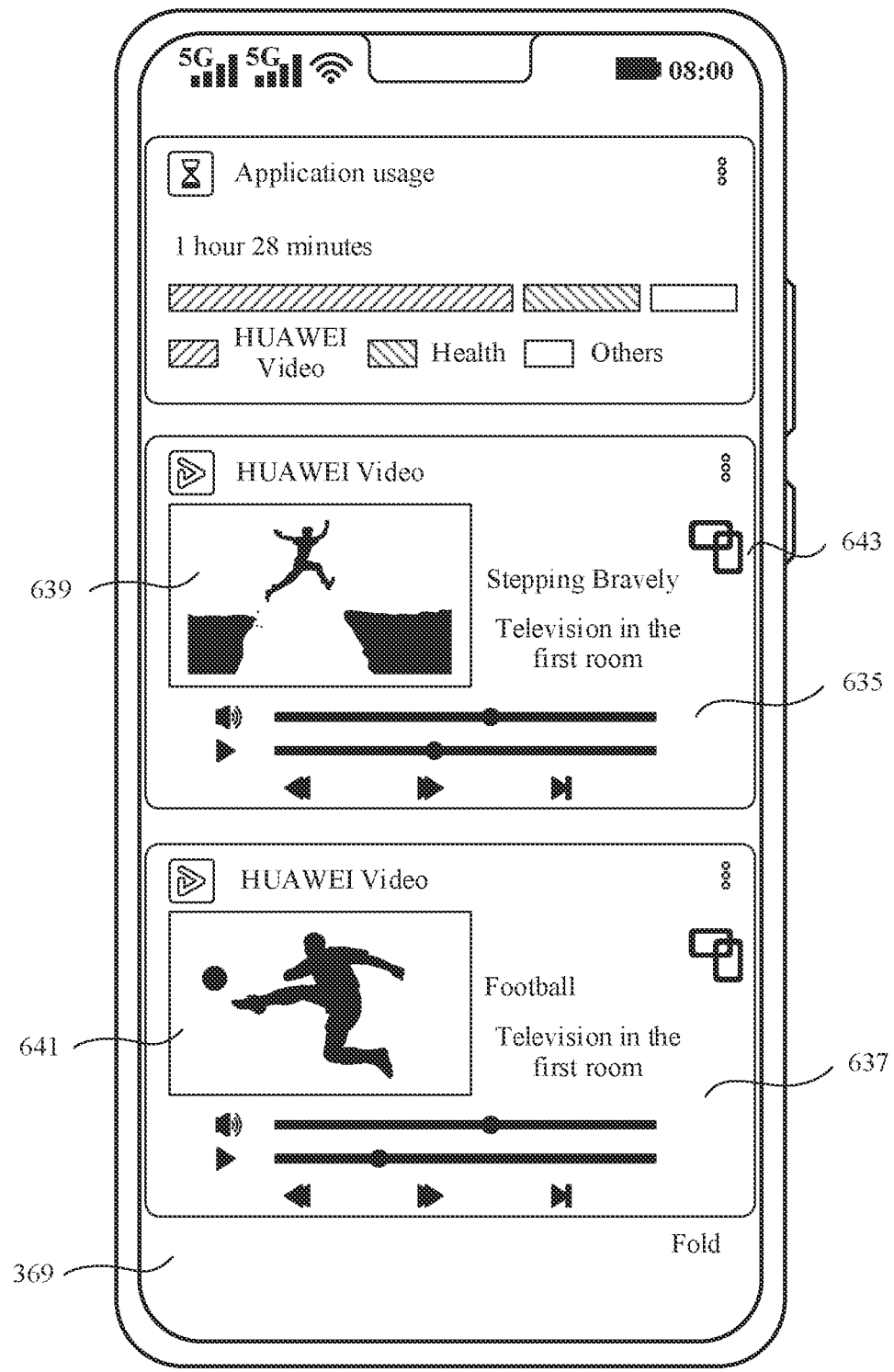

FIG. 6K is a schematic diagram of playing a plurality of videos in a SmartCare interface 369 when the user watches the plurality of videos by using the smart television 111 in split screen mode. The SmartCare interface 369 includes a playback control card 635 corresponding to the first split screen 625 and a playback control card 637 corresponding to the second split screen 627. In this case, an associated picture 639 of the multimedia content corresponds to a real-time frame corresponding to a playback progress in the video played on the first split screen 625, and an associated picture 641 of the multimedia content corresponds to a real-time frame corresponding to a video playback progress in the video played on the second split screen 627. In this manner, the user can watch the multimedia content in real time in the playback control card.

Figure 6L:
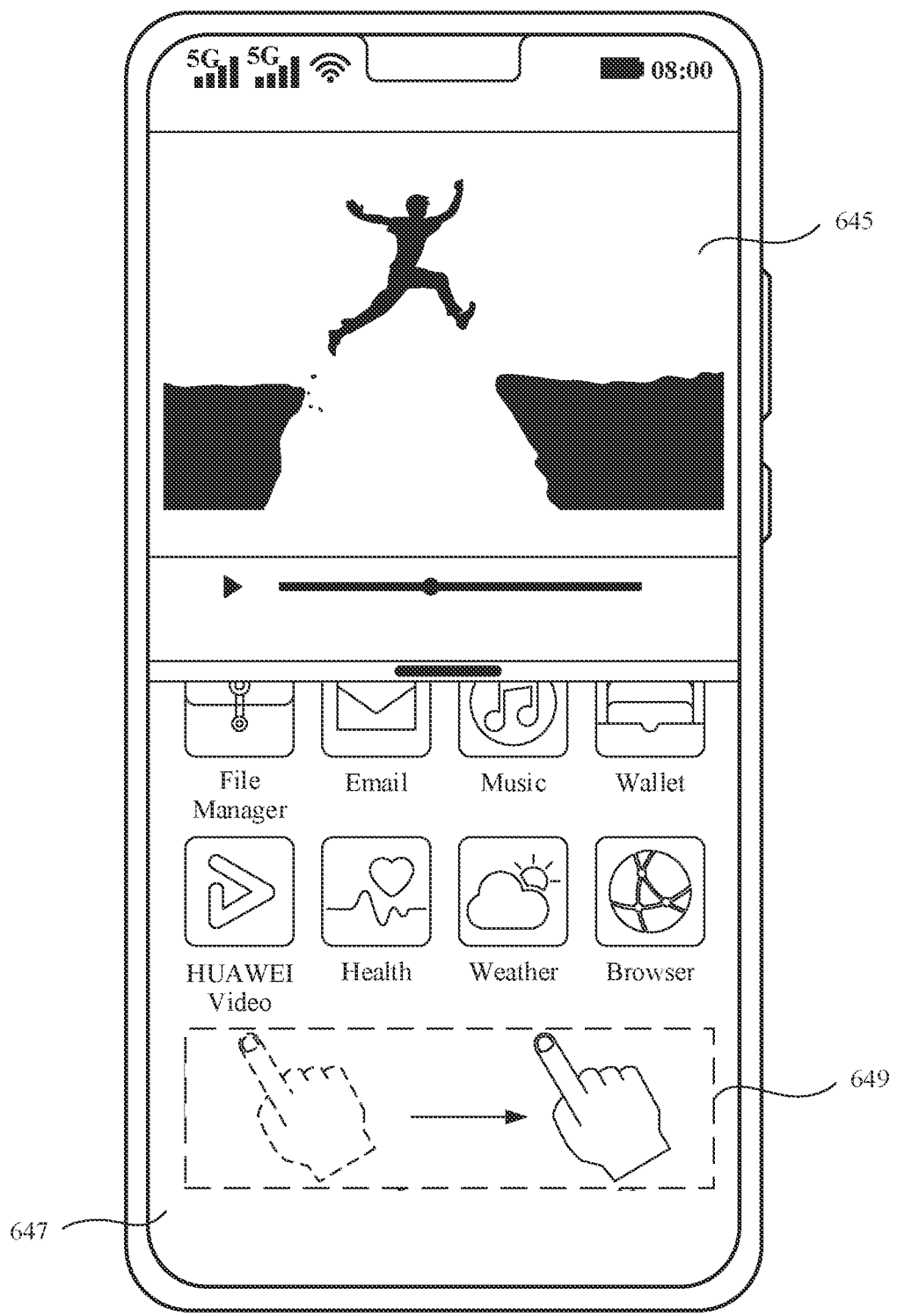
FIG. 6L to FIG. 6O each are a schematic diagram in which a user resumes playing, on a portable electronic device, multimedia content played in split-screen mode according to some implementation solutions.
Figure 6M:
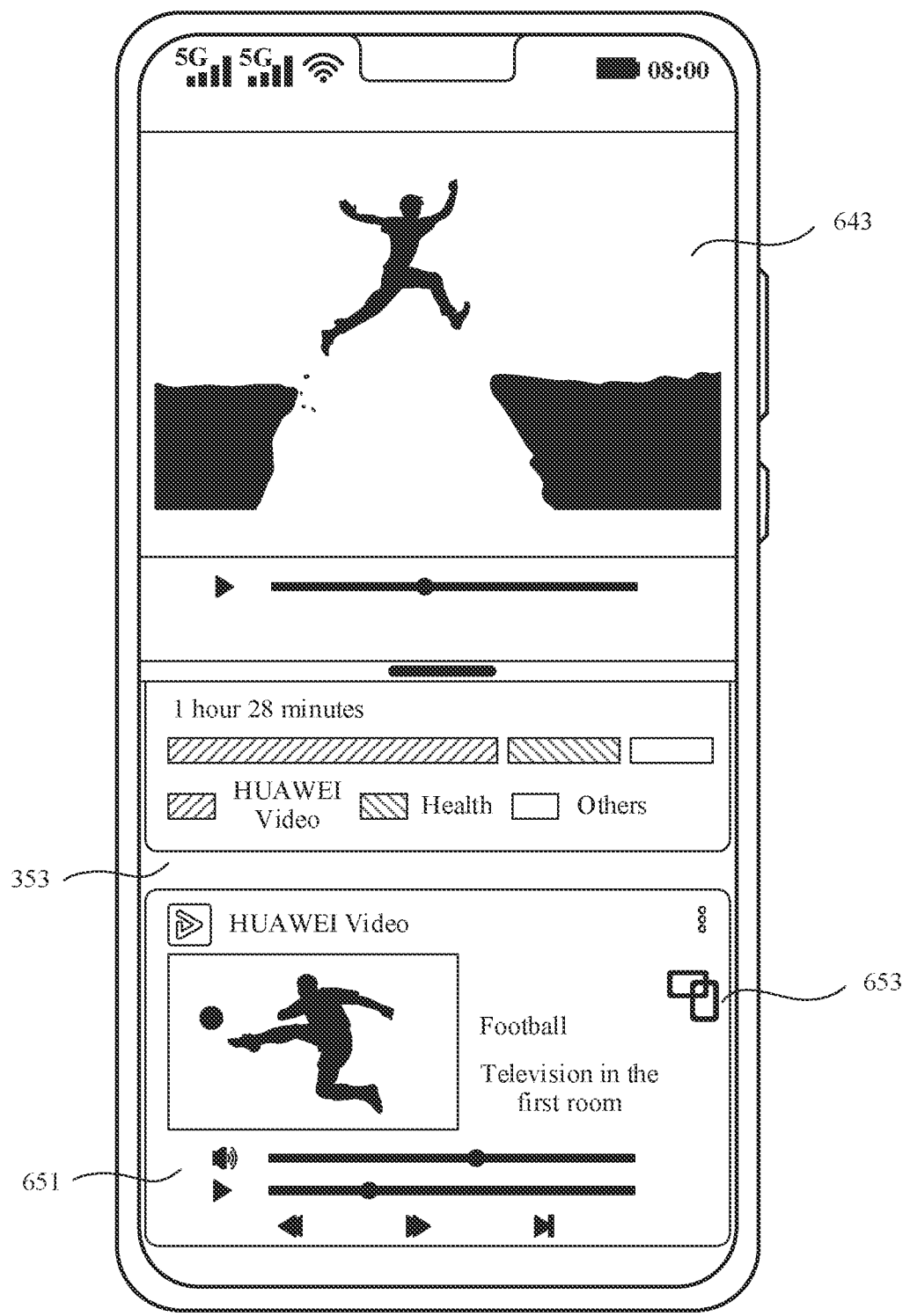
Figure 6N:
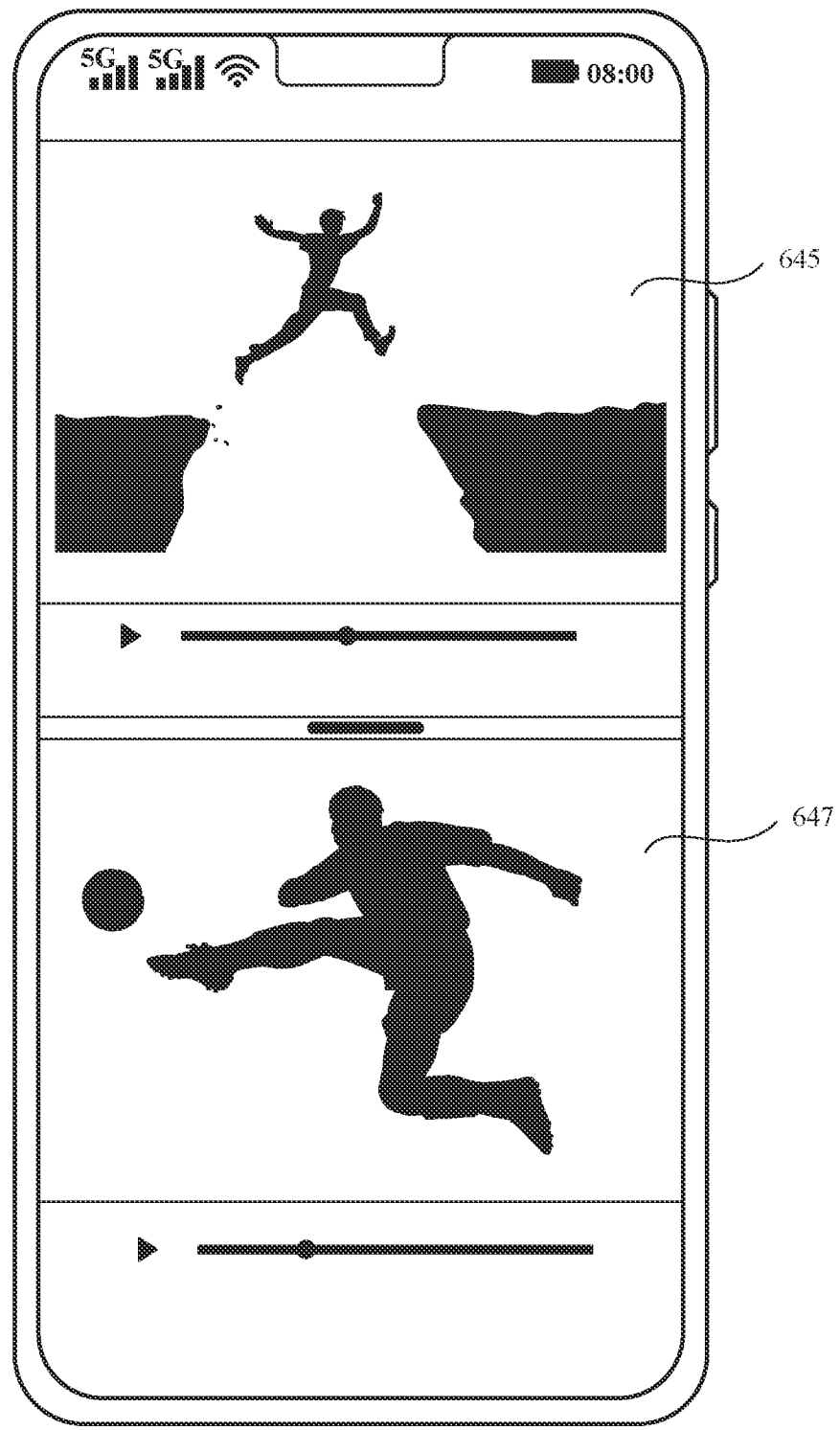

In some possible implementation solutions, when the portable electronic device 200 detects behavior that the user touches and holds a playback resume icon 643, the portable electronic device 200 shows an interface shown in FIG. 6L. A first area 645 of the interface plays the video played on the first split screen 625, and a second area 647 of the interface corresponds to the user interface 301. When the portable electronic device 200 detects a gesture 649 that the user slides from left to right in the second area 647, the second area 647 is displayed as a control center interface 353 shown in FIG. 6M, and the control center interface 353 includes a playback control card 651. It may be understood that touching and holding is optionally an example of a representation manner, or is optionally a voice input whose semantics is watching in split-screen mode, or is optionally an operation that the portable electronic device 200 detects that the user presses the playback resume icon 643 and then drags the playback resume icon to the playback control card 637. In some possible implementation solutions, when the portable electronic device 200 detects behavior that the user taps the playback resume icon 653, the portable electronic device 200 shows an interface shown in FIG. 6N. A first area 645 of the interface plays the video played on the first split screen 625, and a second area 647 of the interface plays the video played on the second split screen 627. It may be understood that tapping is optionally an example of a representation manner, or is optionally a voice input Whose semantics is watching in split-screen mode.

Figure 6O:
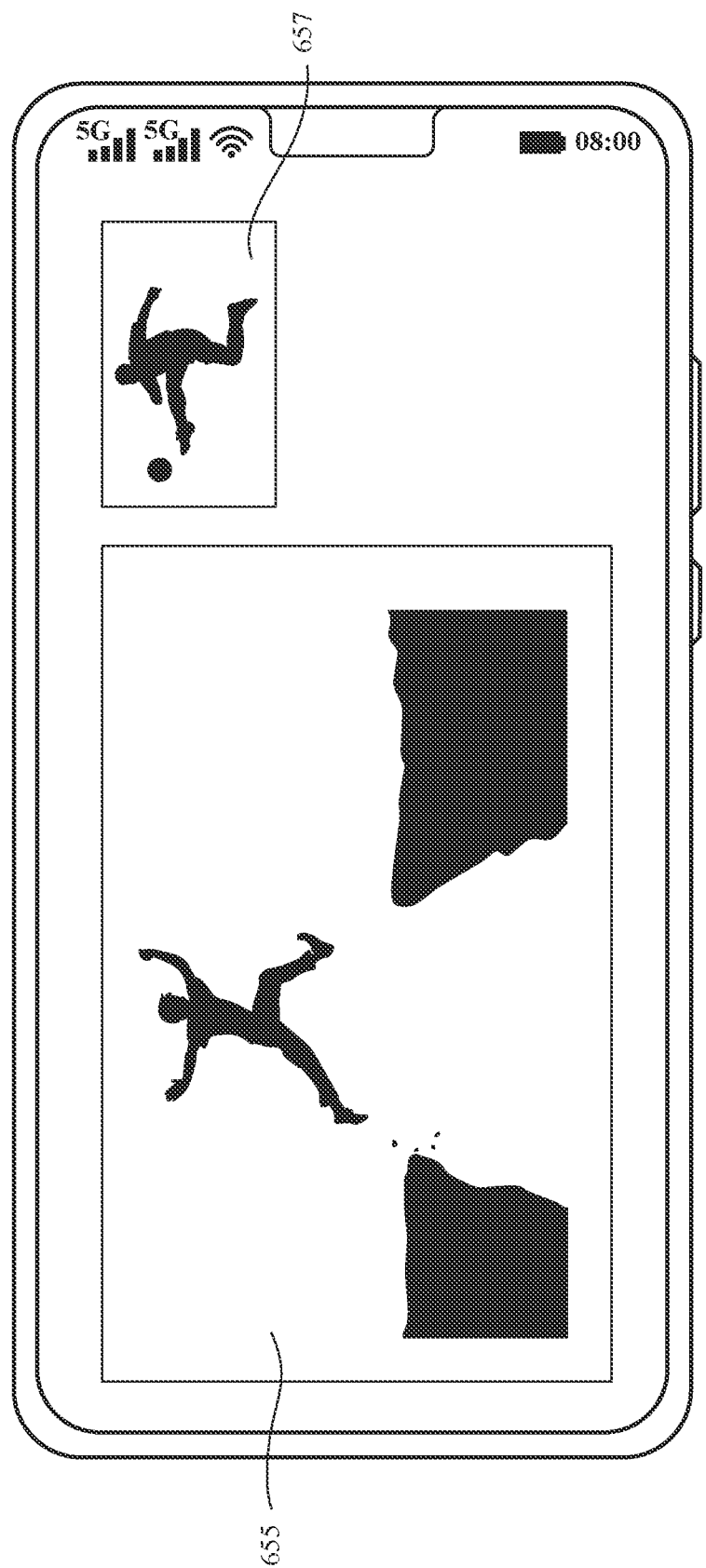

In some possible implementation solutions, the portable electronic device 200 may alternatively display, in a form of one or more floating windows, an interface shown in FIG. 6O. The interface includes a first floating window 655 and a second floating window 657. The portable electronic device 200 can optionally detect a user input, to adjust a size and a location of the floating window. It may be understood that the portable electronic device 200 optionally includes more or fewer floating windows than those shown in FIG. 6O.

Figure 6P:
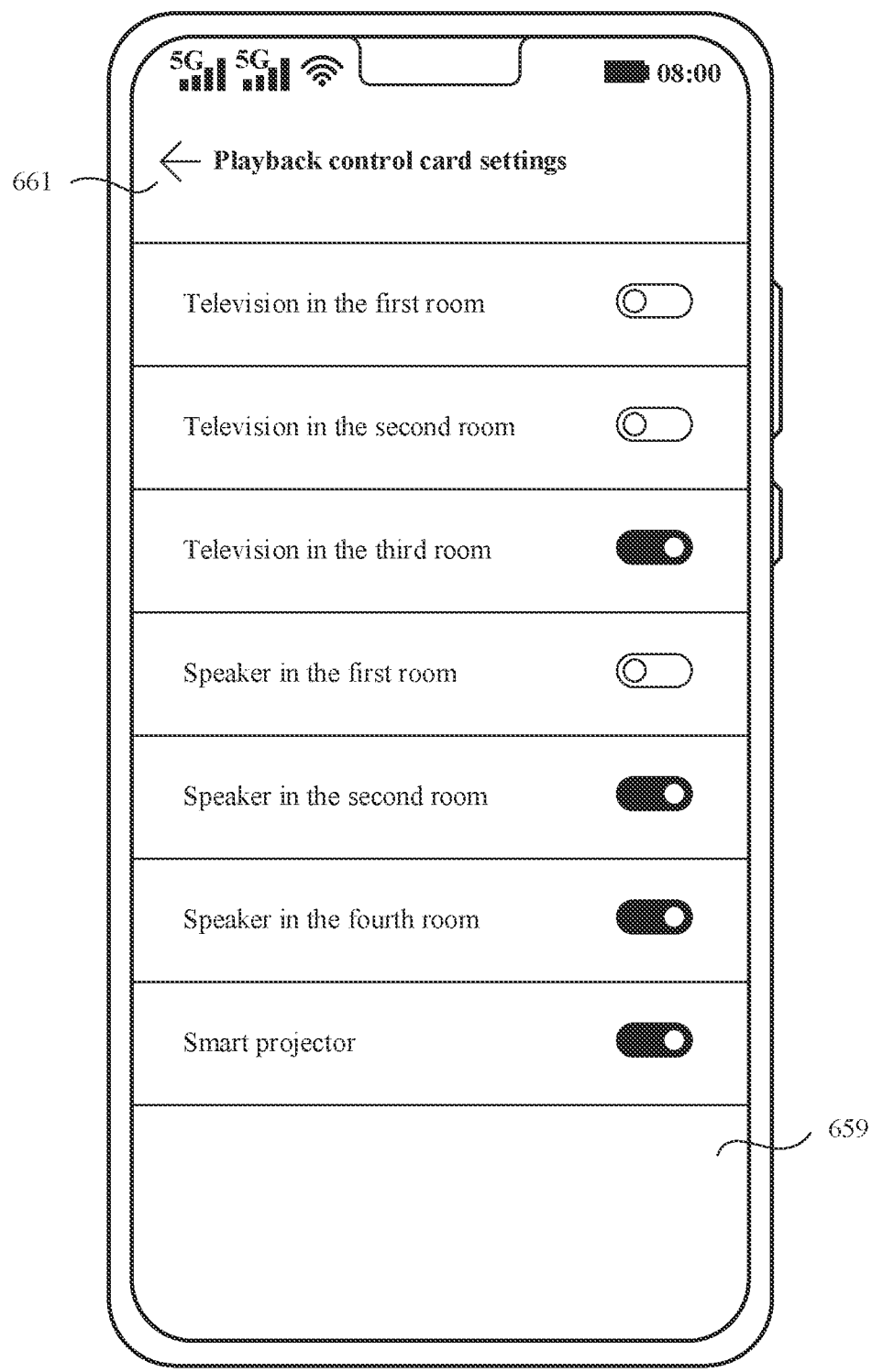
FIG. 6P is a schematic diagram of configuring, on a portable electronic device, a function of generating a playback control card by an intelligent multimedia playback device according to some implementation solutions.

In some possible implementation solutions, the portable electronic device 200 may receive a user operation to determine whether to generate a playback control card corresponding to an intelligent multimedia playback device 250 on the portable electronic device 200, for example, a playback control card setting interface 659 shown in FIG. 6P. The interface 659 includes an interface identifier "Playback control card settings" 661, and the interface 659 displays intelligent multimedia playback devices 250 that are associated with the "AI Life" application and that are used for configuration, for example, the television 111 in the first room and the television 121 in the second room.

Figure 6Q:
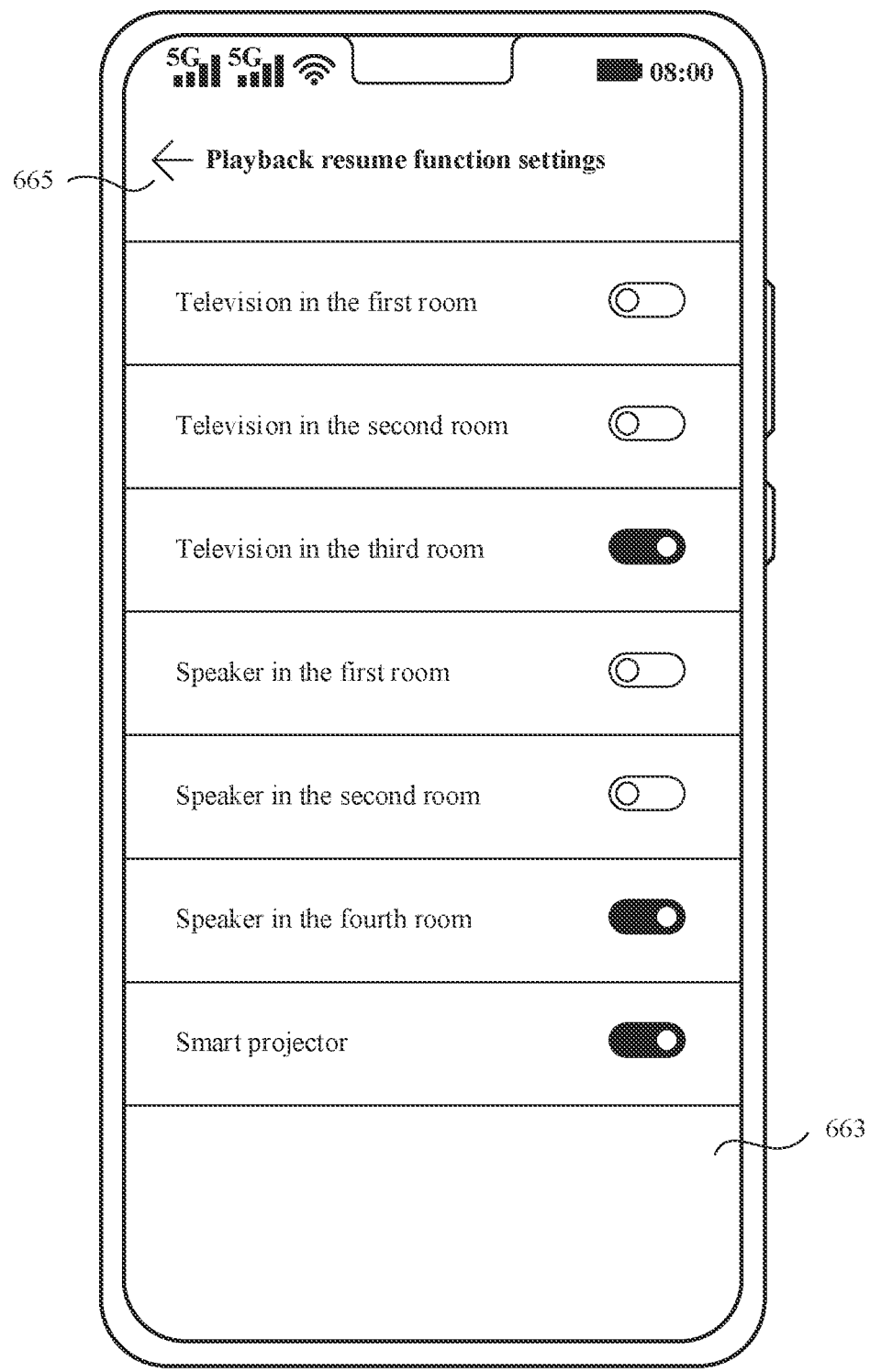
FIG. 6Q is a schematic diagram of configuring a playback resume function of an intelligent multimedia playback device on a portable electronic device according to some implementation solutions.

In some possible implementation solutions, the portable electronic device 200 may further receive a user operation to determine whether the playback control card supports a playback resume function, for example, a playback resume function setting interface 663 shown in FIG. 6Q. The interface 663 includes an interface identifier "Playback resume function settings" 665, the interface 663 includes an interface identifier "Playback control card settings" 665, and the interface 663 displays intelligent multimedia playback devices 250 that are associated with the "AI Life" application and that are used for configuration, for example, the television 111 in the first room and the television 121 in the second room.

In some possible implementation solutions, the intelligent multimedia playback device 250 can support a playback resume function only when a playback control card is generated. In some possible implementation solutions, the intelligent multimedia playback device 250 can also support the playback resume function without displaying the playback control card, for example, implement the playback resume function through a voice input. For example, after receiving a user voice "Hey Celia, continue playing 'Stepping Bravely' on the television on the mobile phone", the portable electronic device 200 may resume playing, on the portable electronic device 200, video content played on the television.

Figure 6R:
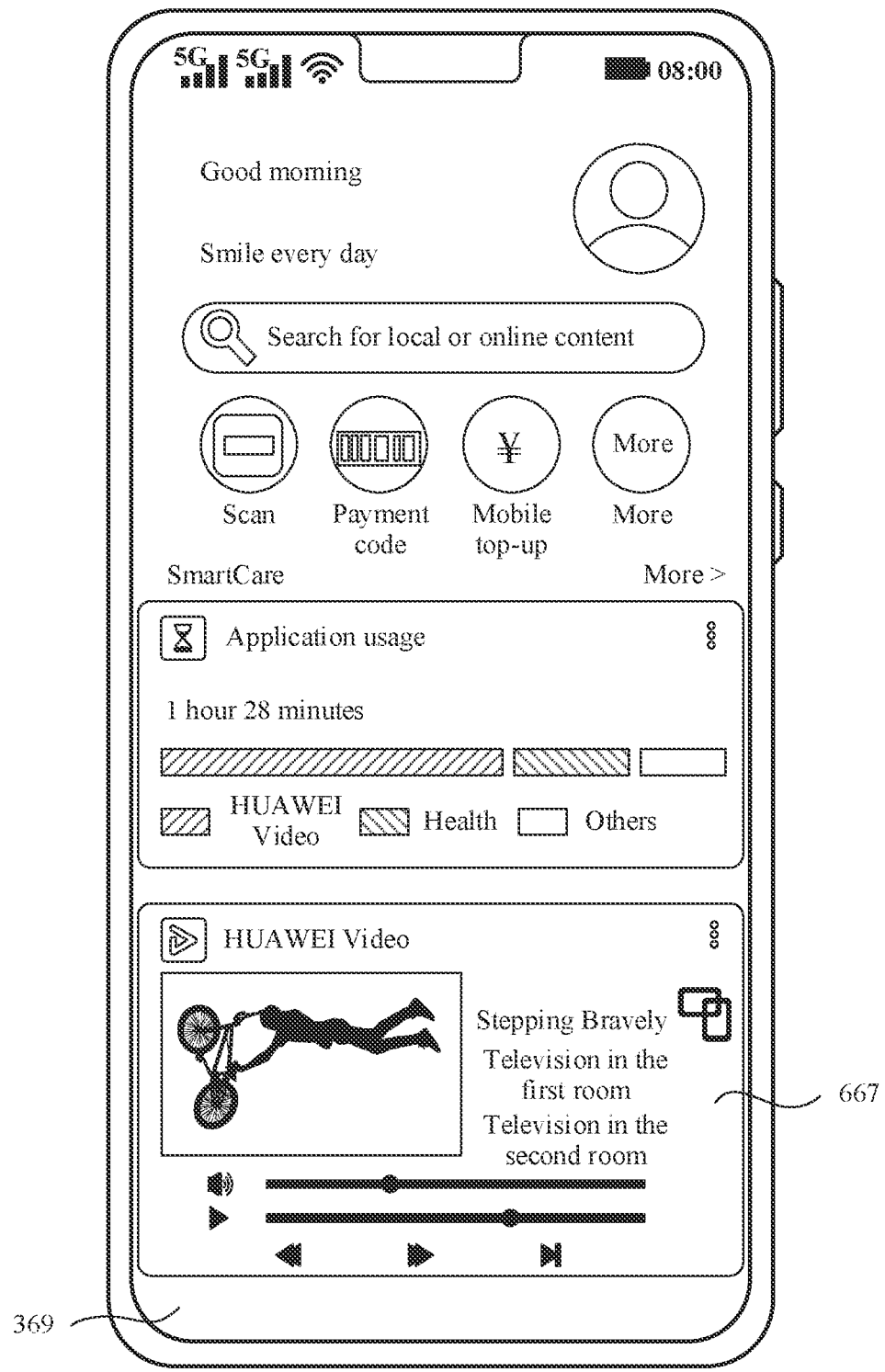
FIG. 6R to FIG. 6U each are a schematic diagram of generating a playback control card in a SmartCare interface when a plurality of intelligent multimedia playback devices play same multimedia content according to some implementation solutions.

In some possible implementation solutions, a plurality of intelligent multimedia playback devices 250 of a same type play same multimedia content and have same playback information, and the plurality of intelligent multimedia playback devices 250 are displayed in one playback control card. In this scenario, in a large family, family members in a plurality of rooms can simultaneously watch same multimedia content by using multimedia devices in respective rooms, and playback progresses or volume of the multimedia content in the rooms is the same. In this case, the playback control card can display the volume and the playback progress. In some examples, in a scenario in which family members in a plurality of rooms simultaneously watch same multimedia content by using multimedia devices in respective rooms, playback progresses or volume of the multimedia content in the rooms may be different (for example, a user in a first room prefers high volume, and a television in the first room may increase the volume when playing "Stepping Bravely"). In this case, the playback control card may not display the volume or the playback progress. As shown in FIG. 6R, the television 111 in the first room and the television 121 in the second room are playing same multimedia content, and a playback control card 667 is displayed in a SmartCare interface 369. In this manner, playback control can be performed on a plurality of intelligent multimedia playback devices in one playback control card.

Figure 6S:
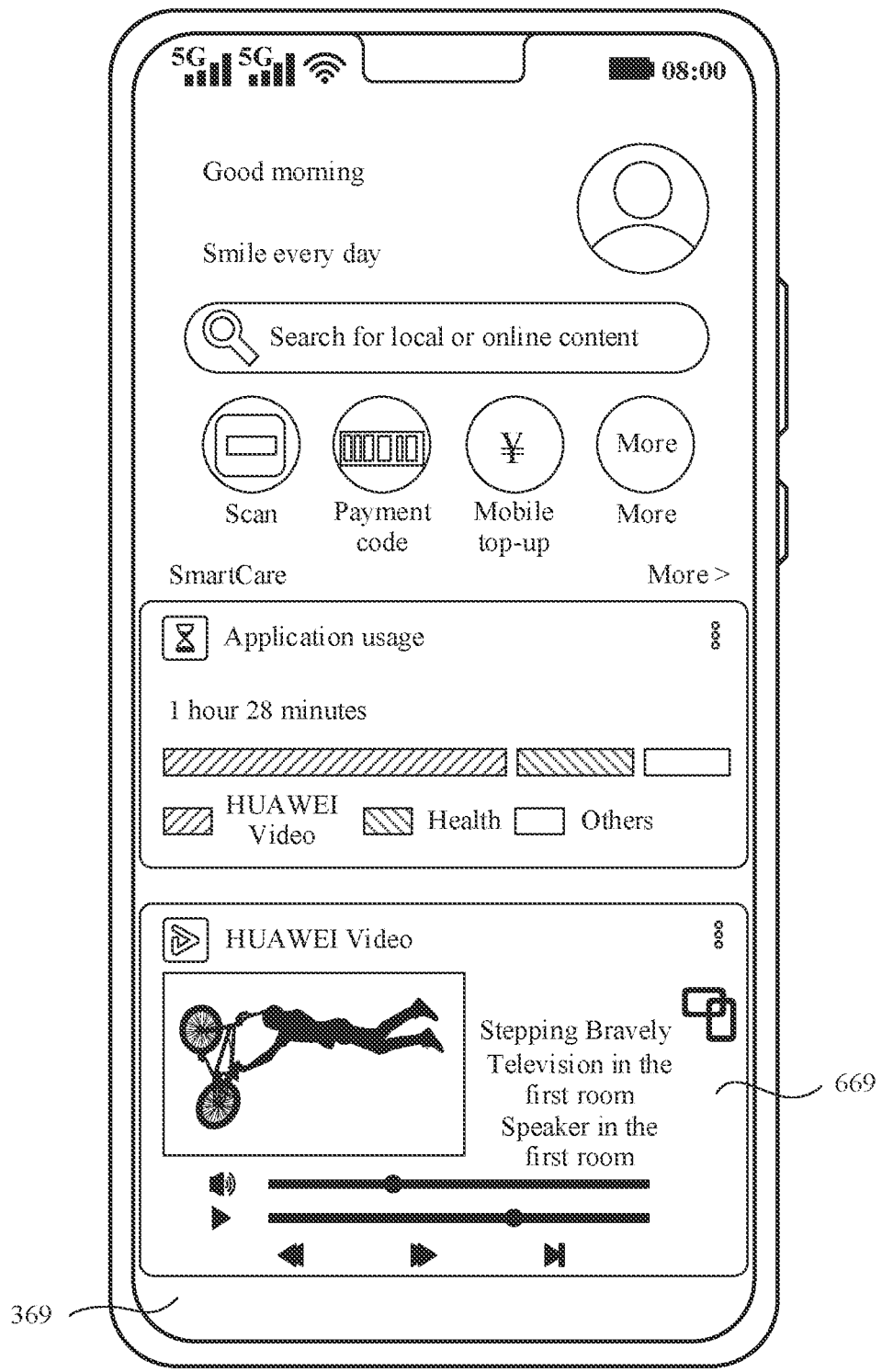

In some possible implementation solutions, a plurality of intelligent multimedia playback devices 250 of different types play same multimedia content. For example, a smart television is playing a video corresponding to the multimedia content, and a smart speaker is playing an audio corresponding to the multimedia content. In this case, the plurality of intelligent multimedia playback devices 250 are displayed in one playback control card. As shown in FIG. 6S, the television 111 in the first room and the speaker 113 in the first room are playing same multimedia content, and a playback control card 669 is displayed in a SmartCare interface 369. In some possible implementation solutions, the playback control card 669 optionally includes a volume display bar corresponding to each intelligent multimedia playback device 250, so that a user input can be received to adjust volume of each intelligent multimedia playback device 250.

Figure 6T:
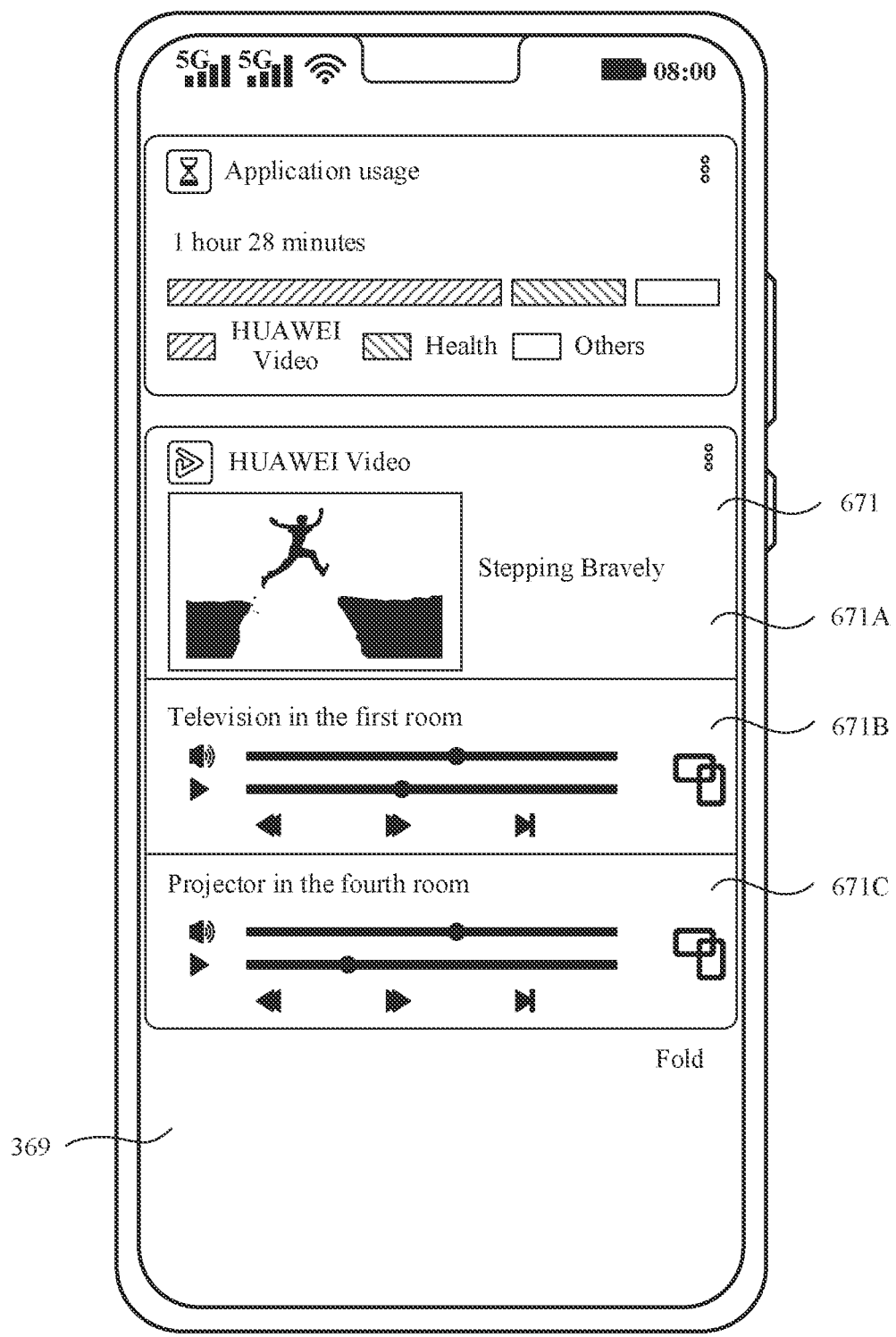
Figure 6U:
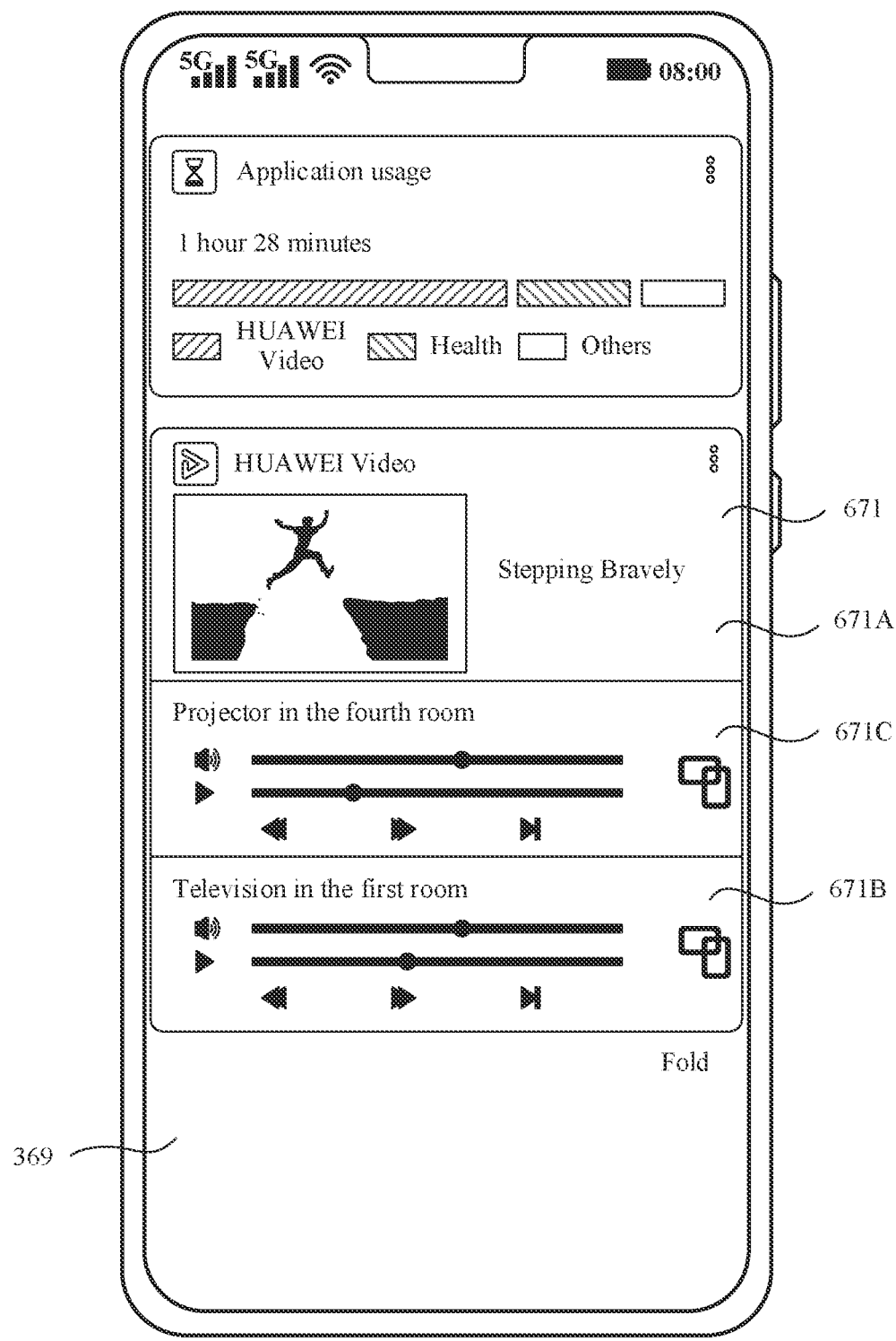

In some possible implementation solutions, a plurality of intelligent multimedia playback devices 250 of different types play same multimedia content, and the plurality of intelligent multimedia playback devices 250 are optionally displayed in one playback control card. As shown in FIG. 6T, the television 111 in the first room and the smart projector 141 are playing same multimedia content, and a playback control card 671 is displayed in a SmartCare interface 369. The playback control card 671 includes an area 671A used to display multimedia content, an area 671B used to display playback information of the television 111 in the first room, and an area 671C used to display playback information of the projector 141 in the fourth room. In this case, at least one piece of playback information of the smart television 111 and the projector 141 is different. If the playback information of the smart television 111 and the projector 141 is the same, the playback control card is optionally the playback control card 669 shown in FIG. 6S. A display sequence of the area 671B and the area 671C may be adjusted and displayed based on a location of the portable electronic device 200 in the home scenario 100. As shown in FIG. 6T, the portable electronic device 200 is in the first room 110, the user is watching "Stepping Bravely" through the smart television 111, and the area 671B is displayed above the area 671C. As shown in FIG. 6U, the portable electronic device 200 is in the fourth room 140, the user is watching "Stepping Bravely" through the projector 141, and the area 671C is displayed above the area 671B, to bring better moving watching experience to the user.

The following describes a specific method procedure in embodiments of this application.

Playback information optionally includes a multimedia content name (for example, the name "Stepping Bravely" 415 of the played video in the playback control card 409 shown in FIG. 4C), a multimedia content identifier, a multimedia content type (for example, an audio or a video), multimedia content duration, an associated picture of the multimedia content (for example, the associated picture 417 of the played video in the playback control card 409 shown in FIG. 4C), a multimedia content source address, and the like. The playback information optionally includes a playback status (for example, a playing state/pause state, and optionally represented by the playback icon 423/playback pause icon 445), a playback progress (for example, displayed by the playback progress display bar 427), a volume status (for example, a non-muted state/muted state, and displayed by the volume icon 421/mute icon 441), and playback volume (for example, displayed by the volume display bar 425).

The multimedia content identifier and the multimedia content source address may enable the device or another device to obtain the multimedia content from a server.

Device information optionally includes a device name (for example, the name 419 of the intelligent multimedia playback device 250, for example, a name "Television in the first room" of the smart television 111), a device identifier, and a device type (for example, the smart television 111 or the smart speaker 113).

Figure 7A:
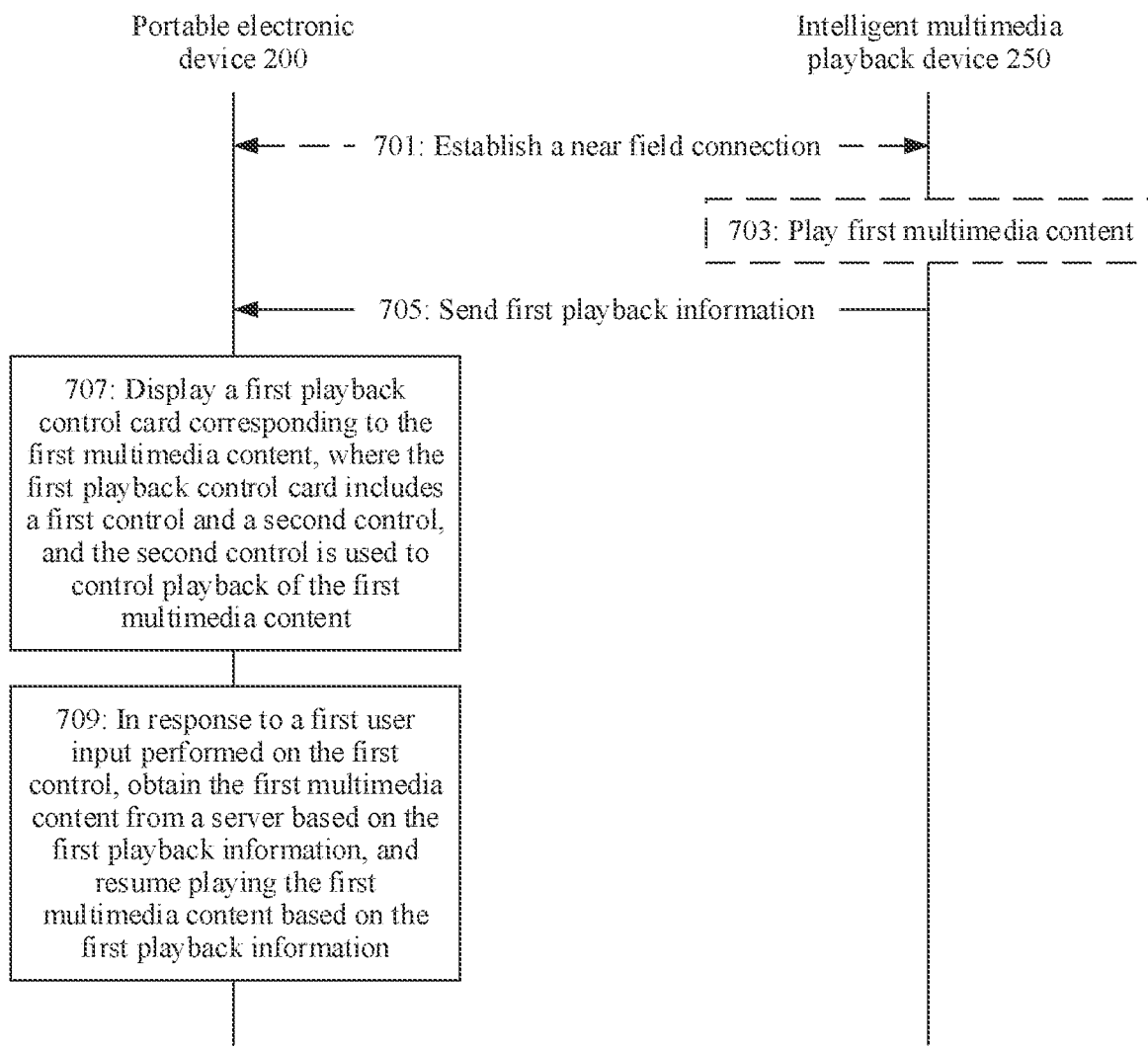
FIG. 7A is a flowchart of an embodiment of this application according to some implementation solutions.

FIG. 7A shows an embodiment of this application. Step 701 is an optional execution step.

A portable electronic device 200 establishes (step 701) a near field connection to an intelligent multimedia playback device 250, and the devices that establish the near field connection can exchange data. For example, the mobile phone 407 of the user in FIG. 4B accesses, by using the wireless communications module 217, a WLAN provided by the router 145 shown in FIG. 1A, and the smart television 111 and the smart speaker 113 access, by using the wireless communications module 265, the WLAN provided by the router 145 shown in FIG. 1A. In this case, the mobile phone 407, the smart television 111, and the smart speaker 113 are located in a same wireless network, and the devices can exchange data.

In some possible implementation solutions, the portable electronic device 200 and the intelligent multimedia playback device 250 may log in to a same user account (for example, a Huawei account or a Huawei Video account).

The intelligent multimedia playback device 250 is playing (step 703) first multimedia content. It may be understood that the intelligent multimedia playback device 250 may have played the multimedia content before step 701, or may start to play the multimedia content after step 701. For example, the smart television 111 in FIG. 4A is playing a video file "Stepping Bravely", and displays a frame 401 of the video file. It may be understood that the smart television 111 may have played "Stepping Bravely" before being in the same WLAN as the mobile phone 407, or may start to play "Stepping Bravely" after being in the same WLAN as the mobile phone 407.

The portable electronic device 200 receives (step 705) first playback information sent by the intelligent multimedia playback device 250, where the first playback information corresponds to the first multimedia content played by the intelligent multimedia playback device 250. An optional obtaining manner is as follows: The intelligent multimedia playback device 250 periodically sends the playback information to the portable electronic device 200; the intelligent multimedia playback device 250 sends the playback information to the portable electronic device 200 after the playback information changes; or after the portable electronic device 200 sends an obtaining request, the intelligent multimedia playback device 250 sends the playback information to the portable electronic device 200. The first playback information includes an identifier of the first multimedia content and a playback progress of the first multimedia content, and optionally includes a source address of the first multimedia content, a playback status of the first multimedia content, a volume status of the first multimedia content, or playback volume of the first multimedia content.

The portable electronic device 200 displays (step 707) a first playback control card corresponding to the first multimedia content, where the first playback control card includes a first control and a second control, and the second control is used to control playback of the first multimedia content. For example, the first control is a playback resume option, and the second control is used to display or perform playback control on the first multimedia content. When detecting a user gesture 351, the mobile phone 407 displays, in the SmartCare interface 369 in the control center interface 353, the playback control card 409 corresponding to the smart television 111 shown in FIG. 4C, where the playback control card 409 includes the playback resume icon 435. It may be understood that the playback control card 409 may alternatively be displayed in another interface of the mobile phone 407, for example, a notification center interface.

In response to a first user input performed on the first control, the portable electronic device 200 obtains the first multimedia content from a server based on the first playback information, and resumes playing the first multimedia content based on the first playback information (step 709). In some possible implementation solutions, a playback progress of the first multimedia content resumed by the first device is the same as the playback progress of the first multimedia content played by the second device. For example, playback of a video is resumed. The playback control card 409 corresponding to the smart television 111 shown in FIG. 4D and the playback information are used as an example. In this case, in response to an operation that the user taps the playback resume icon 435, the mobile phone 407 opens Huawei Video 325 used to play the video, and implements playback resuming (for example, displays the user interface 449 shown in FIG. 4H). For another example, playback of an audio is resumed. The playback control card 603 corresponding to the smart speaker 113 shown in FIG. 6B and the playback information are used as an example. In this case, in response to an operation that the user taps a playback resume icon (the playback resume icon is not marked), the mobile phone 407 opens Music 321 used to play the audio, and implements playback resuming. Playback of the multimedia content is resumed by optionally searching for a multimedia content name, by optionally searching for a multimedia content identifier, or by optionally searching for a multimedia file source address.

In some possible implementation solutions, the portable electronic device 200 may obtain playback information of another multimedia playback device and generate a corresponding playback control card. For example, in addition to obtaining playback information of the smart television 111 and generating a playback control card corresponding to the smart television 111, the portable electronic device 200 may further obtain playback information of audio content played by the smart speaker 123, and generate a playback control card corresponding to the smart speaker 113. The playback control card corresponding to the smart television 111 and the playback control card corresponding to the smart speaker 123 may be simultaneously displayed in the SmartCare interface 369 shown in FIG. 6D.

In some possible implementation solutions, the SmartCare interface 369 displays a plurality of playback control cards. For example, the SmartCare interface 369 displays a first playback control card corresponding to the smart television 111 and a second playback control card corresponding to the smart speaker 123. Display effects of the first playback control card and the second playback control card are determined based on a location relationship between the portable electronic device 200 and each of a first area (for example, the first room 110) corresponding to the smart television 111 and a second area (for example, the second room 120) corresponding to the smart speaker 123.

The following provides a specific example in which the display effects of the first playback control card and the second playback control card are determined based on the location relationship between the portable electronic device 200 and each of the first area (for example, the first room 110) corresponding to the smart television 111 and the second area (for example, the second room 120) corresponding to the smart speaker 123: When the portable electronic device 200 is located in the first area (for example, the first room 110), the first playback control card in the SmartCare interface 369 is displayed above the second playback control card.

In some possible implementation solutions, after breaking the connection to the wireless network, the portable electronic device 200 may display a playback control card corresponding to the intelligent multimedia playback device 250, where the playback control card includes a first control (that is, a playback resume option). When the portable electronic device 200 is in the wireless network, the displayed playback control card corresponding to the intelligent multimedia playback device 250 does not include the first control (that is, the playback resume option). In this way, when the user is at home, the user may focus on the content played by the intelligent multimedia playback device 250, and when the user leaves home, the user may continue playing the multimedia content by using the playback resume option in the playback control card.

Figure 7B:
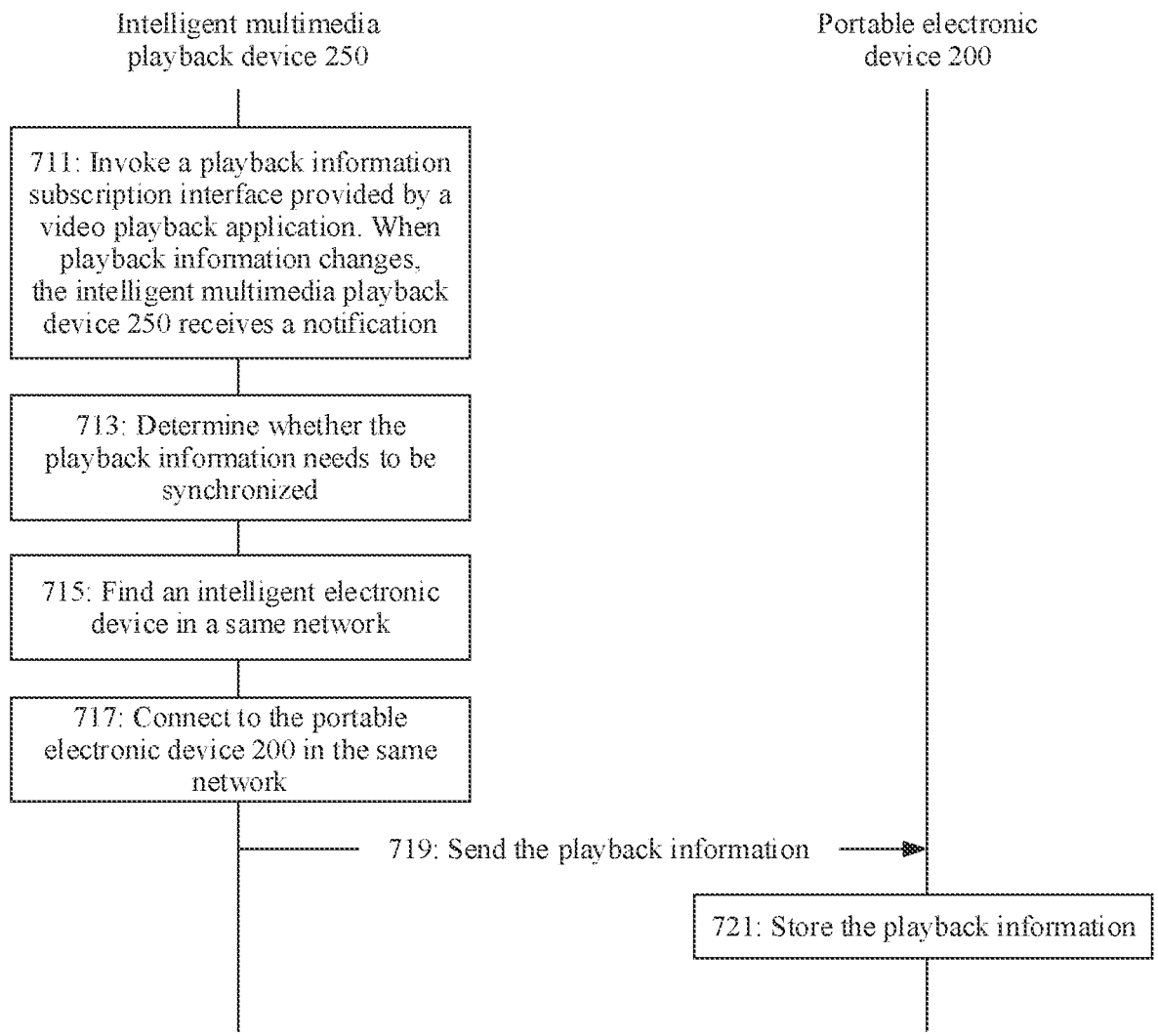
FIG. 7B is a flowchart in which an intelligent multimedia playback device synchronizes playback information to a portable electronic device according to some implementation solutions.
Figure 7C:
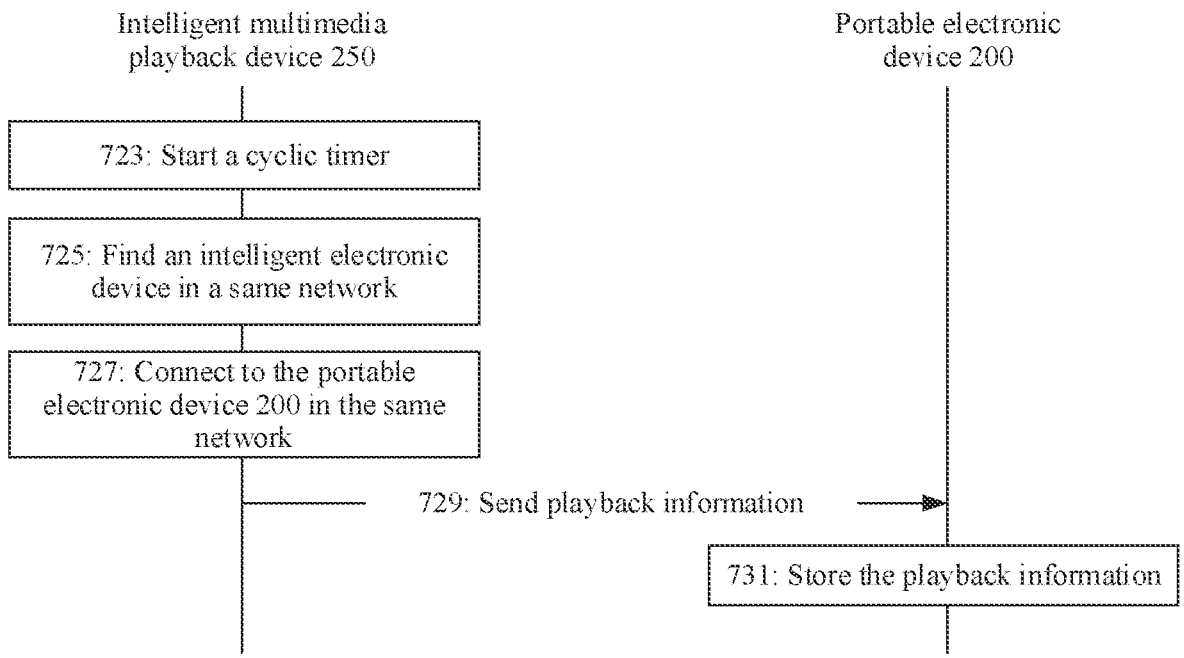
FIG. 7C is a flowchart in which an intelligent multimedia playback device synchronizes playback information to a portable electronic device according to some implementation solutions.
Figure 7D:
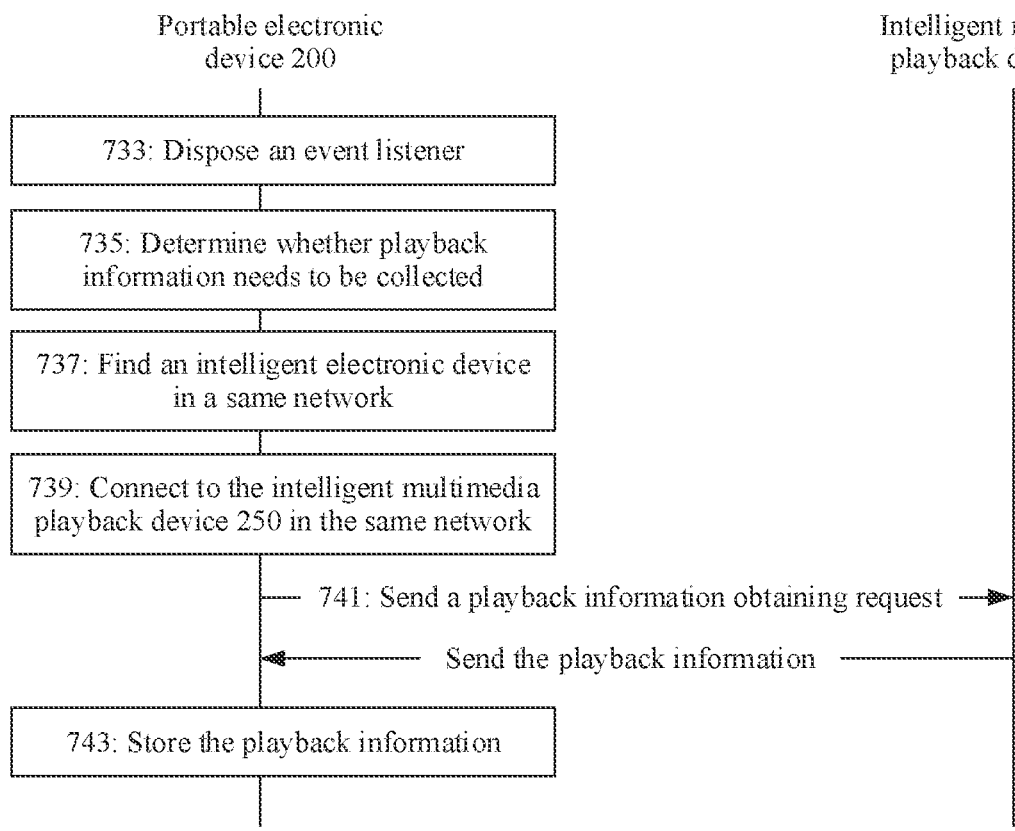
FIG. 7D is a flowchart in which a portable electronic device collects playback information of an intelligent multimedia playback device according to some implementation solutions.

With reference to FIG. 7B to FIG. 7D, the following shows a process in which the portable electronic device 200 obtains playback information of multimedia content played on the intelligent multimedia playback device 250.

FIG. 7B shows a process in which an intelligent multimedia playback device 250 synchronizes playback information to a portable electronic device 200 after the playback information changes.

After device startup, the intelligent multimedia playback device 250 invokes (step 711) a playback information subscription interface provided by a video playback application. When the playback information changes, the intelligent multimedia playback device 250 receives a notification of the playback information subscription interface. For example, the playback information optionally changes when the intelligent multimedia playback device 250 changes from playing no multimedia content to playing multimedia content, optionally changes when the intelligent multimedia playback device 250 plays multimedia content, or optionally changes when the intelligent multimedia playback device 250 changes from playing multimedia content to playing no multimedia content.

The intelligent multimedia playback device 250 obtains and stores changed playback information, and refreshes a current local UTC timestamp of the playback information. For example, after being started, the smart television 111 invokes a playback information subscription interface provided by Huawei Video on the smart television 111. FIG. 4D shows a scenario in which the user remotely controls the smart television 111 by using a remote control. After the remote control, a location of the slider 405A on the playback progress display bar 405 changes compared with a location of the slider 405A originally shown in FIG. 4A, and a location of the slider 439A on the volume display bar 439 changes (the volume display bar 439 is not shown in FIG. 4A, but optionally, it can be learned, from the slider 427A on the volume display bar 427 in the playback control card 409 that is shown in FIG. 4C and that corresponds to the smart television 111 in FIG. 4A, that the location of the slider 439A changes). After receiving the notification of the playback information subscription interface, the smart television 111 obtains and stores changed playback information, and refreshes a current local UTC timestamp of the playback information.

In some possible implementation solutions, the intelligent multimedia playback device 250 directly synchronizes the playback information to the portable electronic device 200. However, due to existence of some continuously changing playback information (for example, a playback progress of multimedia content, where a playback progress of multimedia content that is being played keeps changing), a synchronization frequency is excessively high and consequently power consumption increases. In some other implementation solutions, after obtaining and storing the changed playback information, the intelligent multimedia playback device 250 first determines (step 713) whether current synchronization needs to be performed. When only continuously changing playback information (for example, a playback progress) changes incrementally with time, the synchronization does not need to be performed, the following steps are skipped, and the current synchronization ends. When playback information other than the continuously changing playback information changes, the synchronization needs to be performed, and the following steps continue to be performed. For example, compared with the playback information in FIG. 4A, in the playback information collected by the smart television 111 shown in FIG. 4D after the smart television 111 receives the remote control from the user, in addition to the location of the slider 405A for displaying a playback progress, the location of the slider 439A for displaying volume also changes. In this case, the playback information collected this time needs to be synchronized. In some other implementation solutions, the intelligent multimedia playback device 250 may determine, based on a type of the playback information, whether to synchronize the playback information.

The intelligent multimedia playback device 250 finds (step 715) intelligent electronic devices in a same network, and collects device information of these intelligent electronic devices. For example, the smart television 111 finds, by using the wireless communications module 265, that other devices in a WLAN provided by the router 145 include a smart speaker 113 and a mobile phone 407. The smart television 111 collects and stores device information of the two devices.

The intelligent multimedia playback device 250 connects (step 717) to the portable electronic device 200 in the same network. Optionally, a connection manner is that the intelligent multimedia playback device 250 sends, to the portable electronic device 200, a login account bound to the intelligent multimedia playback device 250. If the portable electronic device 200 determines that a received login account is the same as a login account of the portable electronic device 200, a connection may be established. For example, the smart television 111 sends a login account of the smart television 111 to the mobile phone 407. After verification succeeds, the mobile phone 407 optionally returns a return code indicating that the connection succeeds. After verification fails, the mobile phone 407 optionally returns a return code indicating that the connection fails.

In some possible implementation solutions, the intelligent multimedia playback device 250 is connected to a device whose device type is the portable electronic device 200. In some possible implementation solutions, in addition to the device whose device type is the portable electronic device 200, the intelligent multimedia playback device 250 is further connected to another type of intelligent electronic device.

The intelligent multimedia playback device 250 sends (step 719) the playback information to the successfully connected portable electronic device 200. For example, the smart television 111 sends, by using the wireless communications module 265, the playback information collected in step 711 to the mobile phone 407.

The portable electronic device 200 stores (step 721) the playback information. After receiving the playback information sent by the intelligent multimedia playback device 250 in step 721, the portable electronic device 200 stores the playback information received this time, sets, to online, a device status of the intelligent multimedia device that sends the playback information, and refreshes a current local UTC timestamp of the playback information. Optionally, the portable electronic device 200 sends, after storage, a return code indicating that the synchronization succeeds. For example, after receiving the playback information sent by the smart television 111, the mobile phone 407 stores the playback information received this time, sets a device status of the television 111 to online, and refreshes a current local UTC timestamp of the playback information.

FIG. 7C shows a process in which an intelligent multimedia playback device 250 periodically synchronizes playback information to a portable electronic device 200.

The portable electronic device 200 stores playback information that is not time-sensitive of the intelligent multimedia playback device 250. For example, when the intelligent multimedia playback device 250 is forcibly powered off, the intelligent multimedia playback device 250 does not synchronize the playback information to the portable electronic device 200 for a long time period.

Therefore, that the intelligent multimedia playback device 250 periodically synchronizes the playback information to the portable electronic device 200 may be used as a basis for the portable electronic device 200 to determine whether the intelligent multimedia playback device 250 is online.

The intelligent multimedia playback device 250 starts (step 723) a cyclic timer. For example, a period of the cyclic timer is 30 minutes. The cyclic timer may be generated by the processor 251, or may be generated by another timer module/chip connected to the processor 251.

After a timing time period expires, the intelligent multimedia playback device 250 finds (step 725) intelligent electronic devices in a same network, connects (step 727) to the portable electronic device 200 in the same network, and sends (step 729) the playback information. After receiving the playback information, the portable electronic device 200 stores (step 731) the playback information. Step 725 to step 731 are the same as step 715 to step 721 shown in FIG. 7B. Details are not described herein again.

In addition to a manner in which the intelligent multimedia playback device 250 synchronizes the playback information to the portable electronic device 200, the playback information may be further synchronized as follows: The portable electronic device 200 actively collects the playback information of the multimedia playback device 250. FIG. 7D shows this active collection process.

The portable electronic device 200 disposes (step 733) an event listener after the device is started. Optionally, the event listener is configured to listen to a screen unlock event of the portable electronic device 200 and an event of establishing/exiting a near field connection by the portable electronic device 200, or another trigger event. When the event listened by the listener is triggered, the portable electronic device 200 receives a notification from the listener. For example, when a screen unlock event occurs on the portable electronic device 200, the portable electronic device 200 receives a notification from the event listener. When the portable electronic device 200 accesses a WLAN provided by the router 145, the portable electronic device 200 receives a notification from the event listener. When the portable electronic device 200 is disconnected from a WLAN provided by the router 145, the portable electronic device 200 receives a notification from the event listener.

The portable electronic device 200 determines (step 735) whether playback information needs to be collected. After the listener is triggered, the portable electronic device 200 determines whether the portable electronic device 200 establishes a near field connection to a surrounding device. If the near field connection is established, the portable electronic device 200 continues to perform the following steps. If the near field connection is not established/broken, the portable electronic device 200 skips the following steps and ends this active collection process.

In some possible implementation solutions, because a network is unstable, the portable electronic device 200 frequently accesses/exits the WLAN, or the user frequently unlocks a screen, and suppression needs to be performed. In some possible implementation solutions, a shortest collection period $T_S$ may be set. For example, a local current UTC timestamp of last locally stored playback information is $T_0$, and a local current UTC timestamp of initiating current determining of whether to perform collection is $T_1$. In this case, it is determined whether $T_1-T_0$ is greater than or equal to the shortest collection period $T_S$. If $T_1-T_0$ is greater than or equal to the shortest collection period $T_S$, the collection is performed. If $T_1-T_0$ is less than the shortest collection period $T_S$, the following steps are skipped and this active collection process is completed.

The portable electronic device 200 finds (step 737) intelligent electronic devices in a same network, and collects device information of these intelligent electronic devices. For example, the mobile phone 407 finds, by using the wireless communications module 217, that other devices in a WLAN provided by the router 145 include a smart television 111 and a smart speaker 113. The mobile phone 407 collects and stores device information of the two devices.

The portable electronic device 200 connects (step 739) to the intelligent multimedia playback device 250 in the same network. Optionally, a connection manner is that the portable electronic device 200 sends, to the intelligent multimedia playback device 250, a login account bound to the portable electronic device 200. If the intelligent multimedia playback device 250 determines that a received login account is the same as a login account of the intelligent multimedia playback device 250, a connection may be established. For example, the mobile phone 407 sends a login account of the mobile phone 407 to the smart television 111 and the smart speaker 113. After verification succeeds, the smart television 111 and the smart speaker 113 each optionally return a return code indicating that the connection succeeds. After verification fails, the smart television 111 and the smart speaker 113 each optionally returns a return code indicating that the connection fails.

In some possible implementation solutions, the portable electronic device 200 is connected only to a device whose device type is the intelligent multimedia playback device 250. In some possible implementation solutions, in addition to the device whose device type is the intelligent multimedia playback device 250, the portable electronic device 200 is further connected to another type of intelligent electronic device. In some other implementation solutions, the portable electronic device 200 is connected to all types of intelligent electronic devices.

In some possible implementation solutions, some intelligent electronic devices do not have a capability of logging in to an account, and the portable electronic device 200 optionally connects to these intelligent electronic devices, or optionally does not connect to these intelligent electronic devices for security reasons.

In some possible implementation solutions, after being associated with an application, some intelligent electronic devices may be considered as having an account of the device on which the application is installed, and the portable electronic device 200 optionally connects to these intelligent electronic devices, or optionally does not connect to these intelligent electronic devices for security reasons.

The portable electronic device 200 sends (step 741) a playback information obtaining request to the intelligent multimedia playback device 250, and receives the playback information sent by the intelligent multimedia playback device 250. For the intelligent multimedia playback device 250 that is successfully connected in step 735, the portable electronic device 200 sends the playback information obtaining request. After receiving the request from the portable electronic device 200, the intelligent multimedia playback device 250 collects and returns the playback information. After receiving the returned playback information, the portable electronic device 200 sets, as online, a device status of a multimedia playback device 250 that successfully sends the playback information, and refreshes a current local UTC timestamp of the playback information; and sets, as offline, a device status of a multimedia playback device 250 that is found in step 737 but is not successfully connected (step 739)/fails to send (step 741) the playback information, and does not refresh a current local UTC timestamp of the playback information.

The portable electronic device 200 can obtain time-sensitive playback information of the intelligent multimedia playback device 250 in the foregoing several playback information synchronization manners shown in FIG. 7B to FIG. 7D.

Figure 7E:
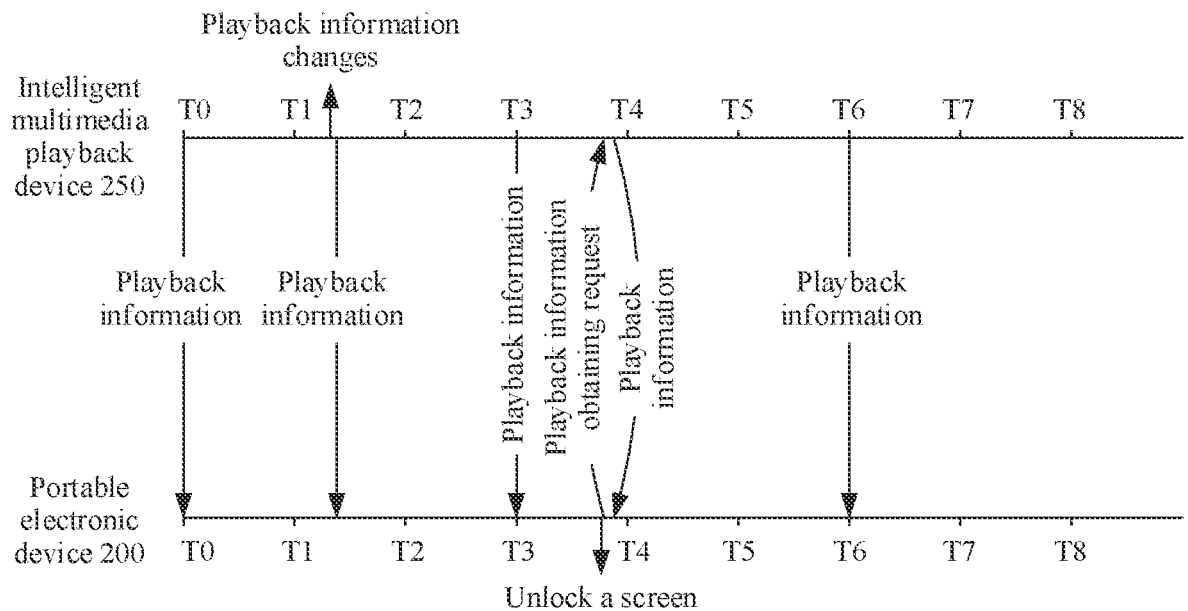
FIG. 7E shows an example of a diagram of data exchange between a portable electronic device and an intelligent multimedia playback device according to some implementation solutions.

FIG. 7E shows an example of a diagram of data exchange between a portable electronic device 200 and an intelligent multimedia playback device 250. A number is optionally in a unit of minutes. A time difference between T0, T1, T2, and the like is optionally 10 minutes.

It can be learned that, at a minute T0, the intelligent multimedia playback device 250 sends playback information to the portable electronic device 200, where a status in this case is optionally that the intelligent multimedia playback device 250 switches from an idle state to a state in which playback control is performed on multimedia content, or the intelligent multimedia playback device 250 and the portable electronic device 200 access a same WLAN, to trigger the procedure shown in FIG. 7B. In minutes T1 to T2, the intelligent multimedia playback device 250 sends playback information to the portable electronic device 200, where a status in this case is optionally that a user remotely controls the intelligent multimedia playback device 250 by using a remote control. In this case, playback information of multimedia content changes, and the procedure shown in FIG. 7B is triggered. At a minute T3, the intelligent multimedia playback device 250 synchronizes playback information to the portable electronic device 200. In this case, a periodic sending time point is exactly reached, and the procedure shown in FIG. 7C is triggered. In minutes T3 to T4, the portable electronic device 200 unlocks a screen, to trigger the procedure shown in FIG. 7D. The portable electronic device 200 sends the playback information obtaining request to the intelligent multimedia playback device 250, and the intelligent multimedia playback device 250 returns the playback information after receiving the request. At a minute T6, the intelligent multimedia playback device 250 synchronizes playback information to the portable electronic device 200. In this case, a periodic sending time point is exactly reached, and the procedure shown in FIG. 7C is triggered. It should be noted that the procedures shown in FIG. 7B to FIG. 7D are performed in parallel. When there is a conflict, any one of the procedures is optionally performed, or all of the procedures are optionally performed in sequence.

Figure 8:
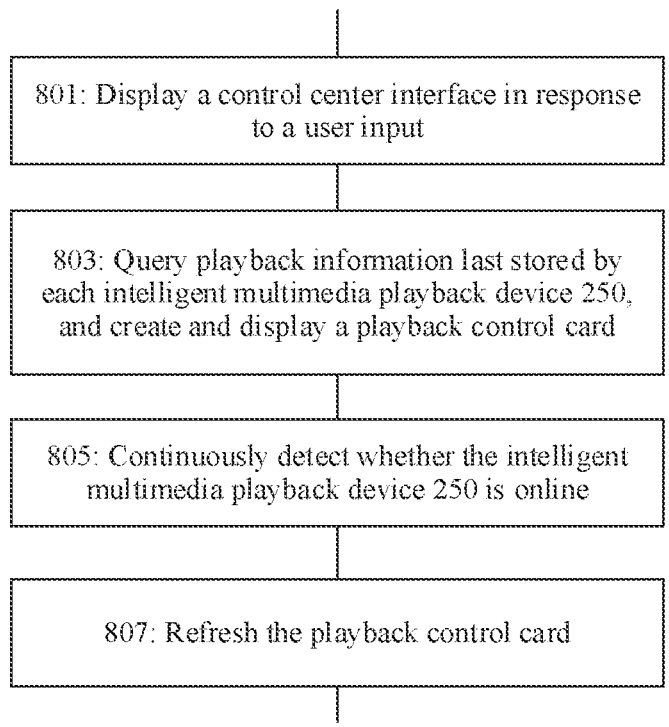
FIG. 8 is a flowchart in Which a portable electronic device displays and refreshes a playback control card according to some implementation solutions.

FIG. 8 shows a process in which a portable electronic device 200 displays and refreshes a playback control card.

The portable electronic device 200 displays (step 801) a control center interface in response to a user input. For example, the user input is optionally the example gesture 351 shown in FIG. 3B. When detecting the gesture 351 entered by the user, the mobile phone 407 displays an example control center interface 353. For example, the control center interface 353 includes a SmartCare interface 369. It may be understood that the control center interface 353 is merely an example interface, or may be another interface, for example, a notification center interface.

The portable electronic device 200 queries (step 803) playback information last stored by each intelligent multimedia playback device 250, and displays a playback control card, where the playback control card includes the playback information and/or an icon that can be used to respond to a user operation. For example, in FIG. 4C, the mobile phone 407 queries a current local UTC timestamp last refreshed by the smart television 111, and selects playback information corresponding to the current local UTC timestamp. A playback control card 409 is displayed in the SmartCare interface 369, and the playback control card 409 includes playback information and/or an icon that can be used to respond to a user operation.

It may be understood that, from a perspective of technical implementations, the portable electronic device 200 may always store playback information of the multimedia playback device 250, for example, by using the internal memory module 205 or an external storage card connected to the external memory interface 203. Therefore, the playback control card can exist permanently. However, from a perspective of user experience, the user prefers to obtain a specific time-sensitive playback control card. Therefore, this embodiment of this application provides an implementation solution. Only a playback control card corresponding to an intelligent multimedia playback device whose device status is online or that is online within a specific time period (for example, within 30 minutes) is displayed in the SmartCare interface 369. For example, the playback control card 409 shown in FIG. 4C that corresponds to an online device is displayed. The playback control card 409 shown in FIG. 5B or FIG. 5C that corresponds to an intelligent multimedia playback device 250 whose device status is offline and whose offline time period is less than 30 minutes is displayed. A playback control card corresponding to an intelligent multimedia playback device 250 whose device status is offline and whose offline time period is greater than or equal to 30 minutes is displayed.

The portable electronic device 200 creates (step 805) a persistent connection to the intelligent multimedia playback device 250 whose device status is online. The persistent connection is different from a non-persistent connection. The non-persistent connection means that a connection is broken after devices are connected and complete data exchange. The persistent connection means that a connection is maintained after devices are connected and complete data exchange. For example, a period in which the intelligent multimedia playback device 250 synchronizes the playback information to the portable electronic device 200 is 30 minutes. If the smart television 111 is forcibly powered off at a moment within 30 minutes, and the mobile phone 407 is always in a control center interface 353, it takes approximately 30 minutes to determine that the smart television 111 is offline. Establishing the persistent connection from the portable electronic device 200 to each intelligent multimedia playback device 250 can speed up determining. For example, after the smart television 111 generates the playback control card 409, the mobile phone 407 establishes a persistent connection to the smart television 111. The mobile phone 407 sends first persistent connection information to the smart television 111 every 15 seconds. After receiving the first persistent connection information, the smart television 111 returns second persistent connection information to the mobile phone 407. If the mobile phone 407 does not receive the second persistent connection information within a specific time period, it indicates that the persistent connection is interrupted. In this case, it is considered that the smart television 111 is offline, and a device status of the smart television 111 is changed to offline. In some possible implementation solutions, content of persistent connection information is a status code. For example, content of the first persistent connection information is "1", and content of the second persistent connection information is "2". In this manner, an amount of transmitted data can be reduced. In some other implementation solutions, optionally, content of the first persistent connection information is a playback information obtaining request, and content of the second persistent connection information is playback information.

The portable electronic device 200 refreshes (step 807) the playback control card. When the portable electronic device displays the control center interface 353, the playback control card needs to be refreshed based on factors such as a change of the playback control information/a device status/a location of the user to determine whether the playback control card exists/content in the playback control card and a sequence of playback control cards. The portable electronic device 200 invokes a local playback information subscription interface. When the locally stored playback information changes, the portable electronic device receives a notification, and refreshes the playback control card in the SmartCare interface 369.

When a current interface of the portable electronic device 200 is not the control center interface 353, the playback control card does not need to be refreshed. The portable electronic device 200 cancels invoking the local playback information subscription interface, and breaks the persistent connection to each online intelligent multimedia playback device 250.

The following considers a case in which the portable electronic device 200 is disconnected from a WLAN, for example, the scenario in which the user leaves home shown in FIG. 5A. After being disconnected from the WLAN, the portable electronic device 200 sots device statuses of all local intelligent multimedia playback devices 250 as offline. If the current interface of the portable electronic device 200 is the control center interface 353, and refreshes the playback control card in the process of refreshing the playback control card in step 807, for example, the playback control card 409 corresponding to the smart television 111 is changed from the playback control card shown in FIG. 4C to the playback control card shown in FIG. 4I or FIG. 4J. If the current interface of the portable electronic device 200 is not the control center interface 353, the playback control card 409 shown in FIG. 5B or FIG. 5C is displayed when a user input of sliding to the control center interface 353 is received next time.

Figure 9:
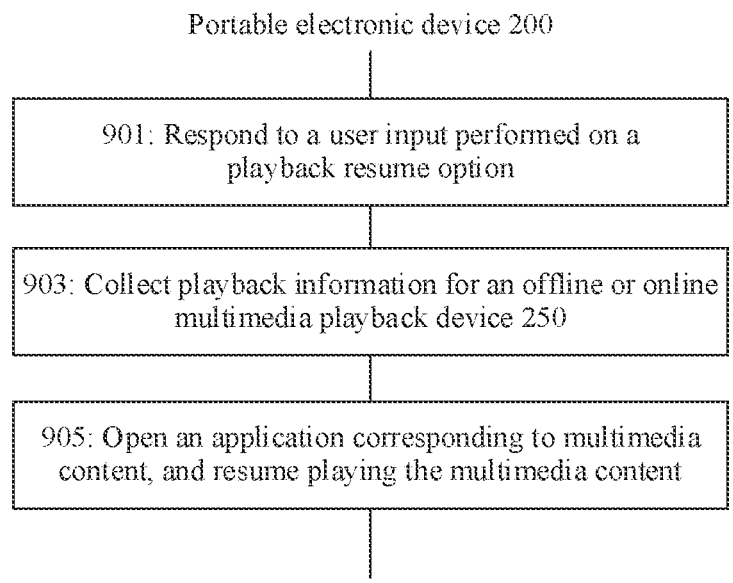
FIG. 9 is a flowchart in which a portable electronic device resumes playing multimedia content according to some implementation solutions.

FIG. 9 shows a process of resuming playing, on a portable electronic device 200, multimedia content played on an intelligent multimedia playback device 250.

The portable electronic device 200 detects (step 901) a user input. For example, the user input is that the user taps a playback resume icon 435 on the playback control card 409.

The portable electronic device 200 collects (step 903) playback information. When the portable electronic device 200 does not establish a near field connection to the intelligent multimedia playback device 250 that needs to resume playback, the portable electronic device 200 views locally stored last playback information of the intelligent multimedia playback device 250. When the portable electronic device 200 and the intelligent multimedia playback device 250 that needs to resume playback are in a near field connection, the portable electronic device 200 may also view locally stored last playback information of the intelligent multimedia playback device 250. In some other implementation solutions, the portable electronic device 200 reconnects to the device, and obtains latest playback information again. In this manner of reconnecting to the device and obtaining the playback information, the playback information can be latest, and user experience can be improved.

The portable electronic device 200 opens (step 905) a video playback application, uses the playback information obtained in step 903 as an input, and resumes playing the multimedia content. For example, if a type of the multimedia content is a video, the mobile phone 407 opens Huawei Video 32 to resume playing the video. If a type of the multimedia content is an audio, the mobile phone 407 opens Music 321 to resume playing the audio.

Figure 10:
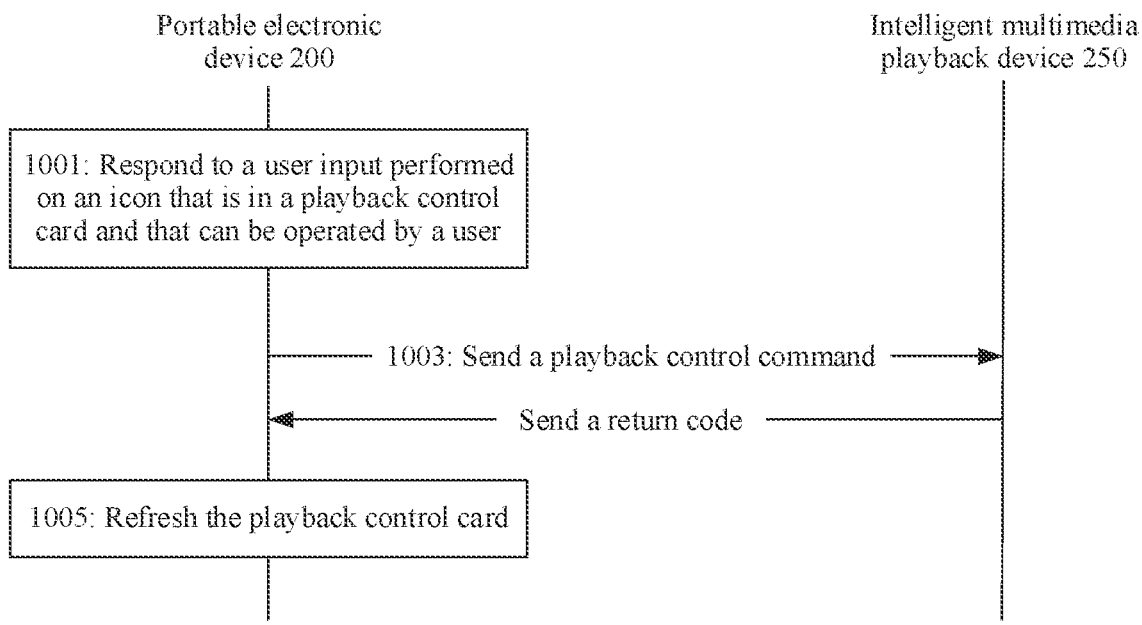
FIG. 10 is a flowchart in which a portable electronic device performs playback control on an intelligent multimedia playback device according to some implementation solutions.

FIG. 10 shows a process in which a portable electronic device 200 performs playback control on a multimedia playback device 250.

The portable electronic device 200 detects (step 1001) a user input performed on an icon that is in a playback control card and that can be operated by a user, for example, tap a volume icon 421, tap a playback icon 423, drag a volume display bar 425, drag a playback progress display bar 427, tap a rewind icon 429, tap a fast-forward icon 431, and tap a next-episode icon 433.

The portable electronic device 200 sends (step 1003) a playback control command to the intelligent multimedia playback device 250 corresponding to the playback control card, and receives a return code from the intelligent multimedia playback device 250 after the execution succeeds/fails. For an intelligent multimedia playback device that fails to execute the playback control command, the portable electronic device 200 modifies a device status of the device to offline.

The portable electronic device 200 refreshes (step 1005) the playback control card, where the playback control card includes playback information and an icon that is in the playback control card and that can be used to respond to a user operation. For example, after a video playback status changes from playing to pause, a playback icon 423 changes to a playback pause icon 445, and content on the playback control card is refreshed. For example, after a user drags the volume display bar 425, the volume display bar 425 displays a correct location based on adjusted volume. When playback control fails, display of the playback control card optionally stops; one or more icons optionally become icons that can be used not to receive a user operation; colors of one or more icons optionally change, for example, the playback control card 409 shown in FIG. 4I; display of one or more icons optionally stops, for example, the playback control card 409 shown in FIG. 4J; the user is optionally prompted that playback control fails, for example, the prompt box 451 in the control center interface 353 shown in FIG. 4K; or one or a combination of the foregoing implementation solutions optionally exists.

In some possible implementation solutions, in a system, a second device is configured to: send first playback information to a first device, where the first playback information corresponds to first multimedia content played by the second device, and the first device and the second device are located in a same wireless network. The first device is configured to: display a first playback control card corresponding to the first multimedia content, where the first playback control card includes a first control and a second control, and the second control is used to control playback of the first multimedia content; and in response to a first user input performed on the first control, obtain the first multimedia content from a server based on the first playback information, and resume playing the first multimedia content based on the first playback information.

In some possible implementation solutions, a mobile phone receives first playback information sent by a television, where the first playback information corresponds to a video played by the television, and the mobile phone and the television are connected to same Wi-Fi. The mobile phone displays a first playback control card corresponding to the video, where the first playback control card includes a first control and a second control, and the second control is used to control playback of the video. In response to an operation performed on the first control, the mobile phone obtains the video from a server based on a video identifier in the first playback information, and resumes playing the video based on a playback progress in the first playback information.

In some possible implementation solutions, an embodiment of this application provides an electronic device, including a memory and one or more processors. The memory is configured to store computer program code, the computer program code includes computer instructions, and when the computer instructions are executed by the processor, the electronic device is enabled to perform the method for resuming playing multimedia content between devices.

In some possible implementation solutions, an embodiment of this application provides a computer program product. When the computer program product runs on a computer, the computer is enabled to perform the method for resuming playing multimedia content between devices.

Figure 11:
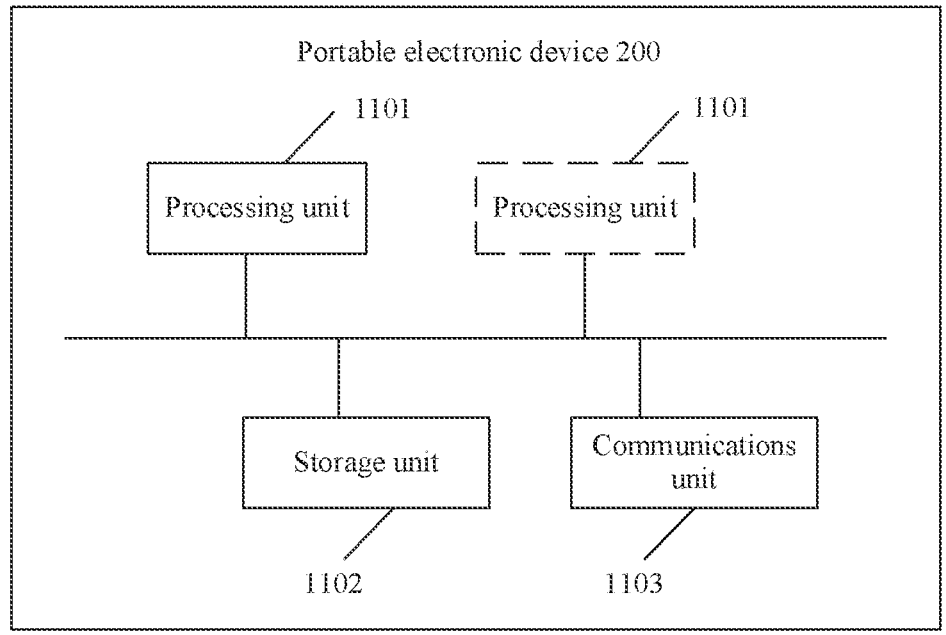
FIG. 11 and FIG. 12 each are a schematic diagram of a structure of a portable electronic device according to some implementation solutions.

In some possible implementation solutions, an embodiment of this application provides a schematic diagram of a structure of a portable electronic device 200. As shown in FIG. 11, the portable electronic device 200 includes one or more processing units 1101, a storage unit 1102, and a communications unit 1103, and may perform the method for resuming playing multimedia content provided in embodiments of this application.

Figure 12:
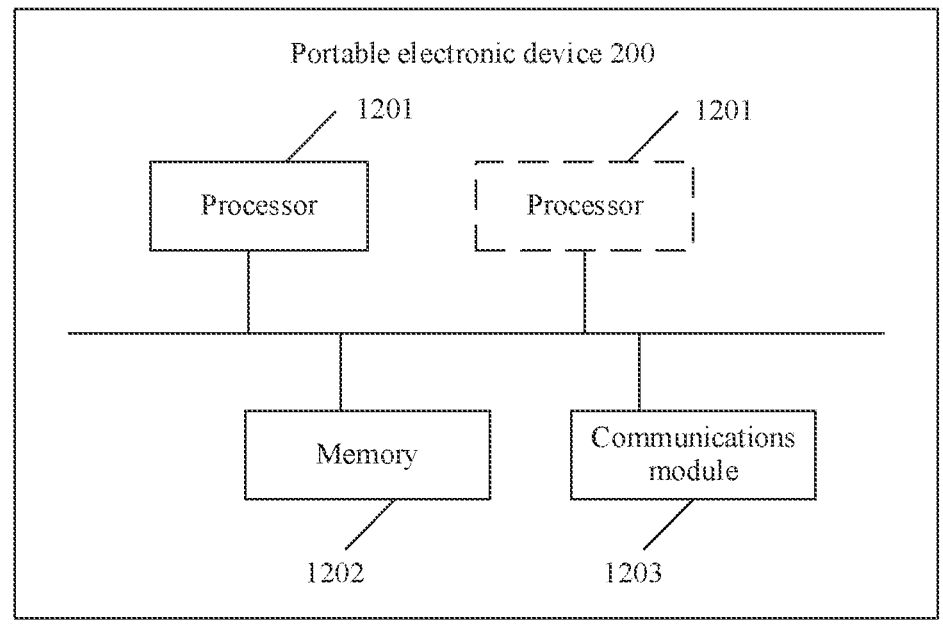

In some possible implementation solutions, an embodiment of this application provides a schematic diagram of a structure of a portable electronic device 200. When a processing unit 1101 is a processor, a storage unit 1102 is a memory, and a communications unit 1103 is a communications module, as shown in FIG. 12, the portable electronic device 200 includes one or more processors 1201, a memory 1202, and a communications module 1203, and may perform the method for resuming playing multimedia content provided in embodiments of this application.

In some possible implementation solutions, an embodiment of this application provides a schematic diagram of a structure of an intelligent multimedia playback device 250.

Figure 13:
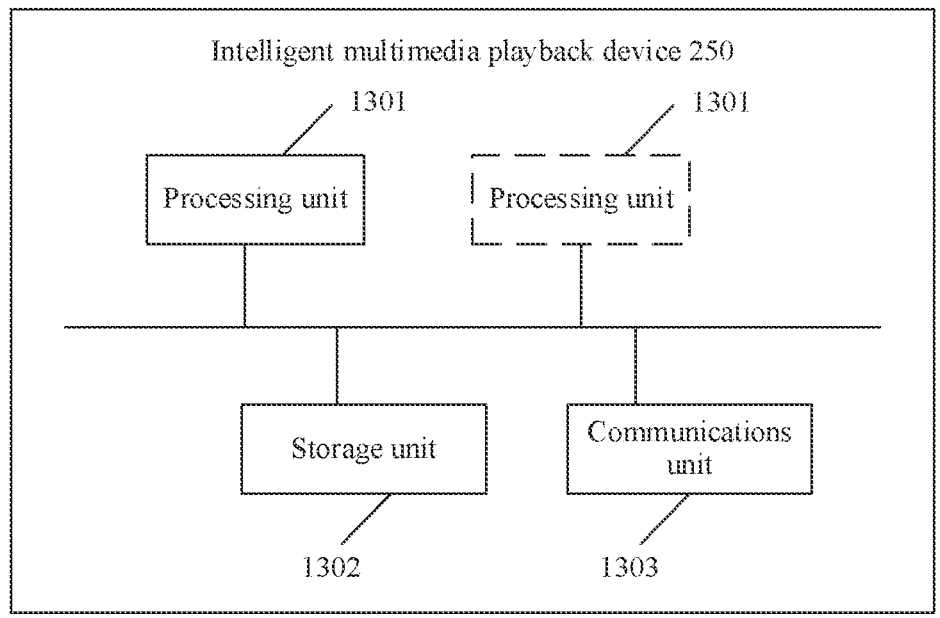
FIG. 13 and FIG. 14 each are a schematic diagram of a structure of an intelligent multimedia playback device according to some implementation solutions.

As shown in FIG. 13, the intelligent multimedia playback device 250 includes one or more processing units 1301, a storage unit 1302, and a communications unit 1303, and may perform the method for resuming playing multimedia content provided in embodiments of this application.

Figure 14:
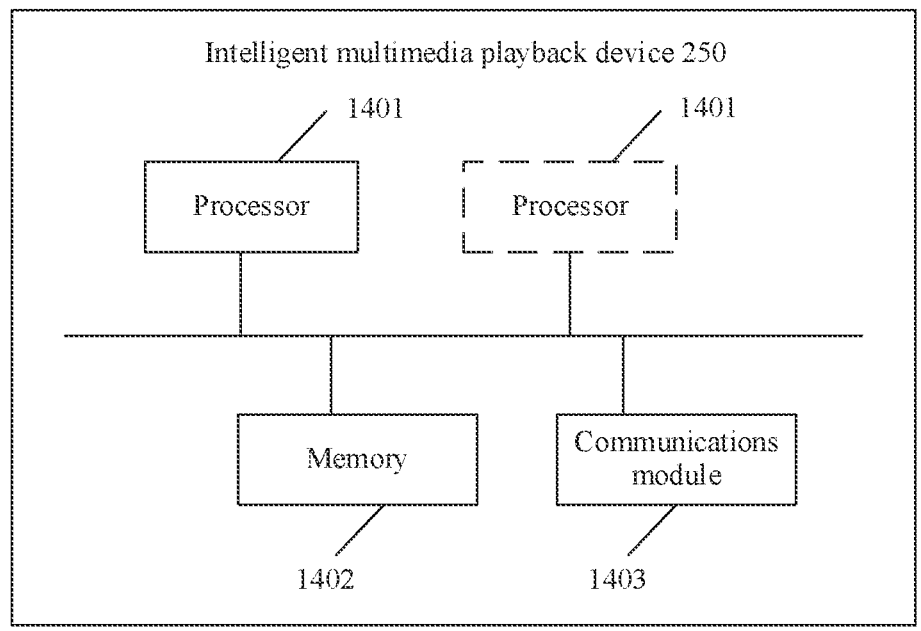

In some possible implementation solutions, an embodiment of this application provides a schematic structural diagram of an intelligent multimedia playback device 250. When the processing unit 1301 is a processor, the storage unit 1302 is a memory, and the communications unit 1303 is a communications module, as shown in FIG. 14, the intelligent multimedia playback device 250 includes one or more processors 1401, a memory 1402, and a communications module 1403, to perform the multimedia content resuming method provided in embodiments of this application.

Based on the foregoing descriptions of the implementations, a person skilled in the art may clearly understand that for the purpose of convenient and brief descriptions, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, and may be located in one position, or may be distributed in a plurality of different positions. Some or all of the units may be selected based on an actual requirement to achieve the objectives of the solutions in embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer or a chip) or a processor (processor) to perform all or some of the steps of the methods in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a first device, wherein the method comprises:
    receiving, from a second device, first playback information corresponding to first multimedia content played by the second device, wherein the first device and the second device are located in a same wireless network;
    displaying a first playback control card corresponding to the first multimedia content, wherein the first playback control card comprises a first control and a second control, and wherein the second control is configured to control playback of the first multimedia content;
    obtaining a first user input on the first control;
    obtaining, in response to the first user input, from a server, and based on the first playback information, the first multimedia content;
    playing the first multimedia content based on the first playback information;
    detecting that the first device is disconnected from the wireless network; and
    displaying a second playback control card corresponding to the first multimedia content played by the second device, wherein the second playback control card comprises the first control and does not comprise the second control.

2. The method of claim 1, further comprising:
    obtaining a sliding gesture comprising sliding on a first interface on a home screen of the first device; and
    further displaying, in response to the sliding gesture, the first playback control card in the first interface.

3. The method of claim 1, wherein the second control comprises at least one of a volume icon, a volume display bar, a playback icon, a playback progress display bar, a rewind icon, a fast-forward icon, or a next-episode icon.

4. The method of claim 1, wherein the first playback information comprises an identifier of the first multimedia content and a playback progress of the first multimedia content.

5. The method of claim 4, wherein the first playback information further comprises at least one of a source address of the first multimedia content, a playback status of the first multimedia content, a volume status of the first multimedia content, or a playback volume of the first multimedia content.

6. The method of claim 1, wherein a first playback progress of the first multimedia content played by the first device is the same as a second playback progress of the first multimedia content played by the second device.

7. The method of claim 1, further comprising opening, in response to the first user input an application playing the first multimedia content.

8. The method of claim 2, further comprising displaying, in the first interface, a second playback control card corresponding to second multimedia content played by a third device.

9. The method of claim 8, wherein the second device is associated with a first area, wherein the third device is associated with a second area, and wherein the method further comprises determining display effects of the first playback control card and the second playback control card based on a location relationship between the first device and each of the first area and the second area.

10. The method of claim 9, wherein a first display location of the first playback control card in the first interface is above a second display location of the second playback control card when the first device is located in the first area.

11. The method of claim 10, wherein the first device is located in the second area, wherein the second display location is above the first display location, and wherein the method further comprises displaying first prompt information indicating whether to play the first multimedia content on the third device.

12. The method of claim 1, further comprising:
obtaining a second user input on the second control;
sending, to the second device and in response to the second user input, a playback control command; and
displaying first prompt information indicating that a playback control has failed when the first device does not receive a response message corresponding to the playback control command.

13. The method of claim 1, further comprising:
receiving, from the second device, second playback information corresponding to second multimedia content played by the second device;
displaying the first playback control card and a second playback control card corresponding to the second multimedia content;
obtaining a second user input; and
simultaneously playing, in response to the second user input, the first multimedia content and the second multimedia content.

14. The method of claim 1, further comprising:
receiving, from a third device, second playback information corresponding to the first multimedia content played by the third device; and
displaying a second playback control card corresponding to the first multimedia content played by the second device and the third device.

15. The method of claim 14, wherein a first playback progress of the first multimedia content played by the third device is the same as a second playback progress of the first multimedia content played by the second device.

16. The method of claim 1, wherein the first device and the second device log in to a same user account.

17. The method of claim 1, wherein the wireless network is a WI-FI network.

18. A first device comprising:
a memory configured to store instructions; and
one or more processors coupled to the memory and configured to execute the instructions to cause the first device to:
receive, from a second device, playback information corresponding to multimedia content played by the second device, wherein the first device and the second device are located in a same wireless network;
display a playback control card corresponding to the multimedia content, wherein the playback control card comprises a first control and a second control, and wherein the second control is configured to control playback of the multimedia content;
obtain a user input on the first control;
obtain, in response to the user input, from a server, and based on the playback information, the multimedia content;
play the multimedia content based on the playback information;
detect that the first device is disconnected from the wireless network; and
display a second playback control card corresponding to the first multimedia content played by the second device, wherein the second playback control card comprises the first control and does not comprise the second control.

19. A computer program product comprising computer-executable instructions that are stored on a non-transitory computer-readable storage medium and that, when executed by one or more processors, cause a first device to:
receive, from a second device, playback information corresponding to multimedia content played by the second device, wherein the first device and the second device are located in a same wireless network;
display a playback control card corresponding to the multimedia content, wherein the playback control card comprises a first control and a second control, and wherein the second control is configured to control playback of the multimedia content;
obtain a user input on the first control;
obtain, in response to the user input, from a server, and based on the playback information, the multimedia content;
play the multimedia content based on the playback information;
detect that the first device is disconnected from the wireless network; and
display a second playback control card corresponding to the first multimedia content played by the second device, wherein the second playback control card comprises the first control and does not comprise the second control.

20. The computer program product of claim 19, wherein the instructions further cause the first device to:
receive, from the second device, second playback information corresponding to second multimedia content played by the second device;
display the first playback control card and a second playback control card corresponding to the second multimedia content;
obtain a second user input; and
simultaneously play, in response to the second user input, the first multimedia content and the second multimedia content.

* * * * *